United States Patent
Go et al.

(10) Patent No.: US 11,616,518 B2
(45) Date of Patent: Mar. 28, 2023

(54) ELECTRONIC DEVICE AND METHOD FOR TRANSMITTING AND RECEIVING SIGNALS

(71) Applicant: Samsung Electronics Co., Ltd., Gyeonggi-do (KR)

(72) Inventors: Yong-Lim Go, Gyeonggi-do (KR); Tae-Sik Yun, Gyeonggi-do (KR); Sung-Chul Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/825,089

(22) Filed: May 26, 2022

(65) Prior Publication Data

US 2022/0302936 A1 Sep. 22, 2022

Related U.S. Application Data

(63) Continuation of application No. 16/080,482, filed as application No. PCT/KR2017/002461 on Mar. 7, 2017, now Pat. No. 11,362,689.

(30) Foreign Application Priority Data

Mar. 7, 2016 (KR) .......................... 10-2016-0026989

(51) Int. Cl.
*H04B 1/04* (2006.01)
*H04W 52/02* (2009.01)

(52) U.S. Cl.
CPC ....... *H04B 1/04* (2013.01); *H04B 2001/0416* (2013.01)

(58) Field of Classification Search
None
See application file for complete search history.

(56) References Cited

U.S. PATENT DOCUMENTS 9,451,566 B1  9/2016 Morshedi et al.
10,075,199 B2  9/2018 King et al.
(Continued)

FOREIGN PATENT DOCUMENTS

KR  10-2011-0127677 A  11/2011
KR  10-2014-0090205 A  7/2014
(Continued)

*Primary Examiner* — Pablo N Tran
(74) *Attorney, Agent, or Firm* — Cha & Reiter, LLC

(57) ABSTRACT

The present invention relates to an electronic device and, more particularly, to an electronic device and a method for transmitting and receiving signals. To this end, the electronic device according to the present invention may comprise: a transceiving unit comprising a first group of power amplifiers (PAs) including at least one PA and a second group of PAs including at least one PA; an antenna unit comprising a first antenna selectively coupled to a PA supporting a first frequency range or a second frequency range of the first group of PAs and the second group of the PAs, and a second antenna selectively coupled to a PA supporting the second frequency range or a third frequency range of the first group of PAs and the second group of the PAs; a power supply unit comprising a first power supply modulator connected to the first group of PAs and a second power supply modulator connected to the second group of PAs; and a communication processor for changing an output voltage at least in part on the basis of transmit power of the PA coupled to at least one of the first power supply modulator and the second power supply modulator, wherein at least one of the first group of PAs and at least one of the second group of PAs are capable of transmitting signals simultaneously.

13 Claims, 38 Drawing Sheets

(56) References Cited

U.S. PATENT DOCUMENTS

| | | |
|---|---|---|
| 10,581,466 B2 | 3/2020 | Pehlke |
| 10,608,604 B2 | 3/2020 | Wu et al. |
| 10,749,562 B2 | 8/2020 | Bai |
| 10,944,523 B2 | 3/2021 | Pehlke et al. |
| 2011/0038271 A1 | 2/2011 | Shin et al. |
| 2011/0151806 A1* | 6/2011 | Kenington ............ H03F 1/3247 |
| | | 455/127.1 |
| 2012/0112970 A1 | 5/2012 | Caballero et al. |
| 2012/0213154 A1 | 8/2012 | Gaal et al. |
| 2013/0095895 A1 | 4/2013 | Asuri et al. |
| 2013/0272187 A1 | 10/2013 | Malladi et al. |
| 2014/0038675 A1* | 2/2014 | Khlat ....................... H03F 3/68 |
| | | 455/574 |
| 2014/0106693 A1 | 4/2014 | Khlat |
| 2014/0227982 A1 | 8/2014 | Granger-Jones et al. |
| 2014/0341319 A1* | 11/2014 | Wimpenny ............... H03F 3/24 |
| | | 375/297 |
| 2015/0049682 A1 | 2/2015 | Seo et al. |
| 2015/0110229 A1 | 4/2015 | Kim |
| 2016/0049986 A1 | 2/2016 | Cho |
| 2016/0094254 A1* | 3/2016 | Ripley ................. H04B 1/1607 |
| | | 455/114.3 |
| 2016/0190995 A1 | 6/2016 | Penticoff |
| 2016/0241208 A1* | 8/2016 | Lehtola ................. H03F 1/0266 |
| 2016/0322993 A1 | 11/2016 | Yamanouchi |
| 2017/0195106 A1 | 7/2017 | Pehlke |
| 2017/0373730 A1 | 12/2017 | Pehlke et al. |
| 2019/0155782 A1 | 5/2019 | Lin |

FOREIGN PATENT DOCUMENTS

| | | |
|---|---|---|
| KR | 10-2015-0068361 A | 6/2015 |
| KR | 10-2016-0019720 A | 2/2016 |
| WO | 2013/095263 A2 | 6/2013 |
| WO | 2015/093021 A1 | 6/2015 |

* cited by examiner

ELECTRONIC DEVICE AND METHOD FOR TRANSMITTING AND RECEIVING SIGNALS

CROSS REFERENCE TO RELATED APPLICATIONS

This application is a Continuation of U.S. patent application Ser. No. 16/080,482 filed on Aug. 28, 2018 which claims priority of National Phase Entry of PCT International Application No. PCT/KR2017/002461, which was filed on Mar. 7, 2017, and claims a priority to Korean Patent Application No. 10-2016-0026989 which was filed on Mar. 7, 2016, the contents of which are incorporated herein by reference.

TECHNICAL FIELD

The present invention relates to electronic devices and more specifically to electronic devices and methods for transmitting and receiving signals.

BACKGROUND ART

Electronic devices are providing more diverse services and additional functions. Steady development efforts are underway to make electronic devices meet the various needs of users and to raise the usability of electronic devices. As an example of satisfying user's needs, an electronic device may transmit and receive data to/from an external electronic device. For such data transmission and reception, the radio frequency (RF) circuit of the electronic device may provide a voltage controlled by a power modulator to a power amplifier (PA), thereby transmitting and receiving signals.

DETAILED DESCRIPTION OF THE INVENTION

Technical Problem

Conventionally, signals are transmitted via one power modulator. Thus, uplink carrier aggregation (CA) to simultaneously configure a plurality of uplinks is not efficient. When such technology as envelope tracking (ET) or average power tracking (APT) is used to raise transmit power efficiency, the PA supply voltage output from the power modulator depends upon PA output power. Upon an uplink CA operation, the output power of each PA is independent; one power modulator may not efficiently support the uplink CA operation by which a plurality of PAs is operated. Even when the power issue is addressed, a conventional RF structure cannot support the uplink CA using a pseudo band. For example, when all of the frequencies to be used for uplink CA belong to a mid band (MB), the PAs used are insufficient, thus ending with a failure to perform uplink CA.

Thus, there is a need to support two-uplink CA of all required combinations by adding a minimum number of power modulators and PAs.

Technical Solution

Thus, the present invention relates to an electronic device and provides an electronic device and method for transmitting and receiving signals.

The present invention provides an electronic device and method for enhancing the transmit (TX)/receive (RX) data rate via two-uplink CA and three-downlink CA by adding a minimum number of power modulators and PAs.

To achieve the foregoing objectives, according to the present invention, an electronic device may comprise a transceiver including a first PA group that includes at least one power amplifier (PA) and a second PA group that includes at least one PA, an antenna unit that includes a first antenna selectively connected with a PA configured to support a first frequency band or a second frequency band among PAs in the first PA group and PAs in the second PA group and a second antenna selectively connected with a PA configured to support the second frequency band or a third frequency band among the PAs in the first PA group and the PAs in the second PA group, a power unit including a first power modulator connected to the first PA group and a second power modulator connected to the second PA group, and a communication processor configured to change an output voltage based on at least part of the transmit power of a PA connected to at least one of the first power modulator and the second power modulator, wherein at least one of the PAs in the first PA group and at least one of the PAs in the second PA group are configured to transmit a signal simultaneously.

To achieve the foregoing objectives, according to the present invention, an electronic device may comprise a power unit including a plurality of power modulators, an antenna unit including a plurality of antennas, a plurality of PA groups including a low band (LB), a middle band (MB), and a high band (HB), and a transceiver including a path selector configured to perform switching to each PA group or to the LB, the MB, and the HB included in each PA group, and a communication processor configured to control power output from each power modulator included in the power unit and each switch included in the path selector in order to control signal transmission and reception through the plurality of antennas.

To achieve the foregoing objectives, according to the present invention, a method for transmitting or receiving a signal by an electronic device may comprise performing communication through a PA in a first PA group using power output from a first power modulator configured in a power unit, detecting an uplink CA request, operating a second PA group by activating a second power modulator configured in the power unit corresponding to the detected request, and controlling the transmission or reception of a signal through a PA in the second PA group while performing the communication.

Advantageous Effects

According to the present invention, there are provided an electronic device and method for enhancing TX/RX data rate via two-uplink CA and three-downlink CA by adding a minimum number of power modulators and PAs, thereby enhancing TX/RX data rate and reducing power consumption.

MODE FOR CARRYING OUT THE INVENTION

Figure 1:
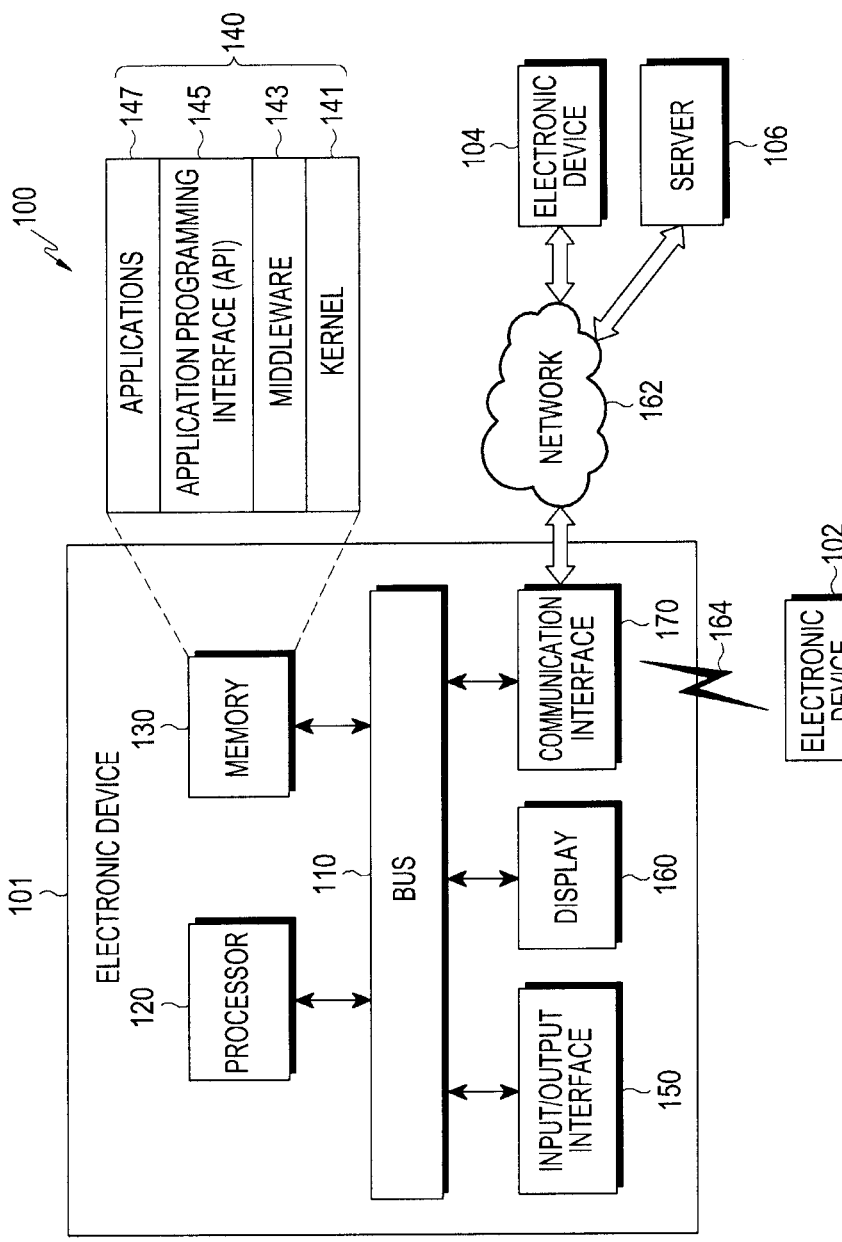
FIG. 1 is a view illustrating an electronic device 101 in a network environment 100 according to various embodiments.

Hereinafter, embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a mobile medical device, a camera, or a wearable device. According to an embodiment of the present invention, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to an embodiment of the present invention, the electronic device may be a home appliance. Examples of the home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, a charger, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or internet of things (IoT) devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1 is a view illustrating an electronic device 101 in a network environment 100 according to an embodiment.

The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications (e.g., control messages and/or data) between the components.

The processor 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of the electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

The wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. Further, the wireless communication may include, e.g., short-range communication 164. The short-range communication 164 may include at least one of, e.g., wireless fidelity (Wi-Fi), bluetooth, near-field communication (NFC), or global navigation satellite system (GNSS). The GNSS may include at least one of, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

Figure 2:
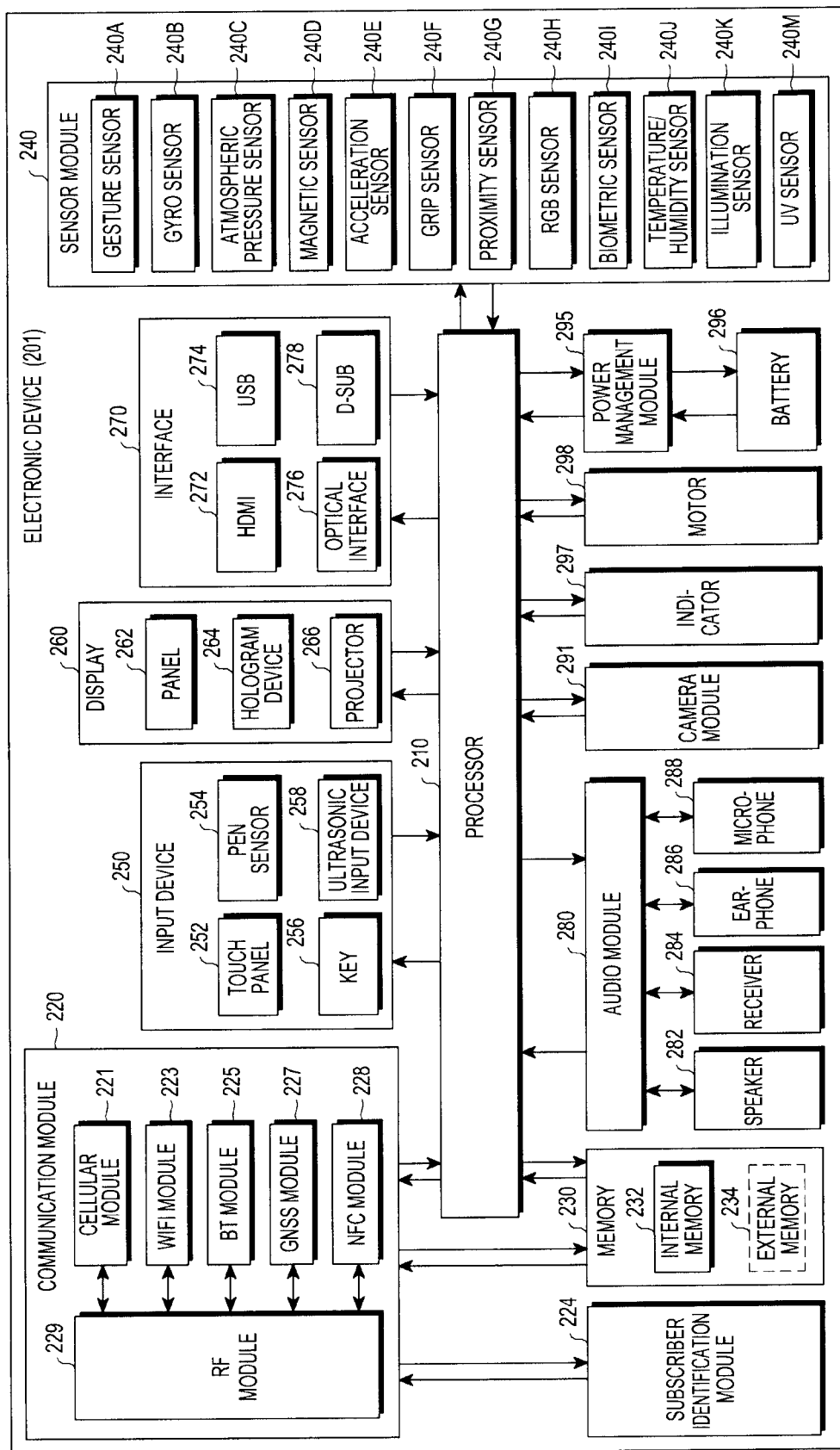
FIG. 2 is a block diagram illustrating an electronic device 201 according to various embodiments.

FIG. 2 is a block diagram illustrating an electronic device 201 according to an embodiment of the present invention.

An electronic device 201 may include the whole or part of, e.g., the electronic device 101 of FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store various data in the non-volatile memory.

The communication module 220 may have the same or similar configuration to the communication interface 170 of FIG. 1. The communication module 220 may include, e.g., a cellular module 221, a wireless fidelity (Wi-Fi) module 223, a Bluetooth (BT) module 225, a GNSS module 227, a NFC module 228, and a RF module 229.

The cellular module 221 may provide voice call, video call, text, or Internet services through, e.g., a communication network. According to an embodiment of the present invention, the cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP).

The Wi-Fi module 223, the Bluetooth module 225, the GNSS module 227, or the NFC module 228 may include a process for, e.g., processing data communicated through the module. According to an embodiment of the present invention, at least some (e.g., two or more) of the cellular module 221, the Wi-Fi module 223, the Bluetooth module 225, the GNSS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the bluetooth module 225, the GNSS module 227, or the NFC module 228 may communicate RF signals through a separate RF module.

The subscription identification module 224 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 234 may be functionally and/or physically connected with the electronic device 201 via various interfaces.

For example, the sensor module 240 may measure a physical quantity or detect an motion state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 1210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, or a projector 266. The panel 262 may have the same or similar configuration to the display 160 of FIG. 1. The panel 262 may be implemented to be flexible, transparent, or wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be, for example, located inside or outside of the electronic device 201. In accordance with an embodiment, the display 260 may further include a control circuit to control the panel 262, the hologram device 264, or the projector 266.

The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert a sound into an electric signal or vice versa, for example. At least a part of the audio module 280 may be included in e.g., the input/output interface 145 as shown in FIG. 1. The audio module 280 may process sound information input or output through e.g., a speaker 282, a receiver 284, an earphone 286, or a microphone 288.

For example, the camera module 291 may be a device for recording still images and videos, and may include, according to an embodiment, one or more image sensors (e.g., front and back sensors), a lens, an Image signal processor (ISP), or a flash such as an LED or xenon lamp.

The power manager module 295 may manage power of the electronic device 201, for example. The electronic device 201 may be an electronic device powered by a battery, but is not limited thereto. According to an embodiment of the present invention, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or media-Flo™.

Each of the aforementioned components of the electronic device may include one or more parts, and a name of the part may vary with a type of the electronic device. The electronic device in accordance with various embodiments of the disclosure may include at lest one of the aforementioned components, omit some of them, or include other additional component(s). Some of the components may be combined into an entity, but the entity may perform the same functions as the components may do.

Figure 3:
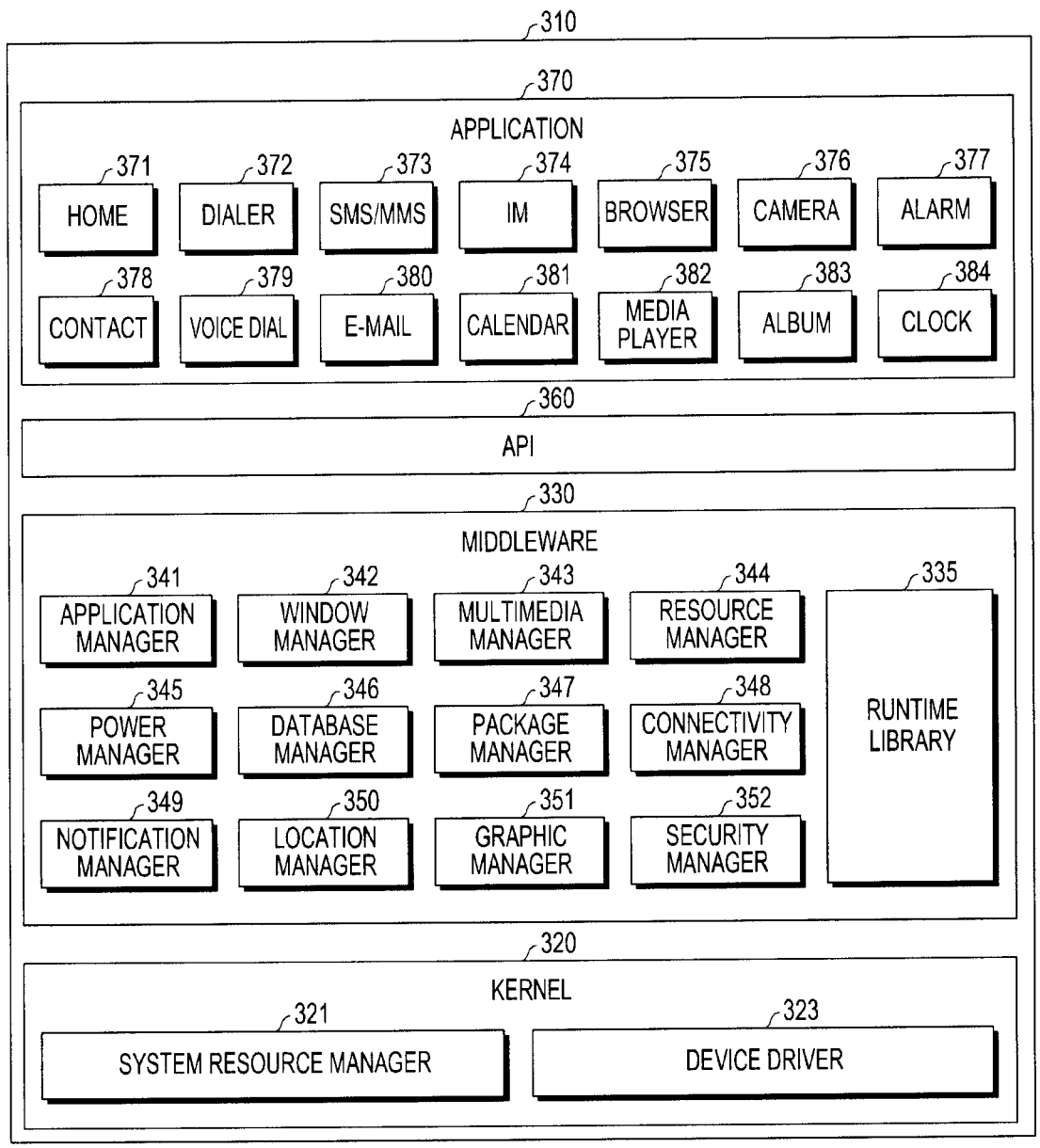
FIG. 3 is a block diagram illustrating a program module according to various embodiments.

FIG. 3 is a block diagram illustrating a program module according to an embodiment of the present disclosure.

According to an embodiment of the present disclosure, the program module 310 (e.g., the program 140) may include an operating system (OS) controlling resources related to the electronic device (e.g., the electronic device 101) and/or various applications (e.g., the application processor 147) driven on the operating system. The operating system may include, e.g., Android™, iOS™, Windows™, Symbian™, Tizen™, or Bada™.

The program 310 may include, e.g., a kernel 320, middleware 330, an application programming interface (API) 360, and/or an application 370. At least a part of the program module 310 may be preloaded on the electronic device or may be downloaded from an external electronic device (e.g., the electronic devices 102 and 104 or server 106).

The kernel 320 (e.g., the kernel 141) may include, e.g., a system resource manager 321 and/or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. According to an embodiment of the present invention, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage GUI resources used on the screen. The multimedia manager 343 may grasp formats necessary to play various media files and use a codec appropriate for a format to perform encoding or decoding on media files. The resource manager 344 may manage resources, such as source code of at least one of the applications 370, memory or storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or Bluetooth. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related user interface. The security manager 352 may provide various security functions necessary for system security or user authentication. According to an embodiment of the present disclosure, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may provided a specified module per type of the operating system in order to provide a differentiated function. Further, the middleware 330 may dynamically omit some existing components or add new components.

The API 360 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 370 (e.g., the application processor 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a heath-care (e.g., measuring the degree of workout or blood sugar), or provision of environmental information (e.g., provision of air pressure, moisture, or temperature information).

According to an embodiment of the present disclosure, the application 370 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 370 may include an application (e.g., a health-care application of a mobile medical device) designated according to an attribute of the external electronic device (e.g., the electronic devices 102 and 104). According to an embodiment of the present invention, the application 370 may include an application received from the external electronic device (e.g., the server 106 or electronic devices 102 and 104). According to an embodiment of the present invention, the application 370 may include a preloaded application or a third party application downloadable from a server. The names of the components of the program module 310 according to the shown embodiment may be varied depending on the type of operating system.

According to an embodiment of the present disclosure, at least a part of the program module 310 may be implemented in software, firmware, hardware, or in a combination of two or more thereof. At least a part of the programming module 310 may be implemented (e.g., executed) by e.g., a processor (e.g., the processor 210). At least a part of the program module 310 may include e.g., a module, program, routine, set of commands, process, or the like for performing one or more functions.

Figure 4:
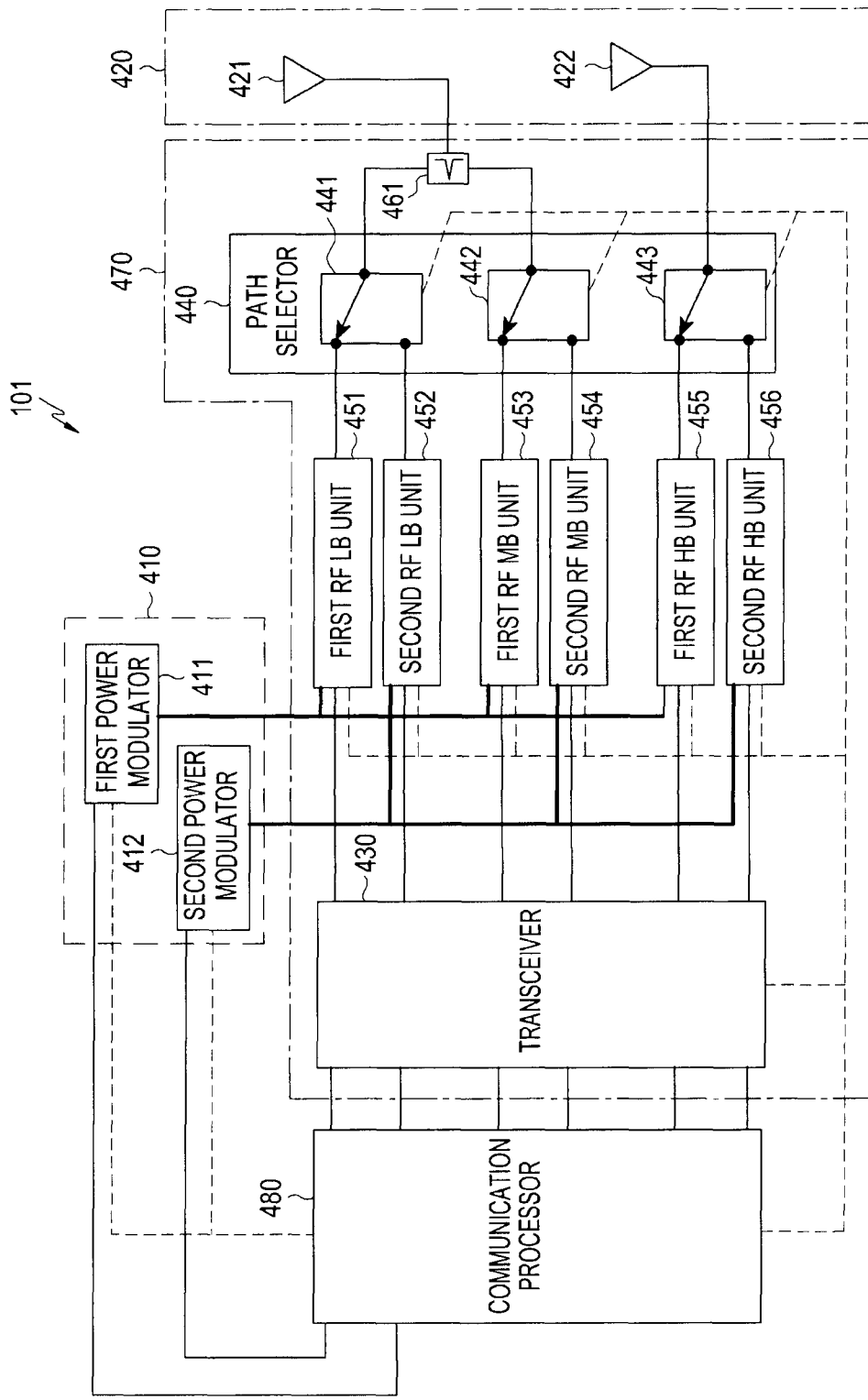
FIG. 4 is a block diagram illustrating an electronic device transmitting and receiving signals according to various embodiments of the present invention.

FIG. 4 is a block diagram illustrating an electronic device transmitting and receiving signals according to various embodiments of the present invention.

Referring to FIG. 4, according to various embodiments of the present invention, the electronic device 101 may support two-uplink carrier aggregation (CA) and three-downlink CA.

The electronic device 101 may include a power unit 410 including a first power modulator 411 and a second power modulator, an antenna unit 420 including a first antenna 421 and a second antenna 422, an RF circuit unit 4701, and a communication processor 480. The communication processor 480 may perform at least one operation or function executed by the processor 120 of FIG. 1. The RF circuit unit 470 may include a plurality of PA groups and a transceiver 430 that convert baseband signals output from the communication processor 480 into RF band signals based on the power output from the first power modulator 411 and the second power modulator, and that control the gain of RF band signals. The power unit 410 may include two power modulators or three or more power modulators. The RF circuit unit 170 may include two PA groups or three or more PA groups. The number of PA groups may correspond to the number of power modulators included in the power unit 410. The number of power modulators included in the power unit 410 may correspond to the number of PA groups.

According to various embodiments, the RF circuit unit 470 may perform at least one operation or function that is performed by the communication interface 170 of FIG. 1.

The RF circuit unit 470 may include a first PA group including at least one power amplifier (PA) and a second PA group including at least one PA. Each PA group may include PAs supporting low band (LB), middle band (MB), and high band (HB). For example, the PAs in the first PA group may be included in a first RF LB unit 451, a first RF MB unit 453, and a first RF HB unit 455, and the PAs in the second PA group may be included in a second RF LB unit 452, a second RF MB unit 454, and a second RF HB unit 456. Each of the first RF LB unit 451, the first RF MB unit 453, the first RF HB unit 455, the second RF LB unit 452, the second RF MB unit 454, and the second RF HB unit 456 may include a duplexer to separate transmit signals and receive signals from each other. Each of the first RF LB unit 451, the first RF MB unit 453, the first RF HB unit 455, the second RF LB unit 452, the second RF MB unit 454, and the second RF HB unit 456 may be a transmitting/receiving circuit including, e.g., a duplexer, a PA, and a switch.

According to various embodiments, the PAs included in the first RF LB unit 451, the first RF MB unit 453, and the first RF HB unit 455 which are the PAs of the first PA group may amplify signals using power that is output from the first power modulator 411, and the PAs included in the second RF LB unit 452, the second RF MB unit 454, and the second RF HB unit 456 which are the PAs of the second PA group may amplify signals using power that is output from the second power modulator 412. The first power modulator 411 may supply power to at least one PA in the first PA group, and the second power modulator 412 may supply power to at least one PA in the second PA group, thereby allowing for simultaneous use of the PAs in the first PA group and the PAs in the second PA group. As such, uplink CA with two uplink component carriers may be performed by simultaneously using the PAs in the first PA group and the PAs in the second PA group.

According to various embodiments, the RF circuit unit 470 may include a path selector 440. The path selector 440 may include at least one switch that provides switching to the PA groups and switching to the LB, MB, and HB in each PA group. For example, the RF circuit unit 470 may include a first switch 441 to provide switching between the first RF LB unit 451 and the second RF LB unit 452, a second switch 442 to provide switching between the first RF MB unit 453 and the second RF MB unit 454, and a third switch 443 to provide switching between the first RF HB unit 451 and the second RF HB unit 456. The number of switches in the path selector 440 may correspond to the number of PA groups.

According to various embodiments, the RF circuit unit 470 may include a diplexer 461 to separate LB and MB signals. The diplexer 461 may separate LB band signals and MB band signals received through the first antenna 421 or combine LB band signals and MB band transmit signals transferred from the RF circuit unit 470 and transfer the combined signals to the antenna.

According to various embodiments, the transceiver 430 may include at least one programmable gain amplifier (PGA), at least one low noise amplifier (LNA), at least one low pass filter (LPF), at least one switch, and at least one mixer functionally or electrically connected with each of the first RF LB unit 451, the first RF MB unit 453, the first RF HB unit 455, the second RF LB unit 452, the second RF MB unit 454, and the second RF HB unit 456. The transceiver 430 may filter baseband signals output from the communication processor 480 into ones of a bandwidth fitting the communication scheme (e.g., GSM, WCDMA, or LTE) via the LPF, upconvert the baseband signals via a mixer, selectively connect the upconverted signals to a transmit programmable gain amplifier (Tx PGA) via a switch, and adjust the gain of the PGA to change the output power of the upconverted signals. The baseband signals may be in-phase/quadrature (I/Q) signals. The mixer may be a quadrature mixer. The transceiver 430 may amplify signals received through at least one of the first RF LB unit 451, the first RF MB unit 453, the first RF HB unit 455, the second RF LB unit 452, the second RF MB unit 454, or the second RF HB unit 456 via the LNA, and convert the amplified signals into baseband signals via the mixer. The mixer may be a quadrature mixer. The baseband signals (e.g., I/Q signals) may be filtered into ones of a bandwidth fitting the communication scheme via the LPF and be transferred to the communication processor 480 that may then demodulate the received I/Q signals. The transceiver 430 may filter the modulated baseband signals from the communication processor 480 through the LPF, convert the signals into signals of at least one band of the LB, MB, or HB via the mixer, amplify the converted band signals via the Tx PGA, amplify the signals by using at least one PA included in the first RF LB unit 451, the first RF MB unit 453, the first RF HB unit 455, the second RF LB unit 452, the second RF MB unit 454, or the second RF HB unit 456, and transmit the signals through the antenna 420.

According to various embodiments, the communication processor 480 may control the transceiver 430 through a separate interface. The communication processor 480 may control the operation of parts included in the transceiver 430 based on a selected communication method. The communication processor 480 may be connected with parts included in at least one of the first RF LB unit 451, the first RF MB unit 453, the first RF HB unit 455, the second RF LB unit 452, the second RF MB unit 454, or the second RF HB unit 456 separately or jointly via an interface, e.g., mobile industry processor interface (MIPI), and may control each part via such connection. Where the PAs in the first PA group and the PAs in the second PA group support the same band, the communication processor 480 may perform multiple input multiple output (MIMO). For example, when the first RF MB unit 453 and the second RF MB unit 454 both may support B2, the communication processor 480 may perform uplink MIMO in B2.

According to various embodiments, the communication processor 480 may change the operation frequency of the mixer based on the selected band and channel and adjust the gain of the Tx PGA based on the selected transmit output. The communication processor 480 may control at least one of the first power modulator 411 or the second power modulator 412 based on the output power from the RF circuit unit 470. The communication processor 480 may control the voltage output from at least one of the first power modulator 411 or the second power modulator 412. The communication processor 480 may control the voltage output from at least one of the first power modulator or the second power modulator by using any one of an envelope tracking (ET) mode, in which it adjusts voltage depending on the envelope of the transmit signal and supplies it to the PA, an average power tracking (APT) mode, in which it adjusts voltage corresponding to the average transmit power and supplied it to the PA, and a bypass mode, in which it supplies a constant voltage to the PA. The communication processor 480 may control the RF circuit unit 470 and the power unit 410 as per an uplink CA request from a base station (not shown), thereby performing uplink CA. The communication processor 480 may control at least one switch in the path selector 440 according to a combination of CA bands, thereby performing uplink CA or downlink CA.

According to various embodiments, the antenna unit 420 may include two antennas or three or more antennas. The antenna unit 420 may further include at least one diversity antenna. The antenna unit 420 may include a first antenna 421 that is selectively connected with a PA supporting a first frequency band or a second frequency band among the PAs in the first PA group and the PAs in the second PA group and a second antenna 421 that is selectively connected with a PA supporting a second frequency band or a third frequency band among the PAs in the first PA group and the PAs in the second PA group. The first frequency band may be an LB, the second frequency band may be an MB, and the third frequency band may be an HB. The antenna unit 420 may further include a third antenna supporting an LB and an MB and a fourth antenna supporting at least one MB and HB, and the third antenna and the fourth antenna may also receive signals as diversity antennas. Each switch or diplexer in the path selector 440 may be configured to selectively or simultaneously connect each antenna with the transmit/receive paths. The LB may include a frequency band ranging from 600 MHz to 1 GHz. The MB may include a frequency band ranging from 1.5 GHz to 2.2 GHz. The HB may include a frequency band ranging from 1.8 GHz to 5 GHz. The MB and the HB may partially overlap each other.

In FIG. 4, the solid lines indicate signal lines for transmitting transmit/receive signals used for communication, and the dotted lines indicate control lines for transmitting control signals. The thick solid lines are power lines. The electronic device 101 may transmit or receive control signals by using, e.g., an MIPI or GPIO. The communication processor 480 is connected with the first power modulator 411 and the second power modulator 412 included in the power unit 410 via signal lines that are capable of controlling output voltage.

According to various embodiments, an electronic device 101 may comprise an RF circuit unit 170 including a first PA group including at least one power amplifier (PA) and a second PA group including at least one PA, an antenna unit 420 including a first antenna selectively connected with a PA configured to support a first frequency band or a second frequency band among PAs in the first PA group and PAs in the second PA group and a second antenna selectively connected with a PA configured to support the second frequency band or a third frequency band among the PAs in the first PA group and the PAs in the second PA group, a power unit 410 including a first power modulator connected to the first PA group and a second power modulator connected to the second PA group, and a communication processor 480 configured to change an output voltage based on at least part of the transmit power of a PA connected to at least one of the first power modulator and the second power modulator, wherein at least one of the PAs in the first PA group and at least one of the PAs in the second PA group are configured to transmit a signal simultaneously.

According to an embodiment, the communication processor 480 may be configured to simultaneously transmit the signal through one PA of the first PA group and one PA of the second PA group. The PA may have any one band among a low band (LB), middle band (MB), or high band (HB).

According to an embodiment, the communication processor 480 may be configured to activate the second power modulator corresponding to an uplink carrier aggregation (CA) request while performing communication using a PA in the first PA group that is using power output from the first power modulator, and to operate the second PA group to perform an uplink CA operation and communication.

According to an embodiment, each of the PA groups may include an LB PA, an MB PA, and an HB PA. The LB PA may have a frequency ranging from 600 MHz to 1 GHz, the MB PA may have a frequency ranging from 1.5 GHz to 2.2 GHz, and the HB PA may have a frequency ranging from 1.8 GHz to 5 GHz.

According to an embodiment, the communication processor 480 may be configured to control power output from at least one of the first power modulator or the second power modulator by using any one of an envelope tracking mode, in which a voltage is adjusted depending on an envelope of the signal and supplied to the PA, an average power tracking mode, in which the voltage is adjusted corresponding to an average of the respective output power levels of the PAs and supplied to the PA, and a bypass mode, in which a constant voltage is supplied to the PA.

According to an embodiment, the RF circuit unit 170 may include a radio frequency (RF) unit 430 including at least one low pass filter (LPF) configured to change the cutoff frequency of a signal output from the communication processor 480, at least one transmit (Tx) mixer configured to upconvert an in phase/quadrature (I/Q) signal of a baseband and the signal, at least one switch configured to switch a signal output from the Tx mixer to a Tx programmable gain amplifier, and at least one Tx programmable gain amplifier configured to adjust a gain according to the controlled power and provide it to the PA; and a path selector 440 including a PA configured to modulate output power of the signal according to the adjusted gain, at least one duplexer configured to separate a transmitted signal and a received signal, and at least one diplexer configured to separate an LB and an MB.

According to an embodiment, the first antenna may be configured to support an LB corresponding to the first frequency band and an MB corresponding to the second frequency band, and the second antenna may be configured to support the MB corresponding to the second frequency band and an HB corresponding to the third frequency band.

According to an embodiment, an LB PA, an MB PA, and an HB PA in the first PA group may be configured to transmit or receive a communication control signal to/from an external device, and an LB PA, an MB PA, and an HB PA in the second PA group may be configured to transmit or receive data to/from the external device.

According to an embodiment, the communication processor 480 may be configured to receive an I/Q signal to produce a first transmit I/Q signal and a second transmit I/Q signal, and produce a first control signal to control the transceiver and a second control signal to control at least one power modulator of the power unit.

According to an embodiment, the communication processor 480 may be configured to connect the first antenna to any one of PAs supporting an LB, an MB, or an HB in the first PA group through the path selector control signal, to set a power mode of the first power modulator to any one of an envelope tracking mode, an average power tracking mode, or a power modulator via a mode changing control signal among control signals to control the power modulator, to selectively connect the connected PA supporting the LB, MB, or HB to any one of a band pass filter (BPF), a duplexer, or a quadplexer via a switch control signal among control signals to control the RF circuit unit 470 (e.g., Frontend), to set a power mode and bias voltage of the connected PA supporting the LB, MB, or HB via a PA control signal among Frontend control signals, to set the enable/disable of the first power modulator via an enable signal among power modulator control signals, and to set a transmit/receive path as per the connected PA supporting the LB, MB, or HB to the enable.

According to an embodiment, the communication processor 480 may be configured to connect the second antenna to any one of PAs supporting an LB, an MB, or an HB in the second PA group through the path selector control signal, to set a power mode of the second power modulator to any one of an envelope tracking mode, an average power tracking mode, or a power modulator via a mode changing signal among control signals to control the power modulator, to selectively connect the connected PA supporting the LB, MB, or HB to any one of a band pass filter (BPF), a duplexer, or a quadplexer via a switch control signal among Frontend control signals, to set a power mode and bias voltage of the connected PA supporting the LB, MB, or HB via a PA control signal among Frontend control signals, to set the enable/disable of the second power modulator via an enable signal among power modulator control signals, and to set a transmit path as per the connected PA supporting the LB, MB, or HB to the enable.

According to an embodiment, the antenna unit 420 may include a third antenna configured to support an LB and at least one MB, a fourth antenna configured to support at least one MB and an HB, a first switch configured to switch a signal received through the third antenna to the LB or the MB, and a second switch configured to switch a signal received through the fourth antenna to the MB or the HB.

According to an embodiment, the first antenna may be disposed in the lower area of the electronic device, the second antenna may be disposed on the left or right side of the first antenna, the third antenna may be disposed in the upper area of the electronic device, and the fourth antenna may be disposed on the left or right side of the third antenna.

According to various embodiments of the present invention, an electronic device 101 may comprise a power unit 410 including a plurality of power modulators, an antenna unit 420 including a plurality of antennas, a plurality of PA groups including an LB, an MB, and an HB, and an RF circuit unit 170 including a path selector configured to perform switching to each PA group or to the LB, the MB, and the HB included in each PA group, and a communication processor 480 configured to control power output from each power modulator included in the power unit and each switch included in the path selector to control signal transmission and reception through the plurality of antennas.

According to an embodiment, the power unit 410 may have the power modulator configured corresponding to the PA group configured in the RF circuit unit 170.

According to an embodiment, the antenna unit 420 may include a first antenna that is selectively connected with a PA supporting a first frequency band or a second frequency band among the PAs in the first PA group and the PAs in the second PA group, a second antenna that is selectively connected with a PA supporting a second frequency band or a third frequency band among the PAs in the first PA group and the PAs in the second PA group, a third antenna supporting an LB and at least one MB, and a fourth antenna supporting at least one MB and an HB. The third antenna and the fourth antenna may be diversity antennas that may only receive signals.

Figure 5A:
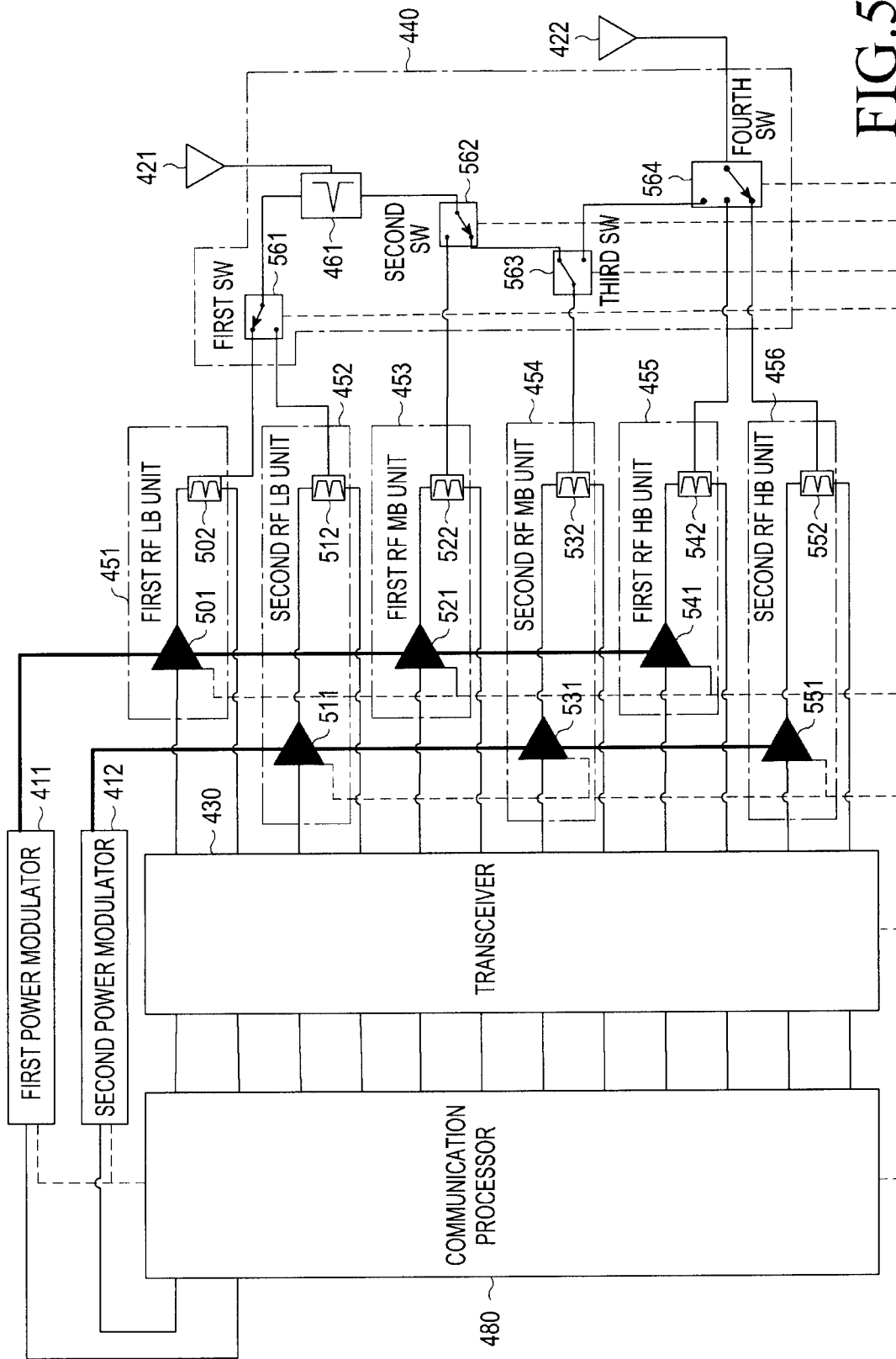
FIG. 5a is a first example view illustrating the electronic device of FIG. 4 in greater detail.
Figure 5B:
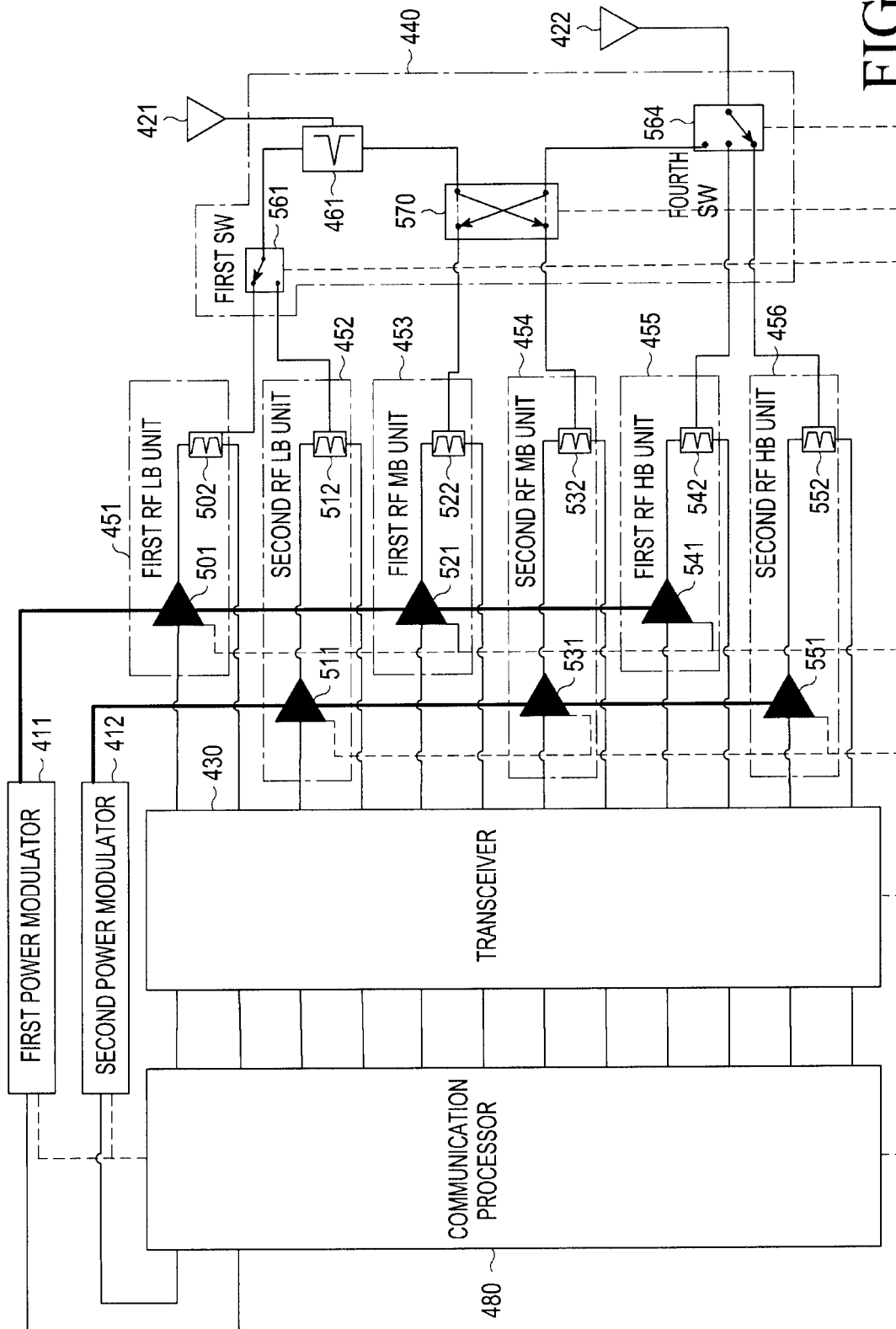
FIG. 5b is a second example view illustrating the electronic device of FIG. 4 in greater detail.
Figure 5C:
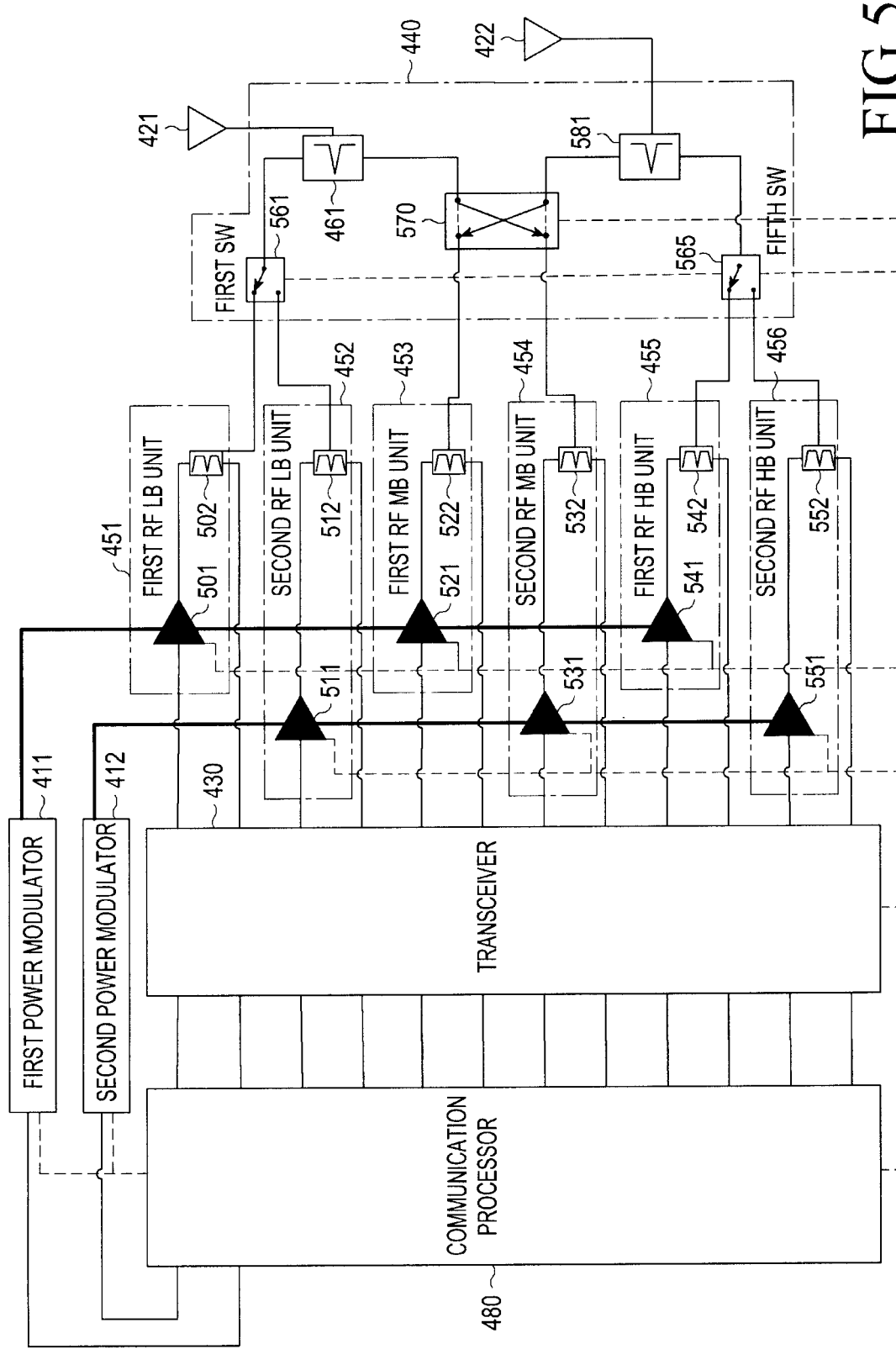
FIG. 5c is a third example view illustrating the electronic device of FIG. 4 in greater detail.

FIG. 5a is a first example view illustrating the electronic device of FIG. 4 in greater detail; FIG. 5b is a second example view illustrating the electronic device of FIG. 4 in greater detail; FIG. 5c is a third example view illustrating the electronic device of FIG. 4 in greater detail.

FIGS. 5a to 5c are views of examples of FIG. 4, and parts overlapping those of FIG. 4 are not described.

Referring to FIG. 5a, the first RF LB unit 451 may include an LB PA 501 and a first duplexer 502, the second RF LB unit 452 may include an LB PA 511 and a second duplexer 512, the first RF MB unit 453 may include an MB PA 521 and a third duplexer 522, the second RF MB unit 454 may include an MB PA 531 and a fourth duplexer 532, the first RF HB unit 455 may include an HB PA 541 and a fifth duplexer 542, and the second RF HB unit 456 may include an HB PA 551 and a sixth duplexer 552. The duplexers 502, 512, 522, 532, 542, and 552 may separate signals of different frequency bands. For example, each duplexer may separate the signals of a transmit frequency band and a receive frequency band included in one communication frequency band.

According to various embodiments, the path selector 440 may include a first switch 561 to switch between the first RF LB unit 451 and the second RF LB unit 452, a second switch 562 to switch between the first RF MB unit 453 and the second RF MB unit 454, a third switch 563 to connect the second RF MB unit 454 and the second switch 562 or connect the second RF MB unit 454 and a fourth switch, and the fourth switch 564 to connect the third switch 563 and the second antenna 422, connect the first RF HB unit 455 and the second antenna 422, and connect the second RF HB unit 456 and the second antenna 422.

According to various embodiments, the first antenna 421 may selectively be connected with a plurality of PAs, and the plurality of PAs may include at least two pairs of PAs. Of the two PA pairs, one pair may support a first frequency band, and the other pair may support a second frequency band. For example, the first antenna 421 may selectively be connected with one pair of PAs supporting the LB and one pair of PAs supporting the MB. The diplexer 461 may be configured between the first antenna 421 and the duplexer. The diplexer 461 may separate signals transmitted or received through the first antenna 421 into an LB band signal and an MB band signal.

According to various embodiments, the second antenna 422 may selectively be connected with a plurality of PAs and may include at least one pair of PAs and another pair of PAs. The first PA pair may support a third frequency band, and the second PA pair may support the second frequency band. For example, one pair of PAs may support the HB, and the other pair of PAs may support the MB. The duplexer between the second antenna 422 and the PA may separate signals transmitted and received in one band supporting the corresponding frequency band. For example, the LB PA-side duplexer may have B5 which is one LB band. The PAs constituting the pair supporting the same frequency band may use different power modulators. For example, one of the pairs of PAs may be connected with the first power modulator 411, and the other may be connected with the second power modulator 412. The PAs 501, 521, and 541 may be used as PAs of a primary component carrier (PCC), and other PAs 511, 531, and 551 may be used as PAs of a secondary component carrier (SCC). Conversely, the PAs 501, 521, and 541 may be used as PAs of the SCC, and the other PAs 511, 531, and 551 may be used as PAs of the PCC.

According to various embodiments, the following operations are based on the assumption that uplink CA is performed through the LB and HB, and LB is PCC, and downlink CA is performed through the LB/MB/HB. The switch 561 connecting the pair of LB PAs connects the first antenna 421 to the PA 501 of the first RF LB unit 451. Since the first power modulator 411 is occupied by the PA 501 of the first RF LB unit 451, the PA 521 of the first RF MB unit 453 and the PA 541 of the first RF HB unit 455 cannot be used. Accordingly, the SCC connects the PA 551 of the second RF HB unit 456 to the second antenna 422. By the above operation, LB and HB uplink CA may be performed. To support LB, MB, and HB downlink CA, one duplexer included in the first RF MB unit 453 or the second RF MB unit 454 is connected to the first antenna 421. Since the MB only involves reception, there may be no limit to the power modulator.

Table 1 below represents a switching operation configuration as per a combination of two-uplink CA and three-downlink CA bands.

TABLE 1

| Uplink CA | Downlink CA | first switch | second switch | third switch | fourth switch |
|---|---|---|---|---|---|
| LB/HB | LB/MB/HB | first RF LB | second RF MB | first antenna | second RF HB |
| LB/MB | LB/MB/HB | first RF LB | second RF MB | first antenna | second RF HB |
| MB/HB | LB/MB/HB | second RF LB | first RF MB | Don't care | second RF HB |
| LB/HB | LB/MB/HB | second RF LB | second RF MB | first antenna | first RF HB |
| LB/MB | LB/MB/HB | second RF LB | first RF MB | Don't care | second RF HB |
| MB/HB | LB/MB/HB | second RF LB | second RF MB | first antenna | first RF HB |
| MB/MB | MB/MB/HB | second RF LB | first RF MB | first antenna | second RF MB |

In Table 1, the bands denoted in bold are bands playing the role of a PCC, and the bands in regular thickness are bands playing the role of an SCC.

As shown in FIG. 5*a* and Table 1, for example, if the first switch 561 is connected to the first RF LB unit 451, the second switch 561 is connected to the second RF MB unit 454, the third switch 563 is connected to the first antenna 421, and the fourth switch 564 is connected to the second RF HB unit 456, as a first example, uplink CA may be performed via the first RF LB unit 451 and the second RF HB unit 456, and downlink CA may be performed via the first RF LB unit 451, the second RF MB unit 454, and the second RF HB unit 456; or as a second example, uplink CA may be performed via the first RF LB unit 451 and the second RF MB unit 454 and downlink CA may be performed via the first RF LB unit 451, the second RF MB unit 453, and the second RF HB unit 452. As set forth above, the present invention may perform two-uplink CA and three-downlink CA as per switching combinations of the first switch to the fourth switch.

Since FIG. 5*b* is the same as FIG. 5*a* except for the swap switch 570, no description of switching combinations is given. The swap switch 570 may connect the diplexer 461 with the first RF MB unit 453 or the diplexer 461 with the second RF MB unit 454. The swap switch 570 may connect the fourth switch 564 with the first RF MB unit 453 or the fourth switch 564 with the second RF MB unit 454. The swap switch 570 may be a combined switch of the second switch 562 and the third switch 563 of FIG. 5*a*.

FIG. 5*c* is a view illustrating an example in which the fourth switch 564 of FIG. 5*b* is replaced with a diplexer 581, and a fifth switch 565 is added. The diplexer 581 may separate signals transmitted or received through the second antenna 422 into a signal as per the MB and a signal as per the HB. The diplexer 581 may be configured between the second antenna 422 and the swap switch 570 or between the second antenna 422 and the fifth switch 565. The fifth switch 565 may connect the diplexer 581 with the first RF HB unit 455 or the diplexer 581 with the second RF HB unit 456.

Figure 6:
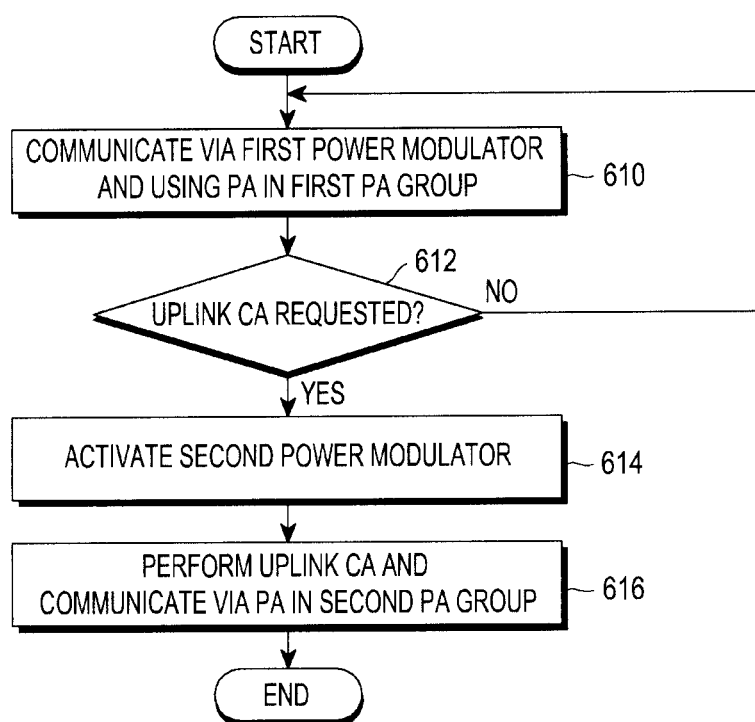
FIG. 6 is a flowchart illustrating a process for performing uplink CA according to various embodiments of the present invention.

FIG. 6 is a flowchart illustrating a process for performing uplink CA according to various embodiments of the present invention.

Now described in detail with reference to FIG. 6 is a process for performing uplink CA according to various embodiments of the present invention.

According to various embodiments, the electronic device 101 may perform communication through the PA in the first PA group via the first power modulator (610). The electronic device 101 may perform communication through the PA in the first PA group by using power that is output from the first power modulator 411 configured in the power unit 410. The electronic device may set the mode of power output from the first power modulator 411 to any one of the envelope tracking mode, average power tracking mode, or bypass mode and may provide power as per the set mode to the PA in the first PA group (e.g., any one of the PAs supporting the LB, MB, or HB).

According to various embodiments, when an uplink CA request occurs (612), the electronic device 101 may activate the second power modulator (614). The electronic device 101 may determine whether the uplink CA request occurs while communication is performed in operation 610. The electronic device 101 may receive, from the base station, a signal to permit communication through a PA in at least one PA group (e.g., the second PA group) other than the first PA group. When the uplink CA request occurs, the electronic device 101 may determine that communication may be performed through two-uplink CA. Upon intending to perform communication via the two-uplink CA, the electronic device 101 may activate the second power modulator in the power unit 410. The electronic device may set the mode of power output from the second power modulator 412 to any one of the envelope tracking mode, average power tracking mode, or bypass mode and provide power as per the set mode to the PA in the second PA group (e.g., any one of the PAs supporting the LB, MB, or HB). The electronic device 101 may control power output from at least one of the first power modulator 411 or the second power modulator 412 by using at least one of the envelope tracking mode, the average power tracking mode, or the bypass mode.

According to various embodiments, the electronic device 101 may perform communication by fulfilling the uplink CA operation through the PA in the second PA group (616). The electronic device 101 may additionally operate the PA in the second PA group while performing communication through the PA in the first PA group, performing uplink CA operation and performing communication. The electronic device 101 may perform uplink CA including two uplink component carriers by using the PA in the first PA group and the PA in the second PA group.

According to various embodiments of the present invention, a method for transmitting or receiving a signal by an electronic device 101 may comprise performing communication through a PA in a first PA group using power that is output from a first power modulator configured in a power unit, detecting an uplink CA request, operating PAs of a second PA group by activating a second power modulator configured in the power unit corresponding to the detected request, and controlling transmission of a signal through a PA in the second PA group while performing the communication.

According to an embodiment, the method may further comprise selectively connecting a PA configured to support a first frequency band or a second frequency band among PAs in the first PA group and PAs in the second PA group with a first antenna and selectively connecting a PA configured to support the second frequency band or a third frequency band among the PAs in the first PA group and the PAs in the second PA group with a second antenna.

According to an embodiment, controlling signal transmission and reception may include controlling the power output from at least one of the first power modulator or the second power modulator.

According to an embodiment, controlling signal transmission and reception may include simultaneously transmitting the signal through one PA of the first PA group and one PA of the second PA group.

According to an embodiment, controlling the power may include controlling power output from at least one of the first power modulator or the second power modulator by using any one of an envelope tracking mode, in which a voltage is adjusted depending on an envelope of the signal and supplied to the PA, an average power tracking mode, in which the voltage is adjusted corresponding to an average of the respective output power levels of the PAs and supplied to the PA, and a bypass mode, in which a constant voltage is supplied to the PA.

According to an embodiment, operating the second PA group may include producing a first transmit I/Q signal and a second transmit I/Q signal corresponding to the reception of an I/Q signal, operating the second PA group to produce a control signal to control signal transmission and reception and a control signal to control at least one power modulator of the power unit.

According to an embodiment, operating the second PA group may include changing a cutoff frequency of the signal, upconverting the signal and a baseband I/Q signal, switching the upconverted signal to a transmit (Tx) programmable gain amplifier (PGA), adjusting the gain of the signal, and modulating the output power of the signal through the PA in the second PA group based on the adjusted gain.

According to an embodiment, producing the control signal may include connecting the first antenna to any one of PAs, supporting the LB, MB, or HB, in the first PA group through the produced control signal, setting the power mode of the first power modulator to any one of the envelope tracking mode, average power tracking mode, or bypass mode, selectively connecting the connected PA supporting the LB, MB, or HB to any one of a BPF, a duplexer, or a quadplexer, setting the power mode and bias voltage of the connected PA supporting the LB, MB, or HB, and the enable/disable of the first power modulator, and setting the transmit/receive path as per the connected PA supporting the LB, MB, or HB, to enable.

According to an embodiment, producing the control signal may include connecting the second antenna to any one of PAs, supporting the LB, MB, or HB, in the second PA group through the produced control signal, setting the power mode of the second power modulator to any one of the envelope tracking mode, average power tracking mode, or bypass mode, selectively connecting the connected PA supporting the LB, MB, or HB to any one of a BPF, a duplexer, or a quadplexer, setting the power mode and bias voltage of the connected PA supporting the LB, MB, or HB, and the enable/disable of the first power modulator, and setting the transmit path as per the connected PA supporting the LB, MB, or HB, to enable.

According to an embodiment, controlling the signal transmission and reception may include switching to each PA group or switching to the LB, MB, and HB included in each PA group, controlling power output from each power modulator included in the power unit, and controlling each switch included in the path selector to control signal transmission and reception through a plurality of antennas.

According to an embodiment, detecting the uplink request may include receiving, from a base station, a signal to permit performing communication through the PA in the second PA group while communicating through the PA in the first PA group and performing communication with the base station through the PA in the second PA group based on the received signal.

Figure 7:
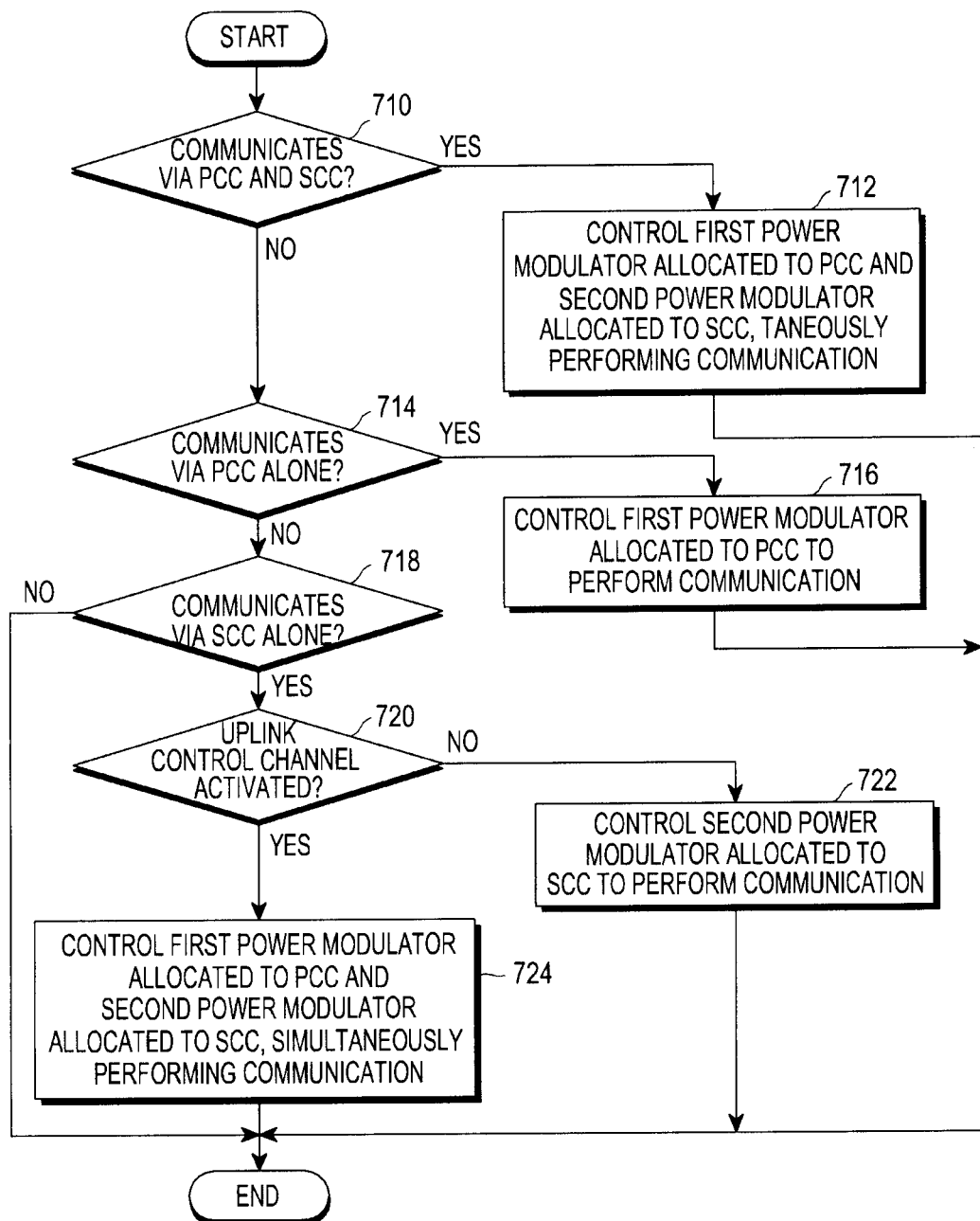
FIG. 7 is a flowchart illustrating a process for controlling power in a communication state according to an embodiment of the present invention.

FIG. 7 is a flowchart illustrating a process for controlling power in a communication state according to an embodiment of the present invention.

Now described in detail with reference to FIG. 7 is a process for controlling power in a communication state according to an embodiment of the present invention.

According to various embodiments, if communication is performed via the PCC and SCC (710), the electronic device 101 may control the first power modulator allocated to the PCC and the second power modulator allocated to the SCC, thereby performing simultaneous communication (712). When communication is performed through the PA in the PCC and the PA in the SCC, the electronic device 101 may control power output from the first power modulator as per any one mode among the envelope tracking mode, average power tracking mode, or bypass mode, and provide the controlled power to the PA in the PCC (e.g., any one of the PAs supporting the LB, MB, or HB). The electronic device 101 may control power output from the second power modulator as per any one mode among the envelope tracking mode, average power tracking mode, or bypass mode, and provide the controlled power to the PA in the SCC (e.g., any one of the PAs supporting the LB, MB, or HB). The electronic device 101 may provide the outputs controlled by the power modulators to the PAs in the corresponding PA groups, simultaneously performing two-uplink CA and three-downlink CA. As such, the electronic device 101 may control power output from at least one of the first power modulator or the second power modulator by using at least one of the envelope tracking mode, the average power tracking mode, or the bypass mode. When three or more power modulators are configured, and three or more PA groups are configured, the electronic device 101 may control power output from each power modulator and provide the power to any one of the PCC or SCC.

According to various embodiments, upon performing data communication using the PCC alone (714), the electronic device 101 may control the first power modulator allocated to the PCC, performing communication (716). Upon performing communication by using only the PCC between the PCC and the SCC, the electronic device 101 may control the first power modulator allocated to the PCC to perform communication and deactivate the second power modulator allocated to the SCC to prevent power from being supplied to the SCC.

According to various embodiments, when it is not the case where data communication is performed using the PCC alone (714), the electronic device 101 may determine whether data communication is performed using the SCC alone (718).

According to various embodiments, when data communication is performed using the SCC alone in step 718, it may be determined whether the uplink control channel is activated (720). When data communication is not performed using the PCC alone but performed only using the SCC, the electronic device 101 may determine whether to activate the uplink control channel.

According to various embodiments, when the uplink control channel is not activated in step 720, the electronic device 101 may control the second communication module allocated to the SCC and perform data communication (722). If the uplink control channel is activated, the electronic device 101 may activate the first power modulator and the second power modulator in the power unit 410, transmit uplink control channel signals through the PCC, and perform data communication through the SCC.

According to various embodiments, when the uplink control channel is activated in step 720, the electronic device 101 may control the first power modulator allocated to the PCC and control the second power modulator allocated to the SCC, simultaneously performing communication (724). The PCC may stand for 'primary component carrier', and the SCC may stand for 'secondary component carrier'.

Figure 8:
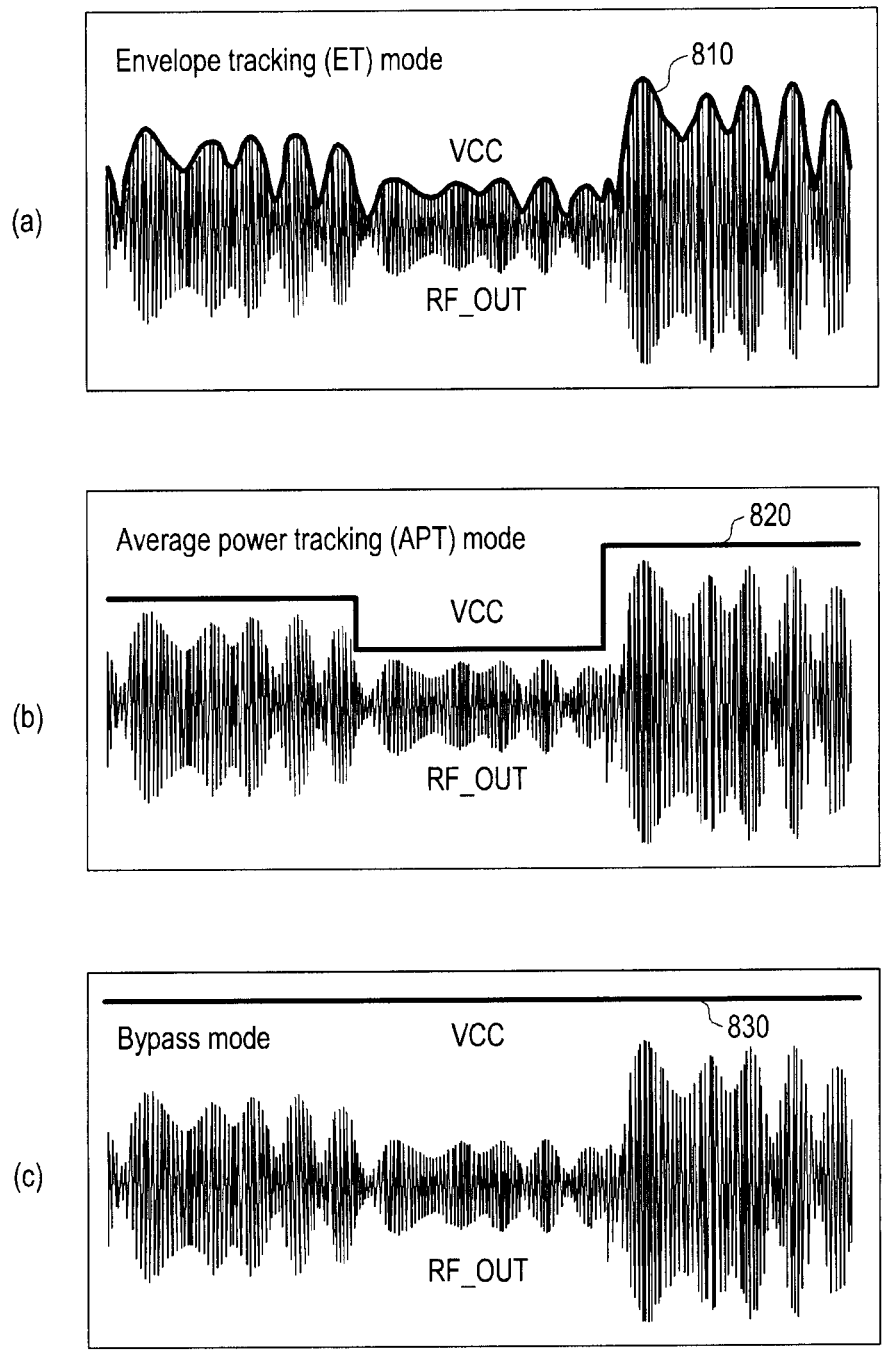
FIG. 8(a) is a view illustrating an example of controlling output power of a power modulator as per an envelope tracking mode according to an embodiment of the present invention.
FIG. 8(b) is a view illustrating an example of controlling output power of a power modulator as per a average power tracking mode according to an embodiment of the present invention.
FIG. 8(c) is a view illustrating an example of controlling output power of a power modulator as per a bypass mode according to an embodiment of the present invention.

FIG. 8(*a*) is a view illustrating an example of controlling the output power of a power modulator as per an envelope tracking mode according to an embodiment of the present invention. FIG. 8(*b*) is a view illustrating an example of controlling the output power of a power modulator as per a mean power tracking mode according to an embodiment of the present invention. FIG. 8(*c*) is a view illustrating an example of controlling the output power of a power modulator as per a bypass mode according to an embodiment of the present invention.

Referring to FIG. 8(*a*), the envelope tracking mode is a mode in which the voltage supplied to the PA is controlled and supplied as per the envelope 810 of the transmit signal. Since voltage is supplied according to the PA output power, power usage efficiency is increased. In other words, the usage efficiency of the PA is elevated. However, the operation of changing the voltage as per the envelope 810 of the transmit signal requires additional current consumption, thus reducing the power production efficiency. Thus, the envelope tracking mode may be used when the current reduced by the PA usage efficiency is more than the current additionally consumed by the power production efficiency. For example, the envelope tracking mode may be used when the PA output is high (e.g., high power of 20 dBm or more).

Referring to FIG. 8(*b*), the average power tracking mode is a mode in which voltage is controlled and supplied to the PA fitting the average 820 of the transmit output power. The average power tracking mode, as compared with the envelope tracking mode, may have a lower PA use efficiency but higher power production efficiency. For this reason, if the average power tracking mode is used for mid-band PA output (e.g., low power less than 20 dBm), current consumption may effectively be reduced.

Referring to FIG. 8(*c*), the bypass mode is a mode for supplying a constant voltage 830 (e.g., battery voltage) regardless of transmit output. When an enhancement in the PA use efficiency is tiny despite using the envelope tracking mode or average power tracking mode or more current consumption may instead occur due to APT mode driving, for example, when the output voltage of the PA is close to the battery voltage, the bypass mode may be used. In another embodiment, the bypass mode may not be used.

According to various embodiments, the electronic device 101 may control power output from each power modulator according to any one of the above-described envelope tracking mode, average power tracking mode, or bypass mode and provide the controlled power to the PA.

Figure 9:
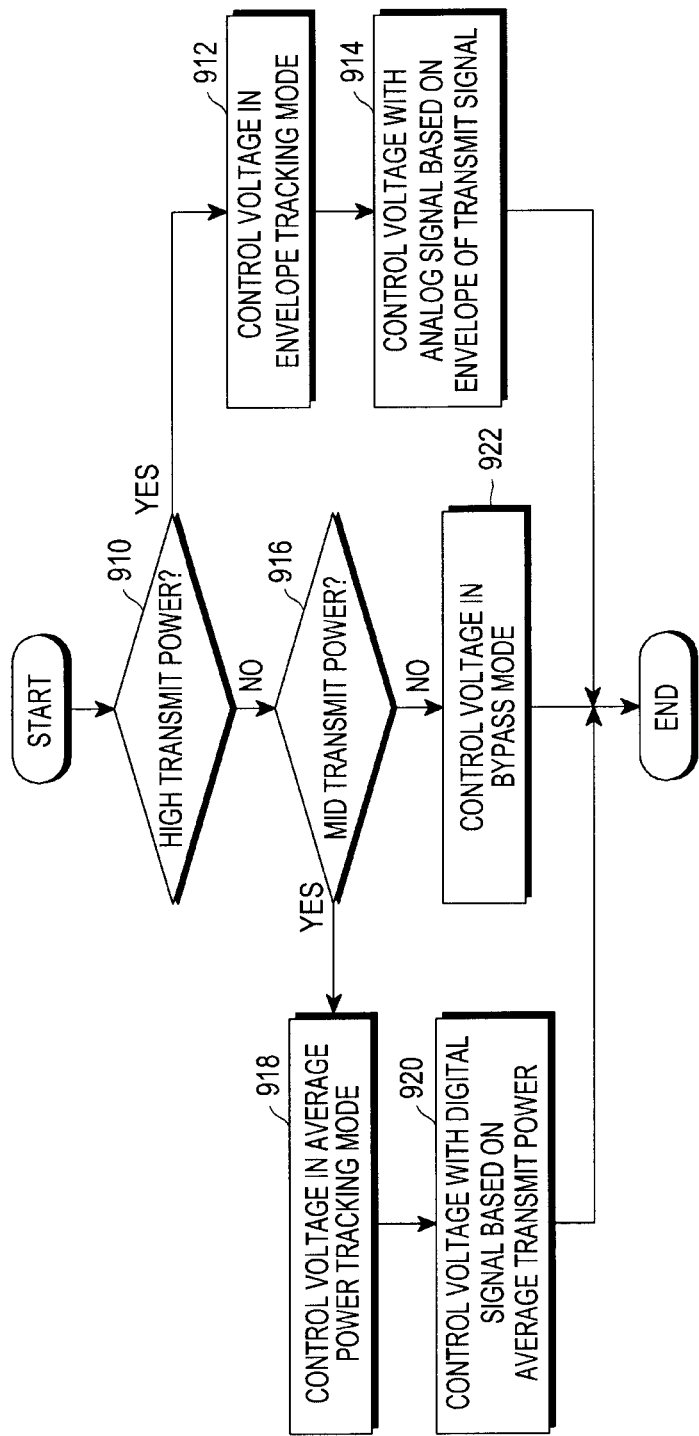
FIG. 9 is a flowchart illustrating a process for controlling output power of a power modulator according to an embodiment of the present invention.

FIG. 9 is a flowchart illustrating a process for controlling the output power of a power modulator according to an embodiment of the present invention.

Now described in detail with reference to FIG. 9 is a process for controlling power output from a power modulator according to an embodiment of the present invention.

According to various embodiments, upon transmitting a signal at a high transmit power (910), the electronic device 101 may control the voltage in the envelope tracking mode (912). The electronic device may control the power output from the power modulator as per the envelope tracking mode.

According to various embodiments, the electronic device 101 may control voltage with an analog signal based on the envelope of the transmitted signal. Upon transmitting the signal at a mid transmit power rather than the high transmit power in step 910, the electronic device 101 may control voltage in the average power tracking mode (918).

According to various embodiments, the electronic device 101 may control voltage with a digital signal based on the average transmit power (920). When the signal is not transmitted at the mid transmit power in step 916, the electronic device 101 may control voltage in bypass mode (922).

As set forth above, the electronic device 101 may adjust the voltage output from the power modulator as per the transmit power of the PA in any (or at least) one of the envelope tracking mode, average power tracking mode, or bypass mode and provide the adjusted voltage to the PA. To that end, the electronic device 101 generates a control signal to control the voltage output from the power modulator. For example, when the PA operates at a high transmit power, the processor 120 sets the mode of the power modulator to the envelope tracking mode via the MIPI. The processor 120 generates a voltage signal (e.g., an analog signal) proportional to the envelope of the transmit signal and transfers the voltage signal to the power modulator. The power modulator may determine the output voltage partially based on the voltage signal. The processor 120 may transfer additional information about the output voltage through the MIPI to the power modulator. When the power modulator is operated in the average power tracking mode, the processor 120 may set the mode of the power modulator to the average power tracking mode, and the voltage control signal based on the average transmit output power may be delivered through the MIPI to the power modulator. The power modulator outputs the voltage based on the delivered voltage control signal. According to another embodiment, the output voltage control signals as per the average power tracking mode and the envelope tracking mode may both be analog signals or digital signals. In the envelope tracking mode, the power modulator may be voltage-controlled in an analog form, and in the average power tracking mode, the power modulator may be voltage-controlled in a digital form.

Figure 10:
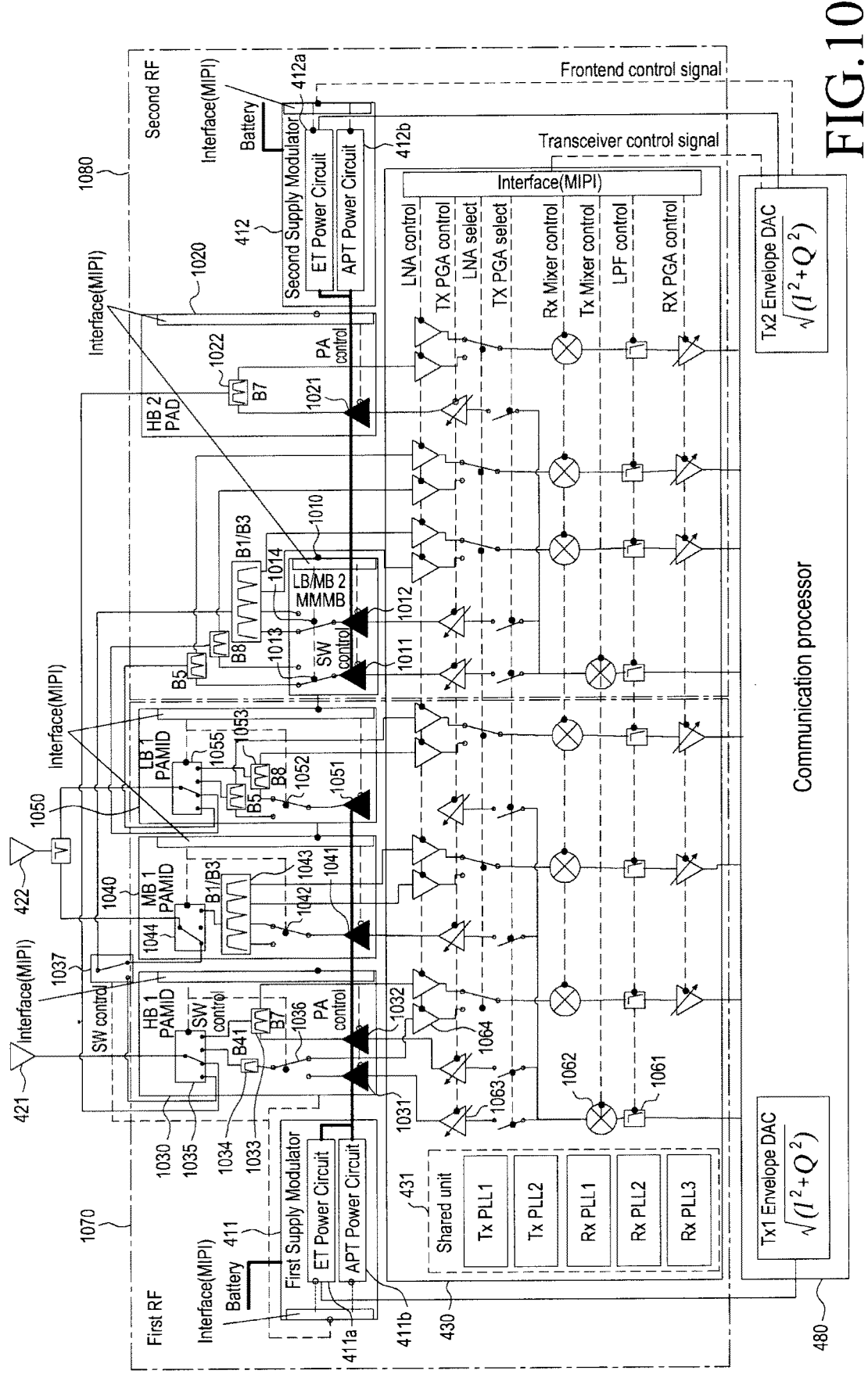
FIG. 10 is a circuit diagram illustrating an example electronic device according to an embodiment of the present invention.

FIG. 10 is a circuit diagram illustrating an example electronic device according to an embodiment of the present invention.

Referring to FIG. 10, the electronic device 101 may include a communication processor 480, an RF circuit unit 470, an antenna unit 420, and a power unit 410. The power unit 410 may include a first power modulator 411 and a second power modulator 412. The RF circuit unit 470 may include a transceiver 430, a first RF 1070, and a second RF 1080. Although not shown, the electronic device 101 may further include a diversity unit (not shown) including a receiving circuit, a third antenna supporting an LB and at least one MB, and a fourth antenna supporting at least one MB and an HB. The third antenna and the fourth antenna may be diversity antennas.

According to various embodiments, the first power modulator 411 may be included in or provided separately from the first RF 1070, and the second power modulator 412 may be included in or provided separately from the second RF 1080. The first power modulator 411 and the second power modulator 412 may include envelope tracking power control circuits 411a and 412a to control power output as per the envelope tracking mode and average power tracking power control circuits 411b and 412b to control power output as per the average power tracking mode. The first power modulator 411 and the second power modulator 412 may include an interface to receive control signals through the MIPI from the communication processor 480.

According to various embodiments, the communication processor 480 may receive an I/Q signal, produce a first transmit I/Q signal and a second transmit I/Q signal, and produce a first control signal to control the RF circuit unit 470 and a second control signal to control at least one power modulator of the power unit 410.

According to various embodiments, the communication processor 480 may connect the first antenna to any one of PAs, supporting the LB, MB, or HB, in the first PA group through the produced first control signal, set the power mode of the first power modulator to any one of the envelope tracking mode, average power tracking mode, or bypass mode, selectively connect the connected PA supporting the LB, MB, or HB to any one of a BPF, a duplexer, or a quadplexer, set the power mode and bias voltage of the connected PA supporting the LB, MB, or HB, and the enable/disable of the first power modulator, and set the transmit/receive path as per the connected PA supporting the LB, MB, or HB, to enable.

According to various embodiments, the communication processor 480 may connect the second antenna to any one of PAs, supporting the LB, MB, or HB, in the second PA group through the produced second control signal, set the power mode of the second power modulator to any one of the envelope tracking mode, average power tracking mode, or bypass mode, selectively connect the connected PA supporting the LB, MB, or HB to any one of a BPF, a duplexer, or a quadplexer, set the power mode and bias voltage of the connected PA supporting the LB, MB, or HB, and the enable/disable of the first power modulator, and set the transmit path as per the connected PA supporting the LB, MB, or HB, to enable.

According to various embodiments, the communication processor 480 may receive baseband signals (e.g., I/Q signals) through the RF circuit unit 470 and demodulate the received I/Q signals. The communication processor 480 delivers data-demodulated I/Q signals to the RF circuit unit 470. The I/Q signals delivered to the RF circuit unit 470 are converted into RF band signals via the LPF and mixer. The converted RF band signals are amplified by the PGA and are then transferred to the PA.

According to various embodiments, the RF circuit unit 470 may include a transceiver 430, a first RF 1070, and a second RF 1080. The transceiver 430 may include an interface to receive control signals through the MIPI from the communication processor 480 and may include a switch, an LNA, a PGA, a mixer, and an LPF to transmit and receive signals to/from the PAs in the first RF 1070 and the PAs in the second RF 1080. The transceiver 430 may include at least one LPF to change the cut-off frequency of signals output from the communication processor 480, at least one transmit (Tx) mixer to upcovert the signals and baseband I/Q signals, at least one switch to switch signals output from the Tx mixer to a transmit gain adjuster, and at least one transmit gain adjuster to adjust gain as per the controlled power and provide it to the PA. The transceiver 430 may include a shared unit 431 including at least one Tx phase-locked loop (PLL) and at least one Rx PLL shared by the first RF 1070 and the second RF 1080.

According to various embodiments, the RF circuit unit 470 may include a first PA group (e.g., the first RF) including at least one PA and a second PA group (e.g., the second RF) including at least one PA. The PA may be any one of PAs supporting an LB, an MB, or an HB. The LB may be a PA with a frequency ranging from 600 MHz to 1 GHz, the MB may be a PA with a frequency ranging from 1.5 GHz to 2.2 GHz, and the HB may be a PA with a frequency ranging from 1.8 GHz to 5 GHz. The RF circuit unit 470 may include a path selector including at least one diplexer to separate LB and MB signals, at least one duplexer to separate transmitted and received signals, and a PA to amplify output signals as per the gain adjusted in the transceiver 430.

According to various embodiments, the PA and the duplexer may be modularized. For example, the HB 2 1020 of the second RF 1080 may be configured in a module including the PA 1021 and the duplexer 1022, which may be called a power amplifier including duplexer (PAD). Switches and a plurality of PAs supporting other frequency bands may be modularized. For example, The LB/MB2 1010 of the second RF 1080 may be configured in a module including the PA 1011 supporting the LB band, the PA 1012 supporting the MB band, and the switches 1013 and 1014 selectively connecting to the output port, which may be called a multi-mode multi-band (MMMB) PA. Each PA may amplify signals as per various communication standards (e.g., LTE or UMTS).

According to various embodiments, the PA and the switch duplexer may be modularized. For example, the HB1 1030 of the first RF 1070 may be configured in a module including the switch 1037 to selectively connect the first antenna 421 to the internal duplexer 1033 or external input, a plurality of BPFs 1034 supporting other bands, PAs 1031 and 1032, and switches 1035 and 1036 to selectively connect the PA and the duplexer. The MB1 1040 of the first RF 1070 may be configured in a module including the switch 1037 to selectively connect the second antenna 422 to the external input, the quadplexer 1043, the PA 1041, the switch 1042 to selectively connect the PA 1041 and the quadplexer 1043, and the switch 1044 to selectively connect the second antenna and the quadplexer 1043. The LB1 1050 of the first RF 1070 may be configured in a module including the switch 1037 to selectively connect the second antenna 422 to the internal duplexer 1053 or the external input, the PA 051, the switch 1052 to selectively connect the PA and the duplexer, and the switch 1055 to selectively connect the second antenna and the duplexer 1053.

For example, when the TDD is supported, a switch may be further included to selectively connect the BPF to the Rx port (connected with the LNA) of the transceiver 430 or the PA. For example, the HB1 1030 of the first RF 1070 may further include a B41 1034 which is a TDD, which may be called a power amplifier module include duplexer (PAMID).

According to various embodiments, each module may be formed as a module supporting the LB/MB/HB. Such modularization may save parts. For example, parts with similar frequency characteristics may be shared by modularizing parts with similar frequency bands. Further, the space for mounting may be reduced. Further, design sharing may be possible for electronic devices. For example, the LB1 1050 may be modularized (PAMID) with B5/B8 band parts, the MB1 1040 may be modularized with B1/B3 band parts, and the HB1 1030 may be modularized with B7/B41 band parts. In using each module, other combinations may be configured as well. For example, all may be configured in a PAMID or in a combination of a PAMID, MMMB, and PAD, which may be determined depending on design utility.

According to various embodiments, control signals (e.g., frontend control signals) generated by the communication processor 480 may include control signals to control the PA and switch in the PAMID through the MIPI, control signals to control the PA and switch in the MMMB, control signals to control the PA in the PAD, control signals to control the first power modulator, control signals to control the second power modulator, control signals to control switches, and control signals to control each switch. A GPIO may be connected to the communication processor 480 via a separate control signal.

The control signal to control the switch in the PAMID may connect the duplexer to the transmit/receive path or the external input and the input/output port (e.g., antenna connection part) of the PAMID as per selected bands. The control signal to control the PA in the PAMID may perform control, such as PA power mode, bias voltage, and enable/disable, depending on determined transmit power/whether it is used. The PA power mode may be set to a high power mode if the determined transmit output is high and to a low power mode if the determined transmit output is low. In low power mode, a low-power amplifier may be used to output signals. In high power mode, a PA-embedded, high-power amplifier may be used to output signals. The low-power amplifier and the high-power amplifier may be connected in series. The high-power amplifier may be positioned at the series termination. In high-power mode, the two series-connected amplifiers may be operated together, as the overall gain, presenting the sum of the respective gains of the two amplifiers. In the series-connected state, the high-power amplifier may be bypassed and used in low-power mode. The bypass voltage may be controlled as per the determined output power/gain.

The control signal to control the switch in the MMMB may selectively connect to the output port as per a selected band. The control signal to control the PA in the MMMB may perform control, such as PA power mode, bias voltage, and enable/disable, depending on determined transmit power/whether it is used. The control signal to control the PA in the PAD performs control, such as PA power mode, bias voltage, and enable/disable, depending on the determined transmit power/whether it is used.

The first power modulator and second power modulator control signals may allow the power modulators to select to operate in the envelope tracking mode, average power tracking mode, or bypass mode. The output voltage and current and average power tracking mode/envelope tracking mode operation-related control may be performed. Upon controlling to allow the first and second power modulators to operate in the envelope tracking mode, a control voltage proportional to the first Tx envelope and the second Tx envelope may be provided through the DAC to the envelope tracking power control circuit. The envelope tracking power control circuit may control output voltage as per the received control voltage. The envelope of the signal output from the communication processor 480 may be obtained from Equation 1 below.

$$\text{Amplitude}(\sqrt{(I^2+Q^2)}) \qquad \text{[Equation 1]}$$

When the power modulator operates in the average power tracking mode, the communication processor 480 may deliver the corresponding voltage value to the average power tracking power control circuit based on the mean output power through the control signal (MIPI). The average power tracking power control circuit may control output voltage as per the received voltage value. According to another embodiment, the communication processor 480 may transfer the mean output power through the control signal to the average power tracking power control circuit, and the average power tracking power control circuit may output the corresponding voltage based on the mean output power.

The first and second power modulators may operate in the envelope tracking mode, average power tracking mode, or bypass mode depending on the output power of their respective connected PAs. For example, if the PA connected to the first power modulator operates at high power, and the PA connected to the second power modulator operates at mid power, the first power modulator may operate in the envelope tracking mode, and the second power modulator may operate in the average power tracking mode.

The switch control signal connected to the switch may control to selectively connect the MB quadplexer to the external input of the HB1 PAMID or the external input of the MB1 PAMID as per the uplink CA scheme.

The transceiver 430 may receive, from the communication processor 480, the LNA control signal, Tx PGA control signal, LNA selection control signal, Rx mixer control signal, Tx mixer control signal, LPF control signal, Rx PGA control signal, Tx PLL control signal (not shown), and Rx PLL control signal (not shown), which are generated by the communication processor 480. Although the control signals are represented as being jointly connected to parts of the same type in the drawings for ease of description, this is merely an example, and the control signals may separately be connected and controlled.

The LNA control signal may perform control, such as LNA enable/disable/bypass. The Tx PGA control signal may change the gain of the Tx PGA according to the determined transmit power and may perform control, such as enable/disable, depending on whether it is used. The Tx PGA selection signal may connect a Tx PGA supporting a communication frequency band to the Tx mixer based on the frequency band. The LNA selection control signal may connect an LNA supporting a communication frequency band to the mixer based on the frequency band. The Tx mixer control signal may control, e.g., enable/disable or mixer gain. The Tx mixer may mix the transmit frequency signal generated by the Tx PLL and the baseband I/Q signal, producing a transmit signal. The Rx mixer control signal may control, e.g., enable/disable or mixer gain. The Rx mixer may mix the receive frequency signal generated by the Rx PLL and the receive signal, producing a baseband I/Q signal. The LPF control signal may change the cut-off frequency depending on the used communication standard (e.g., LTE, WCDMA, or GSM). The Rx PGA control signal may control the gain of the Rx PGA depending on the strength of the received signal. Enable/disable may be controlled depending on whether it is used.

The shared unit 431 may produce a first Tx PLL control signal, a second Tx PLL control signal, a first Rx PLL control signal, a second Rx PLL control signal, and a third Rx PLL control signal which are shared by the first RF 1070 and the second RF 1080. The Tx PLL control signal may generate a transmit frequency signal of the communication frequency band. The generated transmit frequency signal is supplied to the mixer. When the electronic device supports uplink CA, the transceiver 430 may include a plurality of Tx PLLs and may selectively supply a plurality of transmit frequencies to the Tx mixers. For example, referring to FIG. 10, since two-uplink CA is supported, the first Tx PLL and the second Tx PLL are included. The Rx PLL control signal may generate a receive frequency signal of the communication frequency band. The generated receive frequency signal is supplied to the mixer. When the electronic device supports downlink CA, the transceiver 430 may include a plurality of Rx PLLs and may selectively supply a plurality of receive frequencies to the Rx mixers. Referring to FIG. 10, since three-downlink CA is supported, the first Rx PLL, the second Rx PLL, and the third Rx PLL are included. According to another embodiment, the PLL may be used regardless of Rx/Tx.

Figure 11:
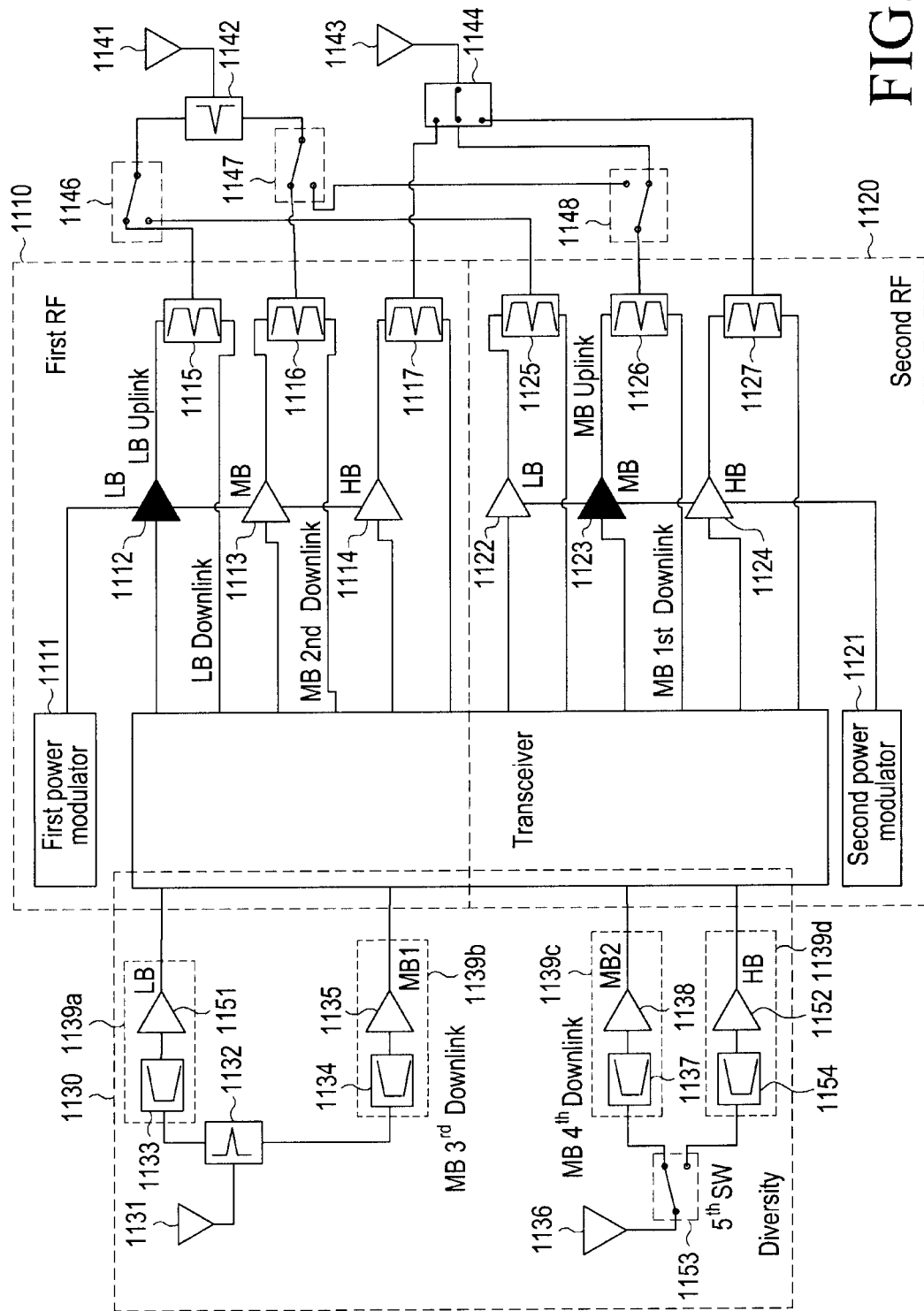
FIG. 11 is a block diagram illustrating an example of performing uplink CA with two diversity antennas according to the present invention.

FIG. 11 is a block diagram illustrating an example of performing uplink CA with two diversity antennas according to the present invention.

Referring to FIG. 11, a diversity unit 1130 is added to the structure of FIG. 5a, allowing two-uplink CA and $4^{th}$-order diversity to simultaneously be performed. What overlaps FIG. 5a is not repeatedly described. The diversity unit 1130 may include a third antenna 1131 and a fourth antenna 1136. The third antenna 1131 may be connected to an RF diversity LB unit 1139a including a first bandpass filter 1133 and an LB 1151 and a first RF diversity MB unit 1139b including a second bandpass filter 1134 and a first MB 1135, and the fourth antenna 1136 may be connected to a second RF diversity MB unit 1139c including a third bandpass filter 1137 and a second MB 1138 and a second RF diversity HB unit 1139d including a fourth bandpass filter 1154 and an HB 1152. The diversity unit 1130 may function to receive signals from a base station to enhance the quality of signals received from the base station. The diversity unit 1130 may include a second diplexer 1132 to transfer signals to the RF diversity LB unit 1139a and the first RF diversity MB unit 1139b as per the band of the signal received through the third antenna 1131. The RF diversity LB unit 1139a may include the first bandpass filter 1133 to provide signals output from the second diplexer 1132 to the LNA, and the first RF diversity MB unit 1139b may include the second bandpass filter 1134 to provide signals output from the second diplexer 1132 to the first MB 1135. The diversity unit 1130 may include a fifth switch 1153 to switch to the second MB 1138 and the HB 1152 depending on the band of the signal received through the fourth antenna 1136.

Signal reception is described. It is first assumed that the first switch 1146 connects the first diplexer 1142 and the first duplexer 1115 of the first RF 1110, the second switch 1147 connects the first diplexer 1142 and the second duplexer 1116 of the first RF 1110, the third switch 1144 connects the second antenna 1143 and the fourth switch 1148, the fourth switch 1148 connects the third switch 1144 and the second duplexer 1126 of the second RF 1120, and the fifth switch 1153 connects the fourth antenna 1136 and the third bandpass filter 1137. In this case, there may be a first example in which the received signal passes through the first antenna 1141, the first diplexer 1142, and the first duplexer 1115 of the first RF, a second example in which the received signal passes through the first antenna 1141, the first diplexer 1142, and the second duplexer 1116 of the first RF, a third example in which the received signal passes through the second antenna 1143, the third switch 1144, the fourth switch 1148, and the second duplexer 1126 of the second RF, a fourth example in which the received signal passes through the third antenna 1131 of the diversity unit 1130, the second diplexer 1132, and the second bandpass filter 1134, and a fifth example in which the received signal passes through the fourth antenna 1136 of the diversity unit 1130, the fifth switch 1153, and the third bandpass filter 1137. The electronic device 101 may simultaneously perform the first, second, third, fourth, and fifth examples, simultaneously receiving the signals.

Signal transmission is described. There may be a first example in which a signal output from the transceiver is transmitted, by the voltage output from the first power modulator 1111, through the LB PA 1112 of the first RF 1110, the first bandpass filter 1115 of the first RF, the first switch 1146, and the first diplexer 1142, and then through the first antenna 1141 and a second example in which the signal is transmitted, by the voltage output from the second power modulator 1121, through the MB PA 1123 of the second RF 1120, the second bandpass filter 1126 of the second RF, the fourth switch 1148, and the third switch 1144 and then the first antenna 1141. The electronic device 101 may simultaneously perform the first and second examples, simultaneously transmitting the signals.

Figure 12:
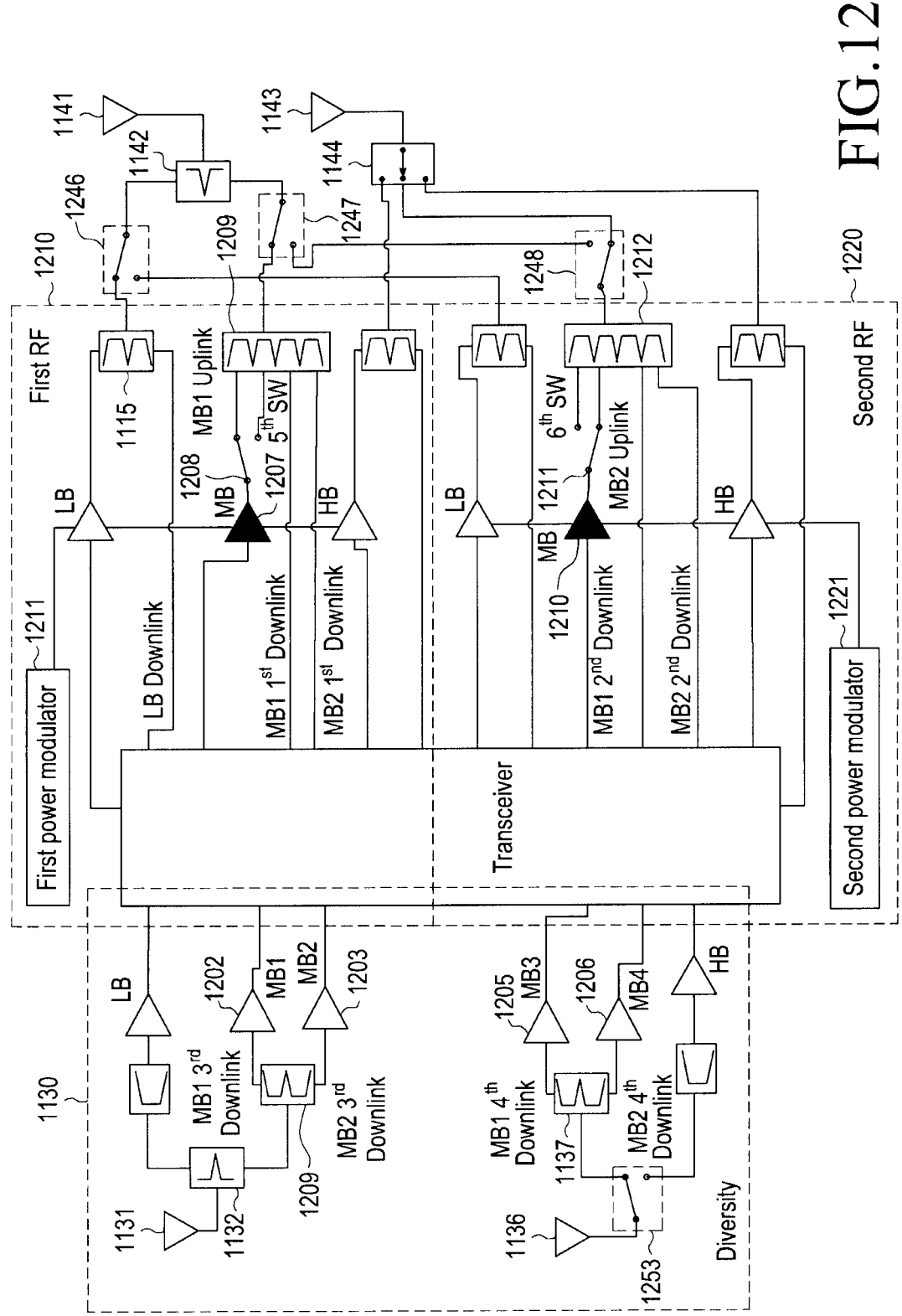
FIG. 12 is a block diagram illustrating an example of performing uplink CA with two diversity antennas according to the present invention.

FIG. 12 is a block diagram illustrating an example of performing uplink CA with two diversity antennas according to the present invention.

Referring to FIG. 12, the duplexer connected to the MB 1207 of the first RF 1210 in the structure of FIG. 11 is replaced with a quadplexer 1209, the duplexer connected to the MB 1210 of the second RF 1220 is replaced with a quadplexer 1212, the duplexer 1134 of the diversity unit 1130 is replaced with a second duplexer 1209 supporting the MB1 1202 and MB2 1203, and the duplexer 1137 of the diversity unit 1130 is replaced with a third duplexer 1209 supporting the MB3 1205 and the MB4 1206, and what overlaps FIG. 11 is not repeatedly described. In the structure of FIG. 12, upon uplink CA through the MB and HB, the first antenna 1141 is occupied by the transceiver of the MB of the first RF, and the second antenna 1143 is occupied by the transceiver of the HB of the second RF unit, so that it may be impossible to support 4th order diversity (diversity with four receive paths) requiring four receive paths in the same band. Upon uplink CA through a first band in the MB and a second band in the MB, the first antenna 1141 is occupied by the transceiver of the first band in the MB of the first RF, and the second antenna 1143 is occupied by the transceiver of the second band in the MB of the second RF unit, so that it may be impossible to support 4th order diversity requiring four receive paths in the same band. The quadplexers 1209 and 1212 may support the first and second bands in the MB. The switch (e.g., the fifth switch 1208) added between the MB PA 1207 of the first RF 1210 and the quadplexer 1209 and the switch (e.g., the sixth switch 1211) added between the MB 1210 of the second RF 1220 and the quadplexer 1212 may selectively connect the MB to the first band transmit end and the second band transmit end. The diversity unit 1130 including the third antenna 1131 and the fourth antenna 1136 may also add a duplexer 1209 to separate the first band receive band and second band receive band in the MB and one LNA 1203 or 1206 for MB per antenna. Such a structure enables simultaneous receipt of the first and second bands per antenna. Thus, the 4th order diversity of the first band and second band are rendered possible while performing uplink CA and downlink CA using the first band (e.g., MB1) and second band (e.g., MB2) in the MB.

In some cases, a BPF and LNA may be configured instead of the duplexer added to the fourth antenna 1136. In this case, only one of the first band or second band may be operated in 4th order diversity, and the other may be operated, in maximum, in 3rd order diversity. Table 2 below represents, as a switching connection method, switching operation configurations as per band combinations of uplink CA using the MB of the first RF and the MB of the second RF and downlink CA using the LB of the first RF, the MB of the first RF, and the MB of the second RF.

TABLE 2

| UL CA | DL CA | first SW | second SW | third SW | fourth SW | fifth SW | sixth SW | seventh SW |
|---|---|---|---|---|---|---|---|---|
| LB/ HB | LB/ MB/ HB | first LB | second MB | second antenna | second MB | first band (MB 1) first MB PA | second band (MB 2) second MB PA | MB duplexer |

In Table 2, the bands denoted in bold are bands playing a role as first RF (e.g., PCC), and the bands in regular thickness are bands playing a role as second RF (e.g., SCC).

Signal reception is described. It is first assumed that the first switch 1246 connects the first diplexer and the first duplexer of the first RF 1210, the second switch 1247 connects the first diplexer and the quadplexer 1209 of the first RF 1210, the third switch 1144 connects the second antenna 1143 and the fourth switch 1248, the fourth switch 1248 connects the third switch 1144 and the quadplexer 1212 of the second RF 1220, and the fifth switch 1253 connects the fourth antenna 1136 and the third duplexer of the diversity unit 1130. In this case, there may be a first example in which the received signal passes through the first antenna 1141, the first diplexer 1142, and the first duplexer 1115 of the first RF 1210, a second example in which the received signal passes through the first antenna 1141, the first diplexer 1142, and the quadplexer 1209 of the first RF, a third example in which the received signal passes through the second antenna 1143, the third switch 1144, the fourth switch 1248, and the quadplexer 1212 of the second RF, a fourth example in which the received signal passes through the third antenna 1131 of the diversity unit 1130, the diplexer 1132, and the second duplexer 1209, and a fifth example in which the received signal passes through the fourth antenna 1136 of the diversity unit 1130, the fifth switch 1253, and the third duplexer 1137. The electronic device 101 may simultaneously perform the first, second, third, fourth, and fifth examples, simultaneously receiving the signals. The second example of passing through the quadplexer 1209 of the first RF, the third example of passing through the quadplexer 1212 of the second RF, the fourth example of passing through the second duplexer, and the fifth example of passing through the third duplexer may simultaneously receive the first band and second band in the MB. For example, the first band in the MB may receive four signals from each antenna, and the second band in the MB may receive four signals from each antenna.

Signal transmission is described. There may be a first example in which, for a signal output from the transceiver, a transmit signal amplified by supplying the voltage output from the first power modulator 1211 to the MB PA 1207 of the first RF 1210 is transmitted through the quadplexer 1209 of the first RF, the second switch 1247, and the first diplexer 1142, and then through the first antenna 1141 and a second example in which a signal amplified by supplying the voltage output from the second power modulator 1221 to the MB PA 1210 of the second RF 1220 is transmitted through the quadplexer 1212 of the second RF, the fourth switch 1248, and the third switch 1144 and then through the second antenna 1143. The electronic device 101 may simultaneously perform the first and second examples, simultaneously transmitting the signals. The quadplexers 1209 and 1212 of the first and second RFs 1210 and 1220 may allow two bands of signals to be separated from each other and to be simultaneously received.

Figure 13:
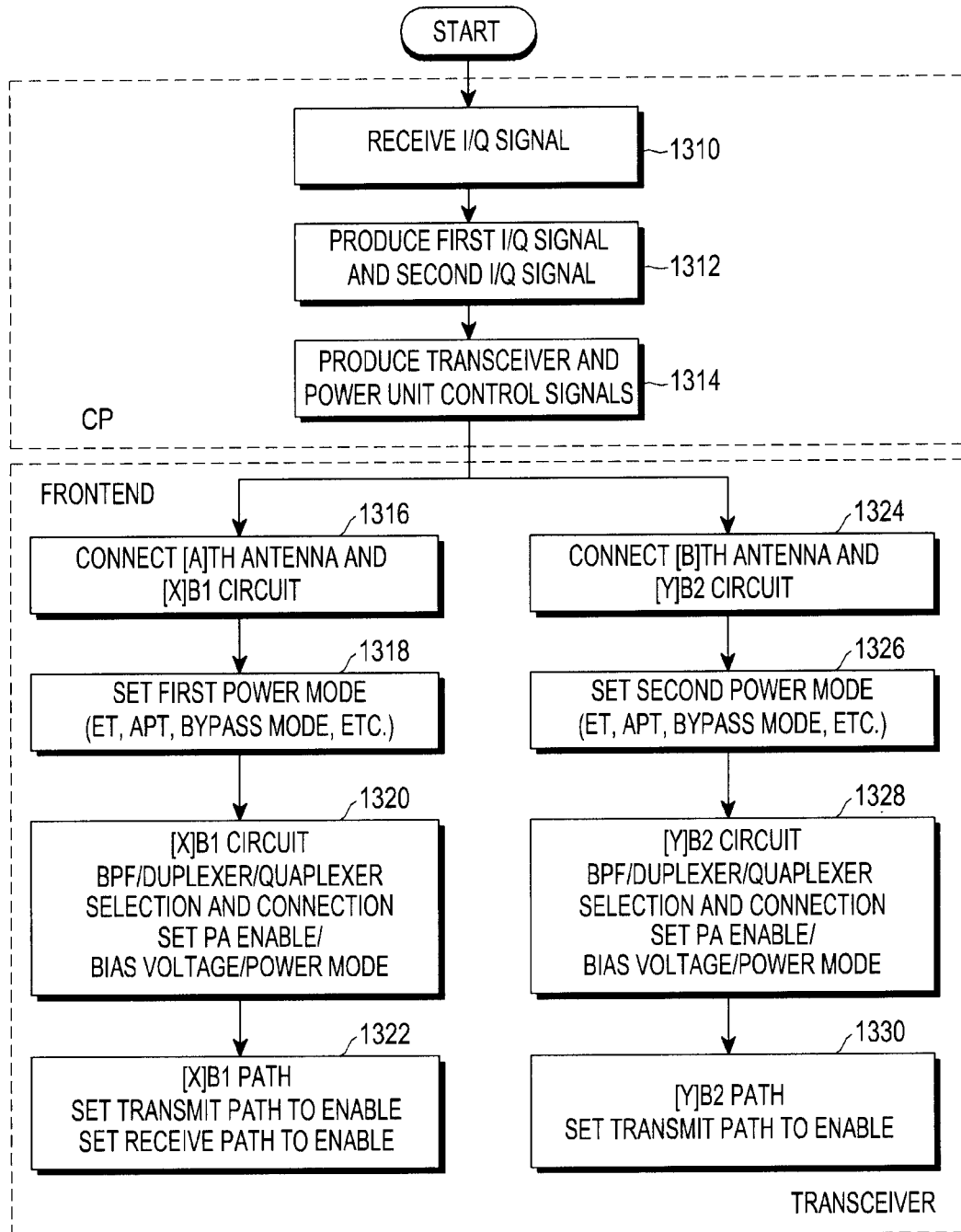
FIG. 13 is a flowchart illustrating a process for controlling two-uplink CA according to an embodiment of the present invention.

FIG. 13 is a flowchart illustrating a process for controlling two-uplink CA according to an embodiment of the present invention.

Now described in detail with reference to FIG. 13 is a process for controlling two-uplink CA according to an embodiment of the present invention.

According to various embodiments, the electronic device 101 may receive I/Q signals (1310) and generate first I/Q and second I/Q signals for two-uplink CA (1312). The electronic device 101 may receive the I/Q signals from the base station. The electronic device 101 may receive baseband signals (e.g., I/Q signals) through the RF circuit unit 470 and demodulate the received I/Q signals. The electronic device (e.g., the communication processor 480) may transfer the I/Q signals to the RF circuit unit 470. The I/Q signals delivered to the RF circuit unit 470 are converted into RF band signals via the LPF and mixer. The converted RF band signals are amplified by the PGA and are then transferred to the RF transmit block.

The electronic device 101 may generate control signals to control the communication interface and the power unit (1314). The electronic device (e.g., the communication processor 480) may generate control signals to control the communication interface and the power unit and transfer the control signals to the communication interface and the power unit. The communication processor 480 may receive an I/Q signal and produce a first control signal to control the RF circuit unit 470 and a second control signal to control at least one power modulator of the power unit 410. The communication processor 480 may produce control signals to control the PA and switch in the PAMID through the MIPI, control signals to control the PA and switch in the MMMB, control signals to control the PA in the PAD, control signals to control the first power modulator, control signals to control the second power modulator, control signals to control switches, and control signals to control each switch and transfer the control signals to the RF circuit unit 470. The control signal to control the switch in the PAMID may is a signal capable of connecting the duplexer to the transmit/receive path or the external input and the input/output port (e.g., antenna connection part) of the PAMID as per selected bands. The control signal to control the PA in the PAMID may perform control, such as PA power mode, bias voltage, and enable/disable, depending on the determined transmit power and whether it is used. The control signal to control the switch in the MMMB is a signal capable of selectively connecting to the output port as per a selected band. The control signal to control the PA in the MMMB is a signal capable of performing control, such as PA power mode, bias voltage, and enable/disable, depending on the determined transmit power and whether it is used. The control signal to control the PA in the PAD is a signal capable of performing control, such as PA power mode, bias voltage, and enable/disable, depending on the determined transmit power and whether it is used. The communication processor 480 may produce the LNA control signal, Tx PGA control signal, LNA selection control signal, Rx mixer control signal, Tx mixer control signal, LPF control signal, Rx PGA control signal, Tx PLL control signal (not shown), and Rx PLL control signal (not shown) and transfer the control signals to the RF circuit unit 470. The LNA control signal may perform a control, such as LNA enable/disable/bypass. The Tx PGA control signal may change the gain of the Tx PGA according to the determined transmit power and may perform control, such as enable/disable, depending on whether it is used. The Tx PGA selection signal may connect a Tx PGA supporting a communication frequency band to the Tx mixer based on the frequency band. The LNA selection control signal may connect an LNA supporting a communication frequency band to the mixer based on the frequency band. The Tx mixer control signal may control, e.g., enable/disable or mixer gain. The Tx mixer may mix the transmit frequency signal generated by the Tx PLL and the baseband I/Q signal, producing a transmit signal. The Rx mixer control signal may control, e.g., enable/disable or mixer gain. The Rx mixer may mix the receive frequency signal generated by the Rx PLL and the receive signal, producing a baseband I/Q signal. The LPF control signal may change the cut-off frequency depending on the used communication standard (e.g., LTE, WCDMA, or GSM). The Rx PGA control signal may control the gain of the Rx PGA depending on the strength of the received signal. Enable/disable may be controlled depending on whether it is used.

The electronic device 101 may connect the first antenna to the PA supporting any one of the LB, MB, and HB of the first RF via the produced control signal (1316). The RF circuit unit 470 may receive at least one control signal generated by the communication processor 480. The electronic device 101 may control components of the transceiver in the communication interface and at least one switch in the path selector 440 by using the control signal to connect any one PA supporting the LB, MB, and HB of the first RF with the first antenna. The electronic device 101 may set the transmit/receive path as per any one of the PAs supporting the LB, MB, or HB of the first RF to enable.

The electronic device 101 may set the mode for the first power modulator of the power unit 410 (1318). The electronic device 101 may control the power output mode of the first power modulator of the power unit 410 by using at least one control signal generated in step 1314. The electronic device 101 may control the power output from the first power modulator by using any one (or at least one) of the envelope tracking mode in which voltage is adjusted as per the envelope of the transmitted signal and is supplied to the PA, the average power tracking mode in which voltage is adjusted corresponding to the mean output power of each PA and is supplied to the PA, and the bypass mode in which a constant voltage is supplied to the PA.

The electronic device 101 may select any one of the BPF, duplexer, and quadplexer and connect any one of the PAs supporting the LB, MB, and HB of the first RF (1320). The electronic device 101 may select any one of the BPF, duplexer, and quadplexer by using the control signal and connect any one of the PAs supporting the LB, MB, and HB of the first RF to the selected one. The PA power mode may be set to a high power mode if the determined transmit output is high and to a low power mode if the determined transmit output is low. In low power mode, a low-power amplifier may be used to output signals. In high power mode, a PA-embedded, high-power amplifier may be used to output signals. The low-power amplifier and the high-power amplifier may be connected in series. The high-power amplifier may be positioned at the series termination. In high-power mode, the two series-connected amplifiers may be operated together, as the overall gain, presenting the sum of the respective gains of the two amplifiers. In the series-connected state, the high-power amplifier may be bypassed and used in low-power mode. The bypass voltage may be controlled as per the determined output power/gain.

The electronic device 101 may set the transmit/receive path to enable using the control signal, so that any one of the PAs supporting the LB, MB, and HB of the first RF may transmit signals (1322). The electronic device 101 may set the transmit/receive path to enable so that signals may be transmitted and received through the selected one among the BPF, duplexer, and quadplexer.

The electronic device 101 may circuit-connect the second antenna to any one of the PAs supporting the LB, MB, and HB of the second RF via the generated control signal (1324). The electronic device 101 may control components of the transceiver in the communication interface and at least one switch in the path selector 440 by using the control signal to connect any one PA supporting the LB, MB, and HB of the second RF with the second antenna. The electronic device 101 may set the transmit/receive path as per any one of the PAs supporting the LB, MB, or HB of the second RF to enable.

The electronic device 101 may set the mode for the second power modulator of the power unit 410 (1326). The electronic device 101 may control the power output mode of the second power modulator of the power unit 410 by using at least one control signal generated in step 1314. The electronic device 101 may control the power output from the second power modulator by using any one (or at least one) of the envelope tracking mode in which voltage is adjusted as per the envelope of the transmitted signal and is supplied to the PA, the average power tracking mode in which voltage is adjusted corresponding to the mean output power of each PA and is supplied to the PA, and the bypass mode in which a constant voltage is supplied to the PA.

The electronic device 101 may select any one of the BPF, duplexer, and quadplexer and connect any one of the PAs supporting the LB, MB, and HB of the second RF (1328). The electronic device 101 may select any one of the BPF, duplexer, and quadplexer by using the control signal and connect any one of the PAs supporting the LB, MB, and HB of the second RF to the selected one.

The electronic device 101 may set the transmit/receive path to enable use of the control signal, so that any one of the PAs supporting the LB, MB, and HB of the second RF may transmit and receive signals (1322). The electronic device 101 may set the transmit/receive path to enable so that signals may be transmitted and received through the selected one among the BPF, duplexer, and quadplexer. In FIG. 13, a and b are 1 or 2, and a and b may be the same.

x and y may be one of low (L), mid (M), and high (H), and x and y may be the same. Upon downlink CA operation, the receiving unit may be activated.

Figure 14:
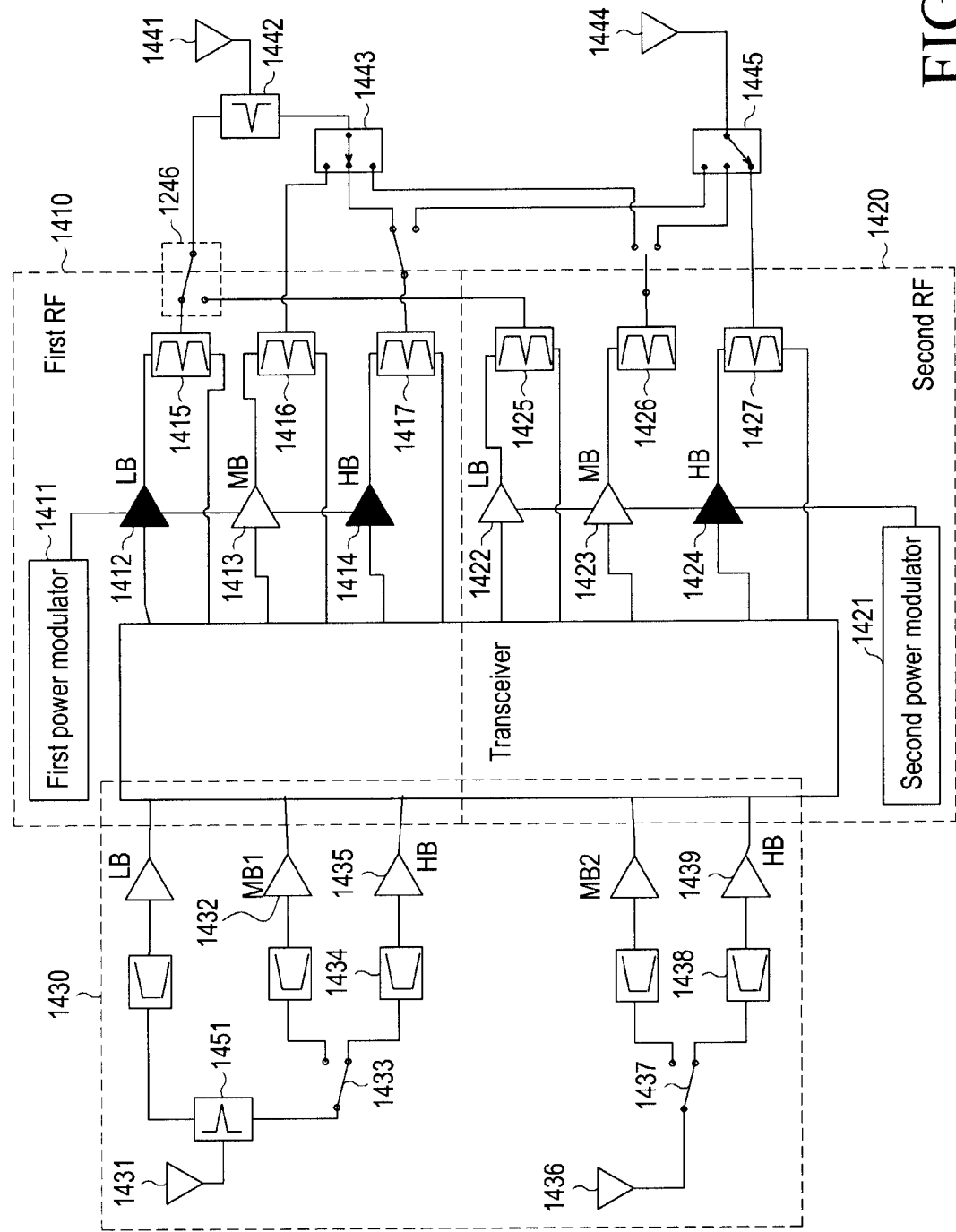
FIG. 14 is a view illustrating an example structure supporting two-uplink CA and including an HB according to an embodiment of the present invention.

FIG. 14 is a view illustrating an example structure supporting two-uplink CA and including an HB according to an embodiment of the present invention.

Referring to FIG. 14, the second switch in the structure of FIG. 11 is replaced with an SP3T 1443 to connect the first RF HB to the first antenna 1441. The diversity unit 1430 adds an HB LNA 1435 and an HB BPF 1434 and is configured to connect to the third antenna 1431 via the switch 1433. Such a structure enables two-uplink CA and two=dl CA and receiving signals via four applications in the HB.

Signal reception is described. There may be a first example in which the received signal passes through the first antenna 1441, the first diplexer 1442, and the first duplexer 1415 of the first RF 1410, a second example in which the received signal passes through the first antenna 1441, the first diplexer 1441, the second switch 1443, and the duplexer 1417 of the first RF 1410, a third example in which the received signal passes through the second antenna 1444, the switch 1445, and the third duplexer 1427 of the second RF 1420, a fourth example in which the received signal passes through the diplexer 1451 of the diversity unit 1430, the switch 1433, and the duplexer 1434, and a fifth example in which the received signal passes through the fourth antenna 1436, the switch 1437, and the duplexer 1438. The electronic device 101 may simultaneously perform the first, second, third, fourth, and fifth examples, simultaneously receiving signals from four antennas in the HB.

Signal transmission is described. There may be a first example in which, for a signal output from the transceiver, a transmit signal amplified by supplying the voltage output from the first power modulator 1411 to the LB PA 1412 of the first RF 1410 is transmitted through the first duplexer 1415 of the first RF, the first switch 1246, and the diplexer 1442, and then through the first antenna 1441 and a second example in which a signal amplified by supplying the voltage output from the second power modulator 1421 to the HB PA 1424 of the second RF 1420 is transmitted through the third duplexer 1427 of the second RF, the fifth switch 1445, and then the second antenna 1444. The electronic device 101 may simultaneously perform the first and second examples, simultaneously transmitting the signals.

Figure 15A:
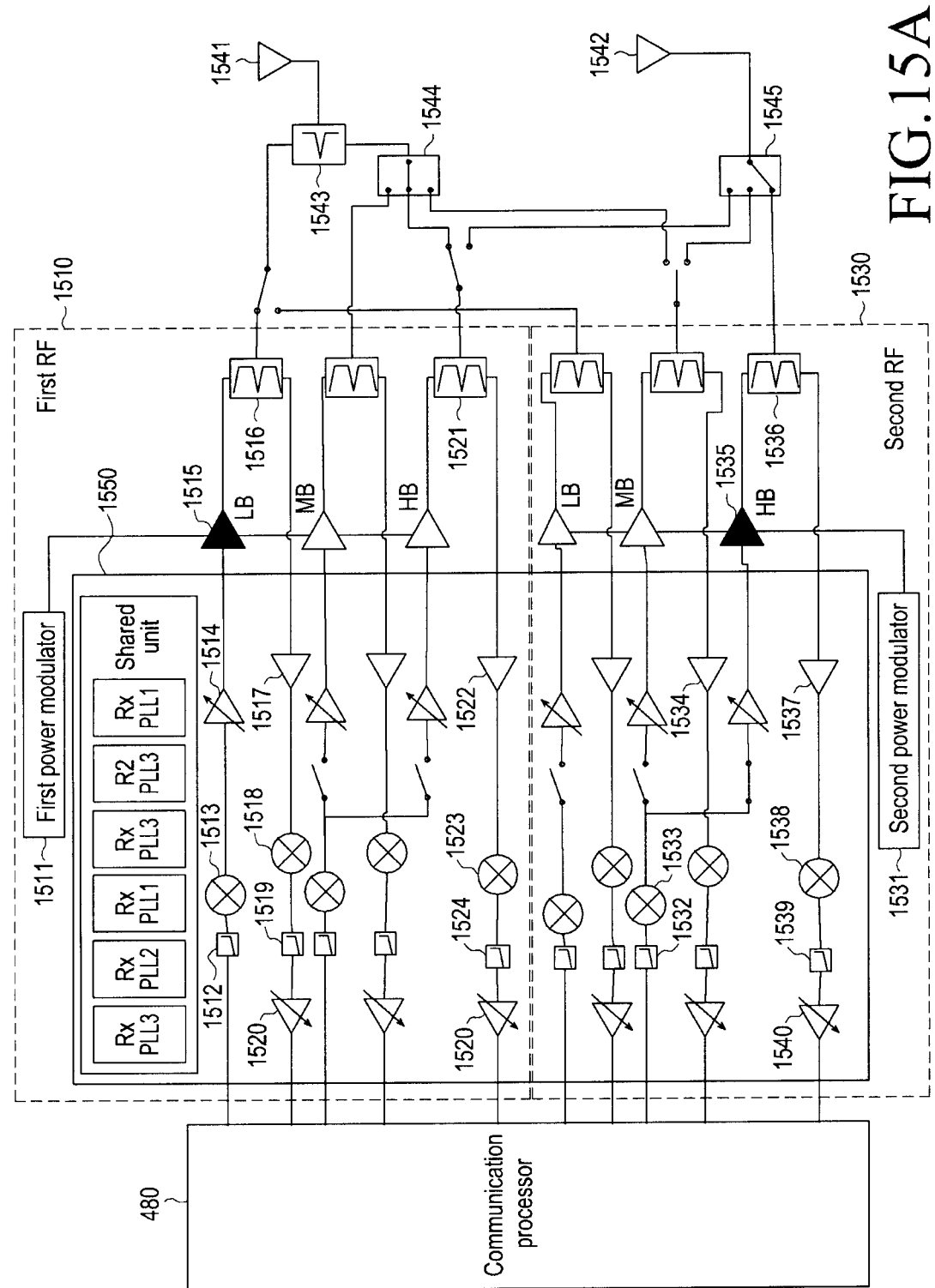
FIG. 15a is a view illustrating an example in which a transceiver and a communication processor are added according to an embodiment of the present invention.
Figure 15B:
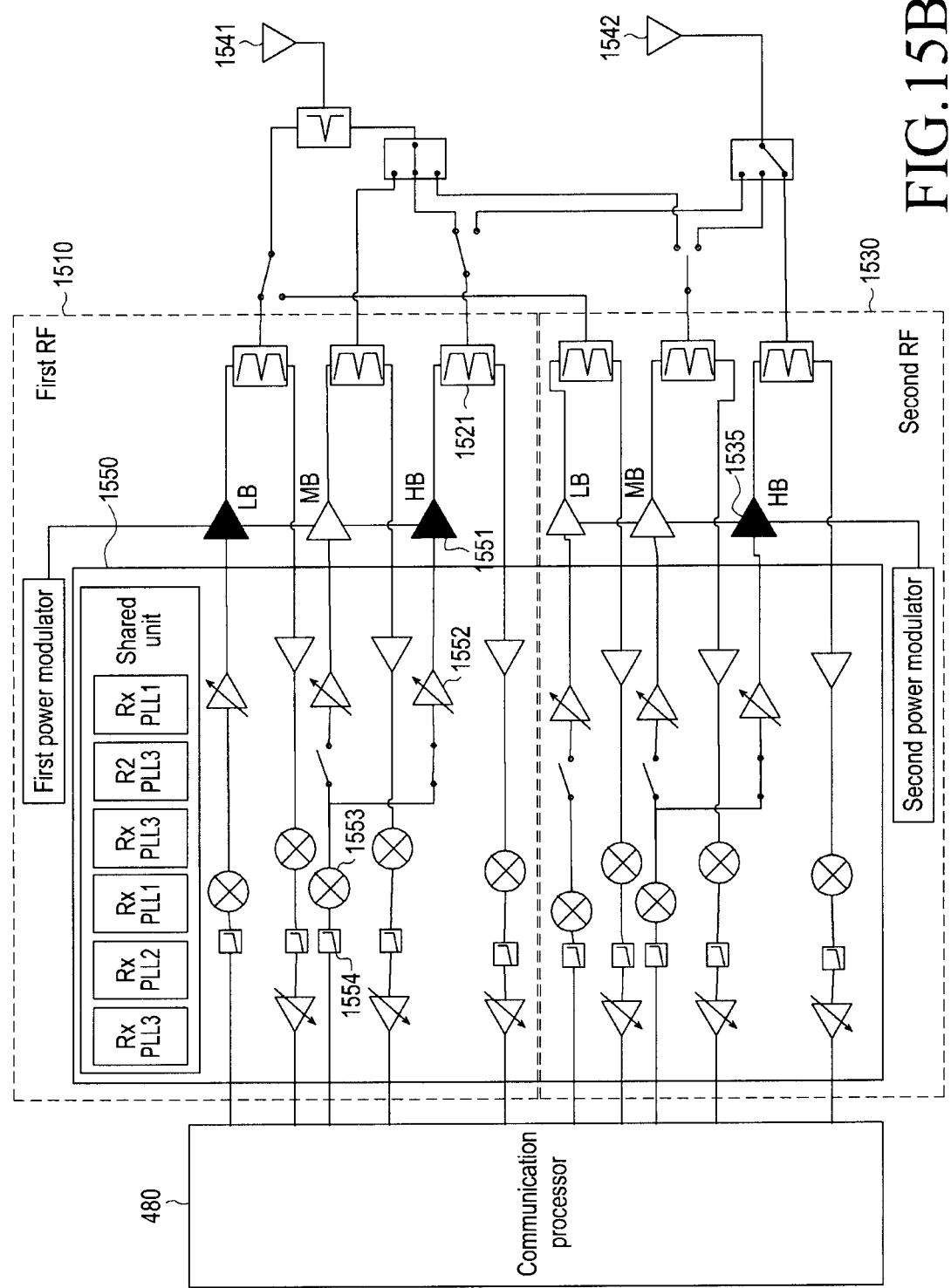
FIG. 15b is a view illustrating an example of performing uplink MIMO using an HB while performing uplink CA according to an embodiment of the present invention.

FIG. 15a is a view illustrating an example in which a transceiver and a communication processor are added according to an embodiment of the present invention. FIG. 15b is a view illustrating an example of performing uplink MIMO using an HB while performing uplink CA according to an embodiment of the present invention.

Referring to FIG. 15a, FIG. 15a excludes the diversity unit 1430 of FIG. 14 and adds the communication processor 480 and transceiver 1550. Signal reception is described. There are a first example in which a signal passing through the first antenna 1541, the first diplexer 1543, and the first duplexer 1516 of the first RF 1510 is low-noise amplified by the LNA 1517 of the first RF 1550, then transmitted through the mixer 1518 and is then low-band passed by the LPF 1519, and then transmitted through the Rx PGA 1520 to the communication processor 480, a second example in which a signal passing through the first antenna 1541, the first diplexer 1543, the switch 1544, and the third duplexer 1521 of the first RF 1510 is low-noise amplified by the LNA 1522 of the first RF 1550, then transmitted through the mixer 1523 and low-band passed by the LPF 1524, and then transmitted through the Rx PGA 1520 to the communication processor 480, and a third example in which a signal passing through the second antenna 1542, the switch 1545, and the third duplexer 1536 of the second RF 1530 is low-noise amplified by the LNA 1537 of the second RF 1550, then transmitted through the mixer 1538 and low-band passed by the LPF 1539, and then transmitted through the Rx PGA 1540 to the communication processor 480. The electronic device 101 may simultaneously perform the first to third examples, simultaneously receiving the signals.

Signal transmission is described. There may be a first example in which, for a signal transmitted from the communication processor 480, a transmit signal that is low-band passed by the LPF 1512 of the first RF 1510 and then transmitted through the mixer 1513 and the Tx PGA 1514, and amplified by supplying the voltage output from the first power modulator 1411 to the LB PA 1515 of the first RF 1510 is transmitted through the first antenna 1541 and a second example in which a transmit signal that is low-band passed by the LPF 1532 of the second RF 1530, transmitted through the mixer 1533 and the Tx PGA 1537, and amplified by supplying the voltage output from the second power modulator 1531 to the HB PA 1535 of the second RF 1530 is transmitted through the second antenna 1542. The electronic device 101 may simultaneously perform the first and second examples, simultaneously transmitting the signals.

Referring to FIG. 15b, the HB pA 1551 of the first RF 1510 of FIG. 15a is additionally operated. The HB PA 1551 of the first RF 1510 transmits, through the first antenna 1541, a data stream different from a data stream that the HB PA 1535 of the second RF 1530 transmits through the second antenna 1542, thereby performing uplink MIMO.

If CA uplink MIMO is performed while LB and HB are performed, the LB PA 1515 and the HB PA 1551 may receive power through one power modulator. For example, in the case of envelope tracking mode, the output power of the power modulator with respect to the envelope of the PA with the highest power output may be determined by Equation 2 below.

$$V_{envTx} = \max(V_{envTx[1]}, V_{envTx[2]}, \ldots, V_{envTx[n]}) + \text{Offset} \quad \text{[Equation 2]}$$

In Equation 2, $V_{envTx[n]}$ is the control voltage of the power modulator reflecting the transmit envelope of the nth PA, and $V_{envTx}$ is the control voltage of the power modulator selecting a control voltage among the control voltages determined by the PAs to supply power to the plurality of PAs. An offset may be added for stable power supply. In the average power tracking mode, the output power of the power modulator is likewise controlled with respect to the highest mean output power so that power may be supplied from one power modulator to a plurality of PAs.

Figure 16A:
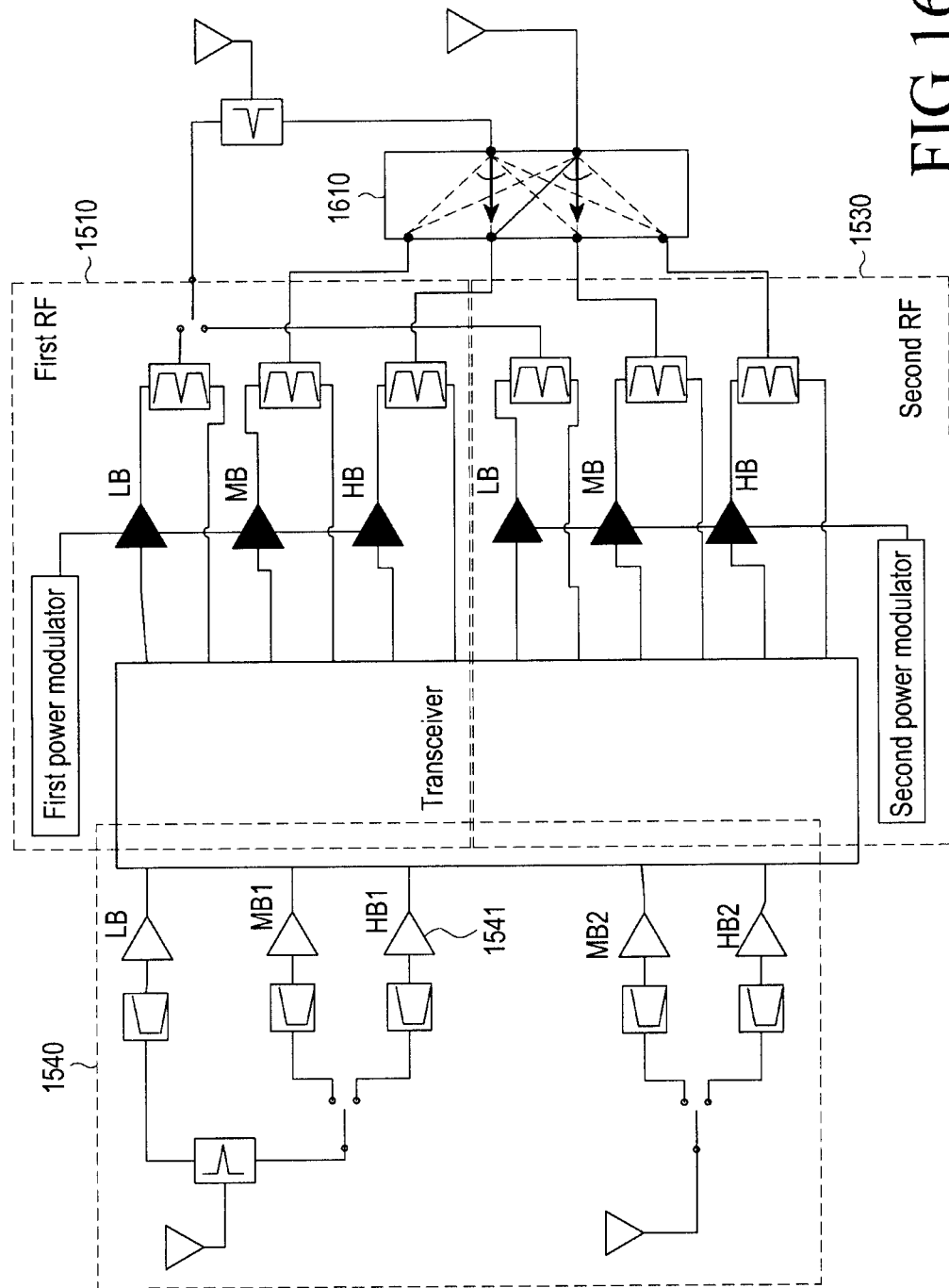
FIG. 16a is a view illustrating an example of randomly connecting a first RF and a second RF to a first antenna and a second antenna via one switch according to an embodiment of the present invention.
Figure 16B:
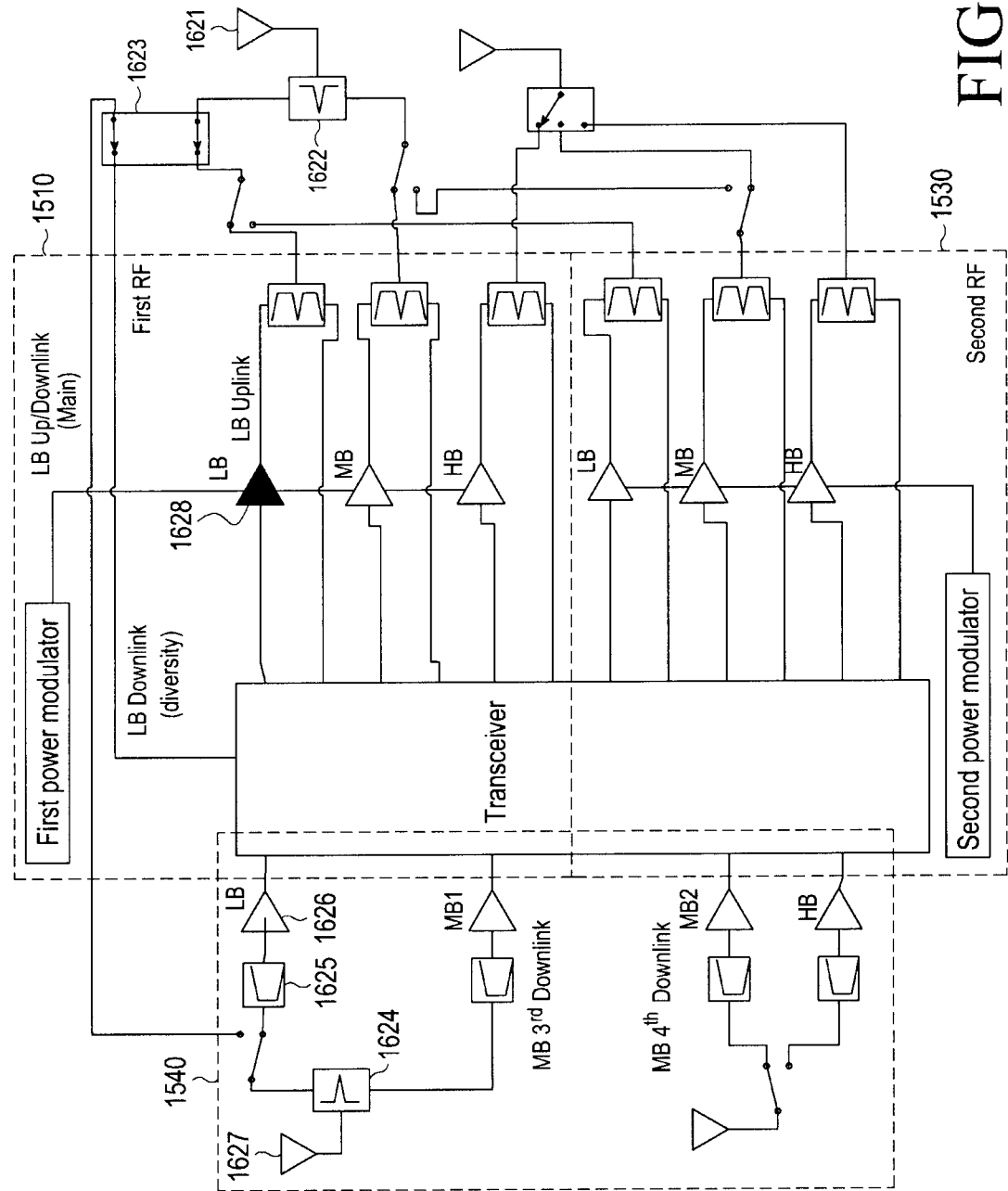
FIG. 16b is a view illustrating an example in which a switch is added to swap connection between a first antenna connected with an LB of a first RF and a third antenna connected with a diversity unit of the LB according to an embodiment of the present invention.
Figure 16C:
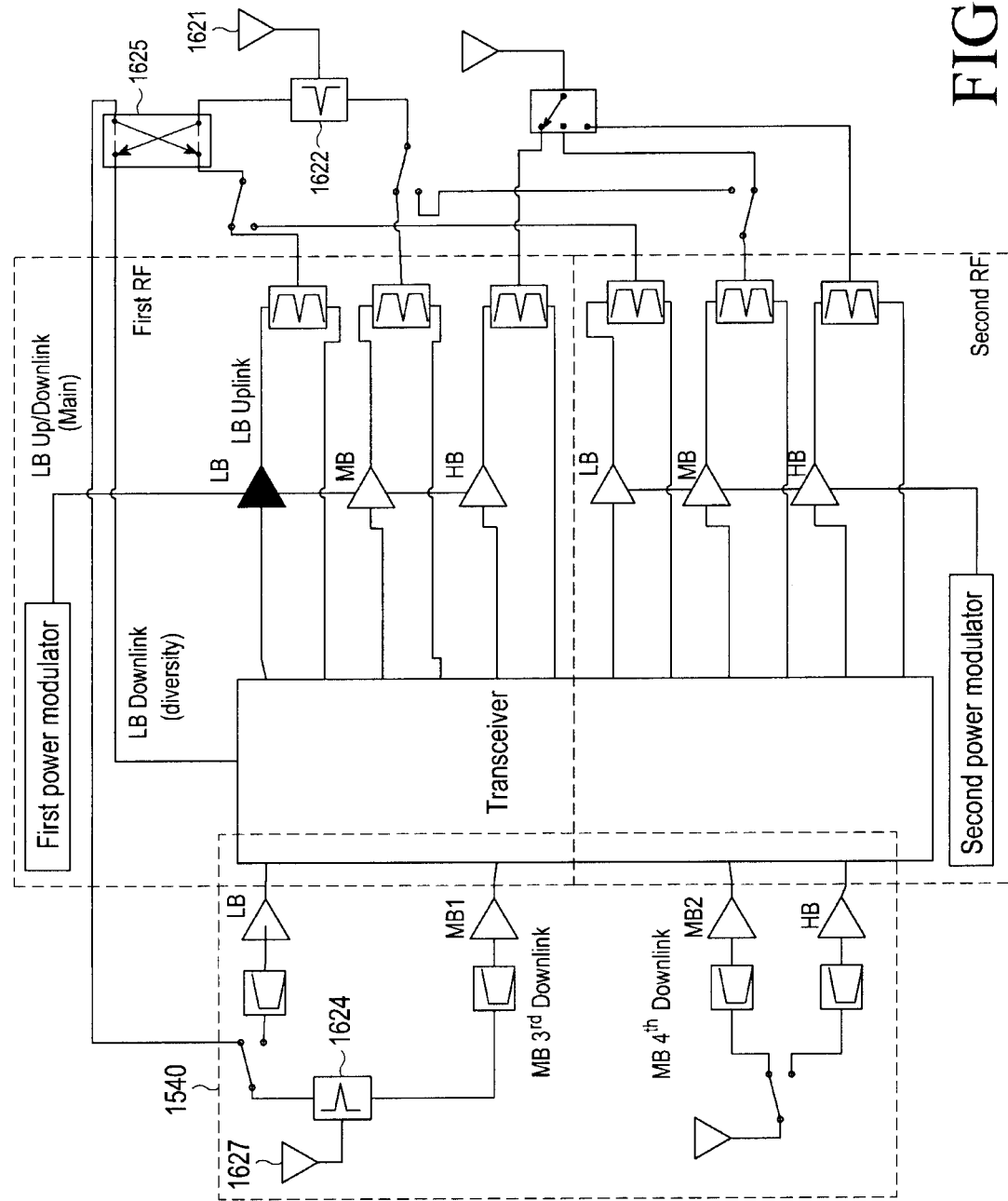
FIG. 16c is a view illustrating an example of swapping connection between the first antenna connected with the LB of the first RF and the third antenna connected with the diversity unit of the LB via the switch added in FIG. 16b.
Figure 16D:
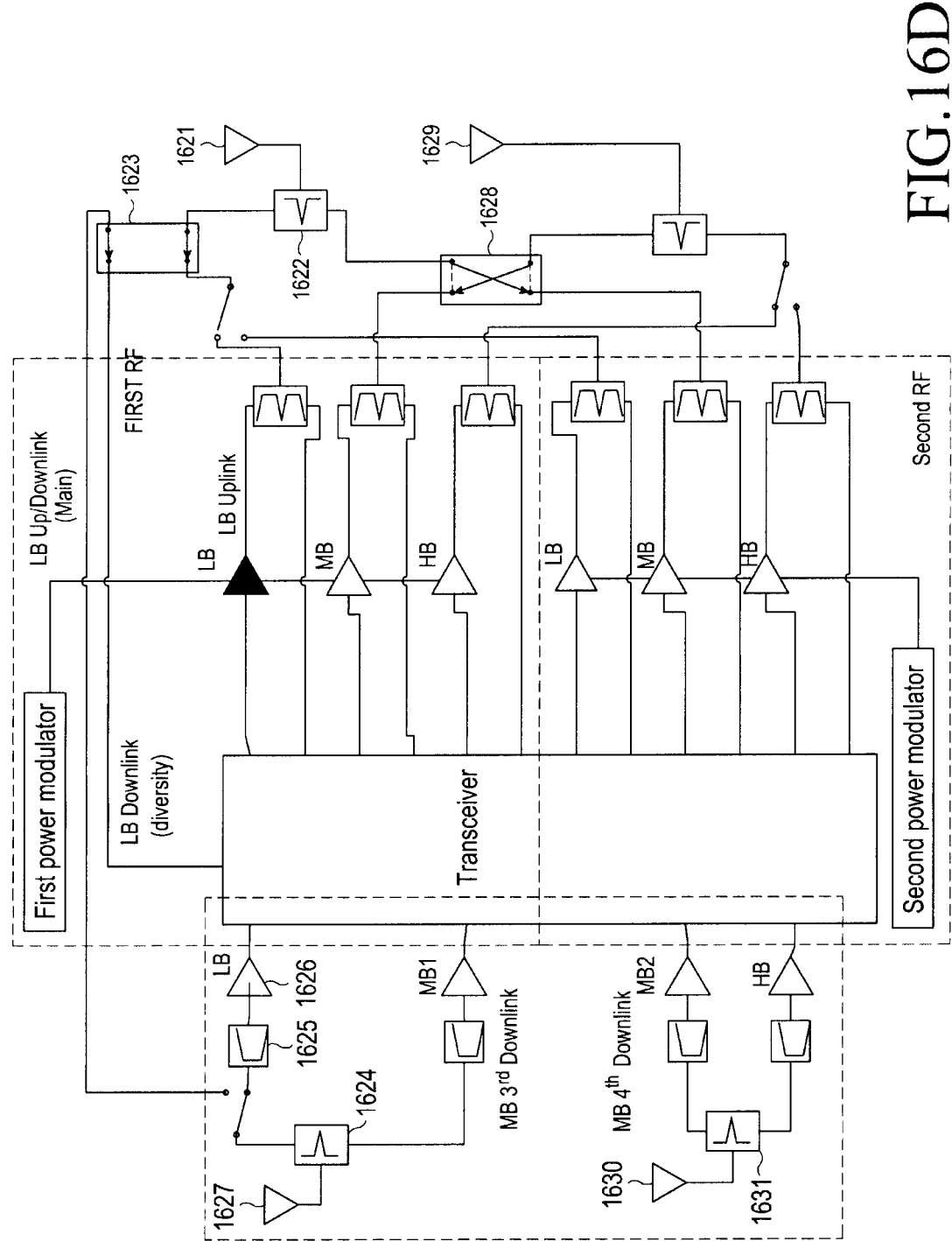
FIG. 16d is a view illustrating an example of using a diplexer instead of the switch to selectively connect the first antenna with the third antenna in FIG. 16b.

FIG. 16a is a view illustrating an example of randomly connecting a first RF and a second RF to a first antenna and a second antenna via one switch according to an embodiment of the present invention. FIG. 16b is a view illustrating an example in which a switch is added to swap connection between a first antenna connected with an LB of a first RF and a third antenna connected with a diversity unit of the LB according to an embodiment of the present invention. FIG. 16c is a view illustrating an example of swapping connection between the first antenna connected with the LB of the first RF and the third antenna connected with the diversity unit of the LB via the switch added in FIG. 16b. FIG. 16d is a view illustrating an example of using a diplexer instead of the switch to selectively connect the first antenna with the third antenna in FIG. 16b.

Referring to FIG. 16a, the MB and HB of the first RF 1510 and the MB and HB of the second RF add a switch 1610 that may randomly connect to the first antenna and the second antenna. Other switch combinations to perform the functionality of the switch 1610 are also possible. The diversity unit 1540 adds the HB LNA 1541 to be connected through the third antenna and switch. The LB PA, MB PA, and HB PA of the first RF 1510 and the LB PA, MB PA, and HB PA of the second RF 1530 may be configured in a single communication interface, but the present invention is not limited thereto, and they may be configured in multiple communication interfaces included in the corresponding frequency band. The plurality of PAs and the first antenna or second antenna may selectively be connected through the switch 1610. Although the diversity unit 1540 includes one bandpass filter and the LNAs of the LB, MB1, MB2, HB1, and HB2, this is merely an example, and a plurality of PAs included in the corresponding frequency band may be included.

Referring to FIG. 16b, the first antenna 1621 connected to the first RF 1510 and the third antenna 1627 connected to the diversity unit 1540 may be swapped for connection, and a switch SPDT may be included in the diversity unit and the swap main unit switch (DPDT). The first antenna 1621 may be connected with the LB 1628 of the first RF 1510, and the third antenna 1627 may be connected to the LB 1626.

Referring to FIG. 16c, the third antenna 1627 may be connected to the LB of the first RF depending on the switching state of the switch 1625, and the first antenna 1621 may be connected to another LB receiving unit (LB downlink) of the diversity unit 1540. The first antenna 1621 and the LB receiving unit may add a BPF.

Referring to FIG. 16d, diplexers 1631 and 1624 may be used instead of the switch in order to selectively connect the second antenna 1629 and the fourth antenna 1630. To selectively connect the MB circuit of the first RF or the MB circuit of the second RF to the first antenna or second antenna, a switch 1628 may be added.

Figure 17:
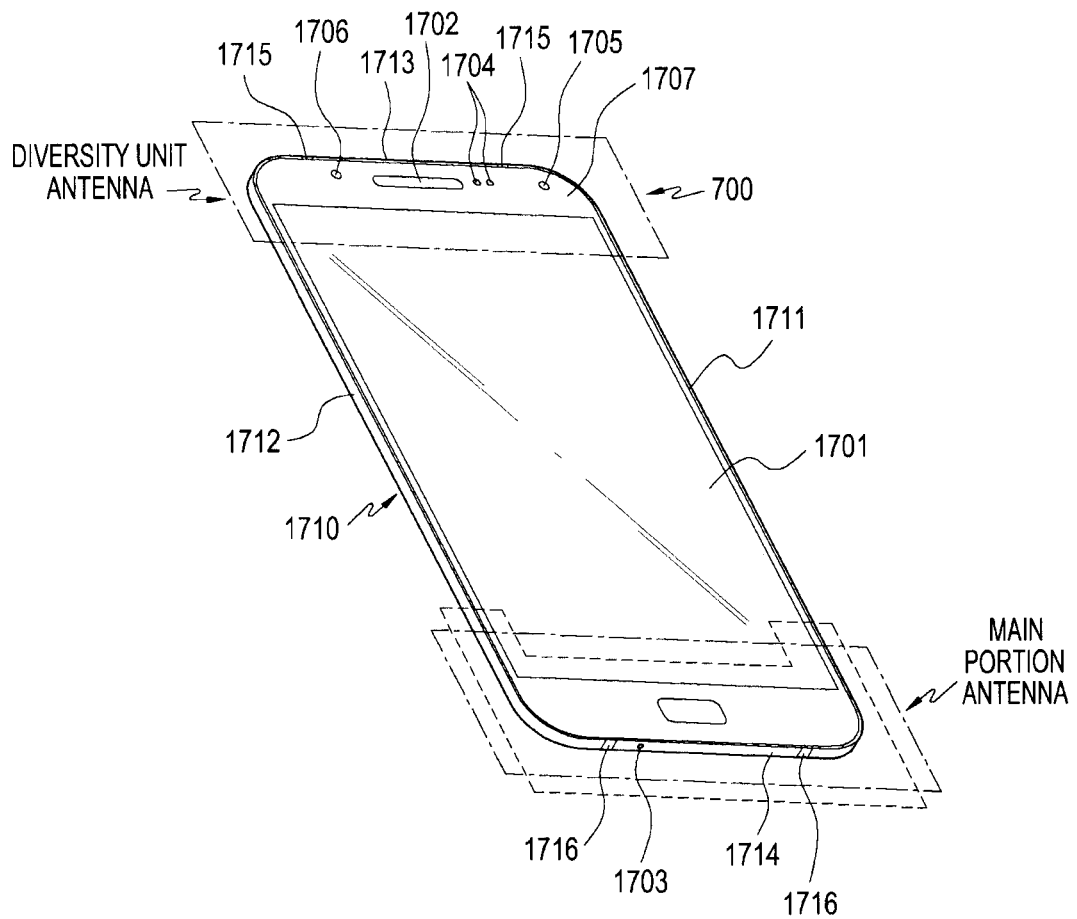
FIG. 17 is a perspective view illustrating an electronic device 101 according to various embodiments of the present invention.

FIG. 17 is a perspective view illustrating an electronic device 101 according to various embodiments of the present invention.

Referring to FIG. 17, a display 1701 may be installed on the front surface 1707 of the electronic device 101. A speaker device 1702 may be installed on an upper portion of the display 1701 in order to receive the opposite party's voice. A microphone device 1703 may be installed on a lower portion of the display 1701 in order to send the voice of the user of the electronic device to the opposite party.

According to an embodiment, components for performing various functions of the electronic device 1700 may be arranged around the speaker device 1702. The components may include at least one sensor module 1704. The sensor module 1704 may include at least one of, e.g., an illumination sensor (e.g., an optical sensor), a proximity sensor, an infrared (IR) sensor, or an ultrasonic sensor. According to an embodiment, the components may include a camera device 1705. According to an embodiment, the components may include a light emitting diode (LED) indicator 1706 to provide state information about the electronic device 101 to the user.

According to various embodiments, the electronic device 101 may include a metal bezel 1710 (which may be provided as at least a portion of a metal housing). According to an embodiment, the metal bezel 1710 may be formed along an edge of the electronic device 101 and may expand to at least a portion of the rear surface of the electronic device 101, which extends from the edge. According to an embodiment, the metal bezel 1710 may be defined as a thickness of the electronic device 101 along the edge of the electronic device 2300 and may be shaped as a loop. However, the metal bezel 1710 is not limited thereto, and the metal bezel 2310 may be formed in such a manner as to at least partially contribute to the thickness of the electronic device 300. According to an embodiment, the metal bezel 1710 may be formed only in at least a portion of the edge of the electronic device 101. According to an embodiment, the metal bezel 1710 may include at least one separator 1715 and 1716. According to an embodiment, unit bezel portions separated by the separators 1715 and 1716 may be utilized as antenna radiators operating on at least one frequency band.

According to various embodiments, the metal bezel 1710 may be shaped as a loop along the edge and may be disposed in such a way as to contribute, in whole or part, to the thickness of the electronic device 101. According to an embodiment, when the electronic device 101 is viewed from the front, the metal bezel 1710 may include a right bezel portion 1711, a left bezel portion 1712, an upper bezel portion 1713, and a lower bezel portion 1714. Here, the lower bezel portion 1714 may serve as unit bezel portions formed by a pair of separators 1716.

According to various embodiments, a main antenna device may be disposed in a lower portion (main portion antenna area) of the electronic device 101. According to an embodiment, the lower bezel portion 1714 may be used as a main antenna radiator by the pair of separators 1716. According to an embodiment, the lower bezel portion 1714 may serve as an antenna radiator operating on at least two operating frequency bands according to the position of power feeding. For example, the lower bezel portion 1714 may be part of an antenna supporting the LB, MB, HB or MB, or HB band.

According to various embodiments, the configuration of the antenna device is merely an example, and the above-described functions of the lower bezel portion 1714 may instead, or together with, be performed by the upper bezel portion 1713 separated by other separators 1715. In this case, the diversity unit antenna area of FIG. 17 may be utilized as an antenna for diversity MIMO. For example, the upper bezel portion 1714 may be part of a diversity antenna supporting the LB, H/MB band or H/MB band.

According to various embodiments, the right bezel portion 1711 or the left bezel portion 1712 may also be powered in order to operate as an antenna. For example, the right bezel portion 1711 or the left bezel portion 1712 may be part of an antenna supporting the H/MB or LB, H/MB band. The antenna including the right bezel portion 1711 or the left bezel portion 1712 included in the main portion antenna area may be operated as a main antenna (e.g., the first antenna). The antenna including the right bezel portion 1711 or the left bezel portion 1712 included in the antenna area of the diversity unit may be operated as a diversity antenna.

Figure 18:
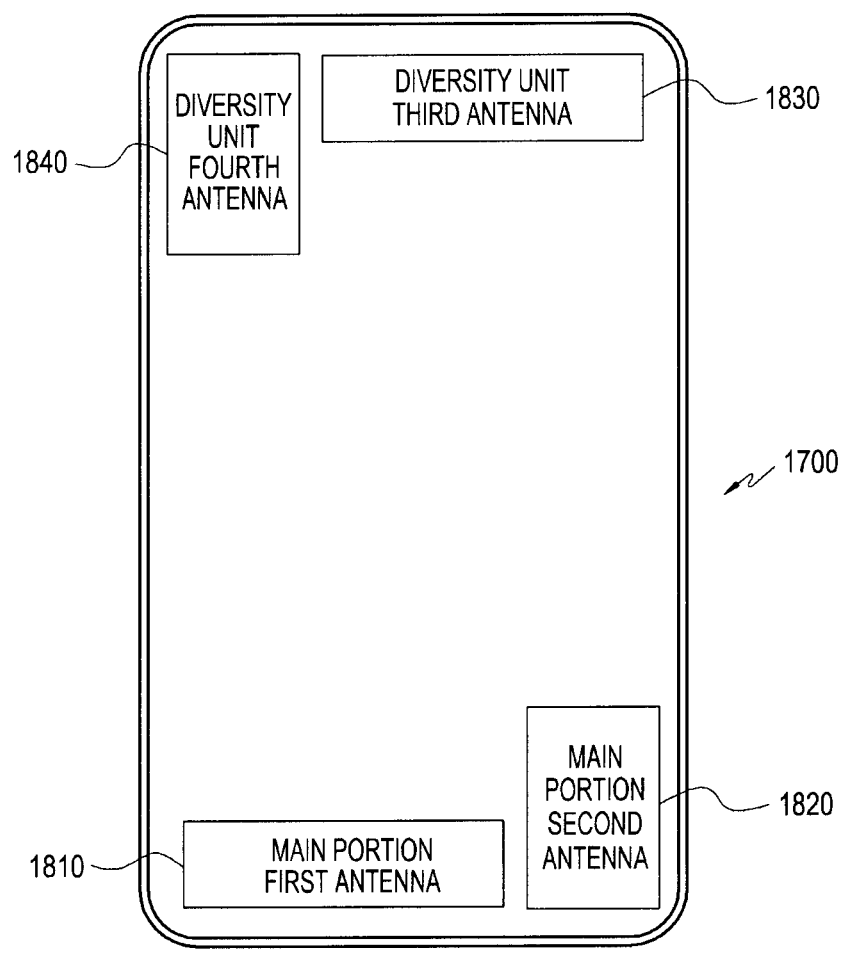
FIG. 18 is a view illustrating an example in which an antenna of a boxer is mounted in an electronic device according to an embodiment of the present invention.

FIG. 18 is a view illustrating an example in which an antenna of a boxer is mounted in an electronic device according to an embodiment of the present invention.

Referring to FIG. 18, a first antenna 1810 supports the LB and H/MB band, and a second antenna 1820 supports the H/MB band. Here, the reason why only one antenna supports the LB band is that the LB band has a relatively long wavelength, causing the antenna to be bulky, hence rendering it difficult to add a plurality of LB-supporting antennas in the main portion of the terminal. Although addable, they are positioned close to each other, likely causing correlation/isolation issues. This is why a longer wavelength leads to an increase in the antenna separation distance required for a diversity or MIMO operation.

Where a diversity unit is added as shown in FIG. 18, a third antenna 1830 and a fourth antenna 1840 are included. To raise the correlation/isolation characteristics, the first and second antennas 1810 and 1820 of the main portion are typically included in the lower end portion of the terminal, and the third and fourth antennas 1830 and 1840 of the diversity unit may be included in the upper end of the electronic device 101. The third antenna 1830 supports the LB and H/MB band, and the fourth antenna 1840 supports the H/MB band. Therefore, although a plurality of LB band antennas is included, a possible antenna isolation distance may be secured inside the electronic device.

The above-described structure enables reception with four antennas in the H/MB band and two antennas in the LB band. In other words, 4th order diversity/MIMO may be performed in the H/MB band, and 2nd order diversity/MIMO may be performed in the LB band.

Figure 19:
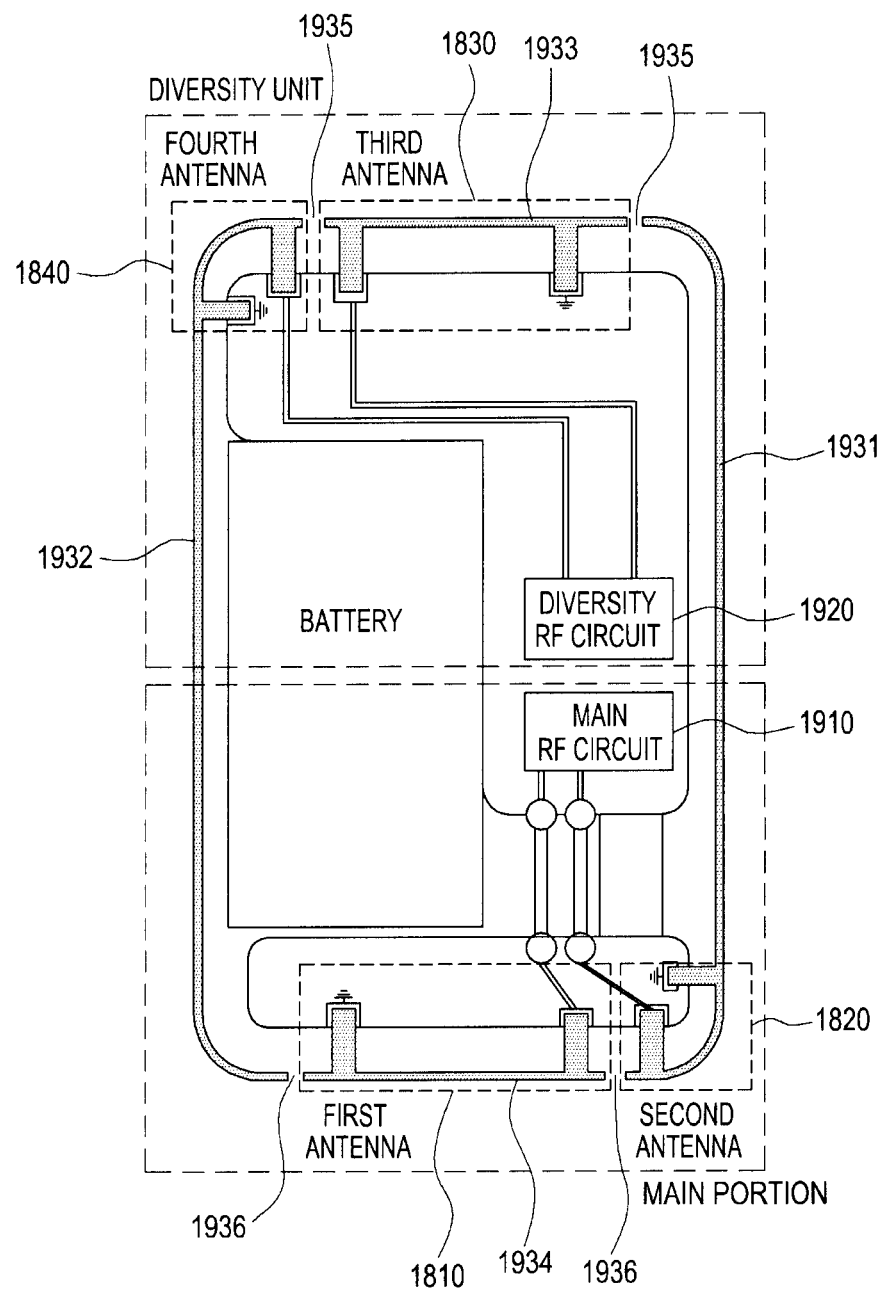
FIG. 19 is a view illustrating a configuration of an antenna device according to various embodiments of the present invention.

FIG. 19 is a view illustrating a configuration of an antenna device according to various embodiments of the present invention.

According to various embodiments, the metal bezel of FIG. 19 may be similar to or different from the metal bezel of FIG. 17.

Referring to FIG. 19, the metal bezel, when viewed from the front, may include a right bezel portion 1931, a left bezel portion 1932, a lower bezel portion 1934, and an upper bezel portion 1933. According to an embodiment of the present invention, the lower bezel portion 1934 may remain separated from the right bezel portion 1931 and the left bezel portion 1932 by a pair of separators 1936 formed at a predetermined interval. The upper bezel portion 1933 may remain separated from the right bezel portion 1931 and the left bezel portion 1932 by a pair of separators 1935 formed at a predetermined interval. According to an embodiment, the pair of separators may be formed of a dielectric. According to an embodiment of the present invention, the pair of separators may be formed in such a manner that a synthetic resin is double-injected or double-molded in the metal bezel formed of a metal. However, the pair of separators may adopt other various insulative materials or substances without limited thereto.

According to various embodiments, a predetermined first power feeding piece may be formed integrally with the side bezel portion, and the first power feeding piece may be powered by a first power feeder of the board (PCB). According to an embodiment, the first power feeding piece of the lower bezel portion may be connected to the first power feeder of the board simply by the operation by which the board is installed in the electronic device.

According to various embodiments, a first power feeding pad may be disposed on the board, and the first power feeding pad may electrically be connected with the first power feeding piece of the lower bezel portion. According to an embodiment, a first electrical path (e.g., a wiring line) may be formed from the first power feeding pad to the first power feeder. The lower bezel portion may be part of the first antenna 1810 of the main portion supporting the LB, H/MB, or H/MB band. The left bezel portion 1932 and the right bezel portion 1931 may be powered in the same manner. The left bezel portion 1932 and the right bezel portion 1931 may be part of the second antenna 1820 of the main portion supporting the LB, H/MB, or H/MB band.

According to various embodiments, a first grounding piece may integrally be formed with the lower bezel portion 1934 in a position a predetermined distance away from the power feeding piece, and the first grounding piece may be grounded to the first ground portion of the board PCB. According to an embodiment, the first grounding piece of the lower bezel portion may be grounded to the first ground portion of the board simply by the operation by which the board is installed in the electronic device.

According to various embodiments, a first grounding pad may be disposed on the board, and the first grounding pad may electrically be connected with the first grounding piece of the lower bezel portion. According to an embodiment, a second electrical path (e.g., a wiring line) may be formed from the first grounding pad to the first grounding portion.

According to various embodiments, a predetermined second power feeding piece may be formed integrally with the right bezel portion 1931, and the second power feeding piece may be powered by a second power feeder of the board (PCB). According to an embodiment, the second power feeding piece of the lower bezel portion 1934 may be connected to the second power feeder of the board or electrically connected by a separate electrical connecting member (e.g., a C clip) simply by the operation by which the board is installed in the electronic device.

According to various embodiments, a second power feeding pad may be disposed on the board, and the second power feeding pad may electrically be connected with the second power feeding piece of the lower bezel portion 1934. According to an embodiment, a third electrical path (e.g., a wiring line) may be formed from the second power feeding pad to the second power feeder. The right bezel portion may be part of the second antenna 1820 of the main portion supporting the LB, H/MB, or H/MB band.

According to various embodiments, a second grounding piece may be formed integrally with the right bezel portion in a position a predetermined distance away from the separator, and the second grounding piece may be grounded to the second grounding portion of the board PCB. According to an embodiment, the second grounding piece of the right bezel portion 1931 may be grounded to the second grounding portion of the board or electrically connected by a separate electrical connecting member (e.g., a C clip) simply by the operation by which the board is installed in the electronic device.

According to various embodiments, a second grounding pad may be disposed on the board, and the second grounding pad may electrically be connected with the second grounding piece of the right bezel portion 1931. According to an embodiment, a fourth electrical path (e.g., a wiring line) may be formed from the second grounding pad to the second grounding portion.

The power feeder of the main portion and the power feeding pad, and the grounding portion and the grounding pad may be disposed on the sub PCB. The RF circuits 1910 and 1920 of the diversity unit and the main portion may be disposed on the main PCB. The main PCB and the sub PCB may be connected with each other via an FPCB. The sub PCB may integrally be formed with the FPCB.

The sub PCB may be disposed lower than the main PCB on the vertical line in the terminal. Thus, parts included in the sub PCB may be further spaced apart from the antenna. Relatively thick parts, such as USB connector or speaker may be disposed on the sub PCB.

Transmission/reception signals or reception signals of the RF circuit of the main portion may be transferred to the first and second power feeders of the sub PCB via coaxial cables.

According to various embodiments, transmission/reception signals or reception signals of the RF circuit of the main portion may be transferred to the first and second power feeders of the sub PCB via the FPCB.

The diversity unit includes a third antenna 1830 and a fourth antenna 1840. The third antenna 1830 may include part of the upper bezel portion 1933, and the fourth antenna 1840 may include the left bezel portion 1932 or the right bezel portion 1931.

The third antenna 1830 may support the LB, H/MB, or H/MB band, and the fourth antenna 1840 may support the H/MB or LB, H/MB band. The power feeder and power feeding pad of the diversity unit and the grounding portion and grounding pads may be disposed on the main PCB. The electrical paths connecting the power feeder and power feeding pad in the diversity unit and the electrical paths connecting the ground portion and ground pad may be disposed on the main PCB.

According to various embodiments, when the main portion uses the right bezel portion 1931 as the second antenna for inter-antenna signal separation, the diversity unit may use, as the fourth antenna, the left bezel portion 1932 which is positioned at an opposite side. When the main portion uses the left bezel portion 1932 as the second antenna, the antenna portion may use, as the fourth antenna, the right bezel portion 1931 which is positioned at an opposite side.

Figure 20A:
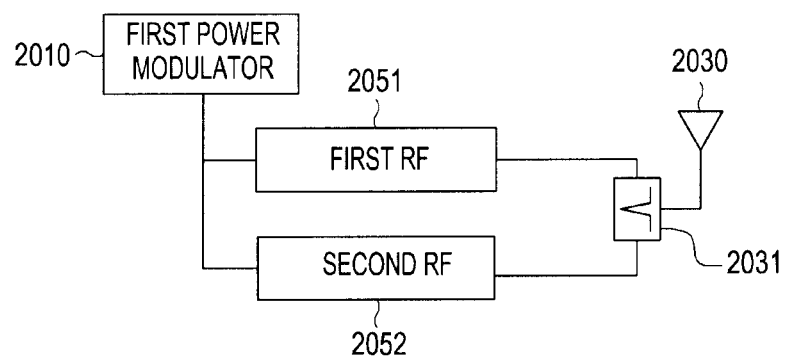
FIG. 20a is a view illustrating an example of an uplink CA structure in which a first RF and a second RF with different frequency bands are connected with a single antenna according to an embodiment of the present invention.
Figure 20B:
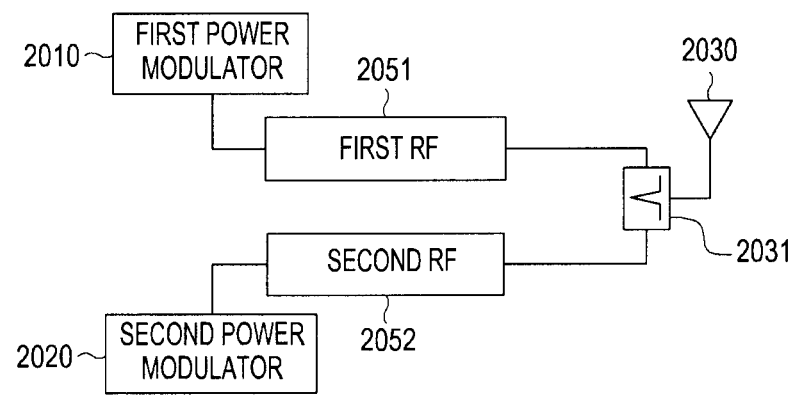
FIG. 20b is a view illustrating an example of a structure in which the first RF of FIG. 20a is connected to a first power modulator, and the second RF is connected to a second power modulator.
Figure 20C:
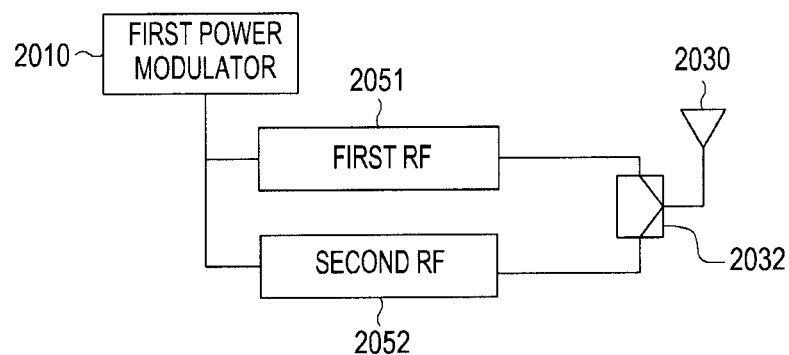
FIG. 20c is a view illustrating an example of an uplink CA structure in which a first RF and a second RF with overlapping frequency bands are connected with a single antenna according to an embodiment of the present invention.
Figure 20D:
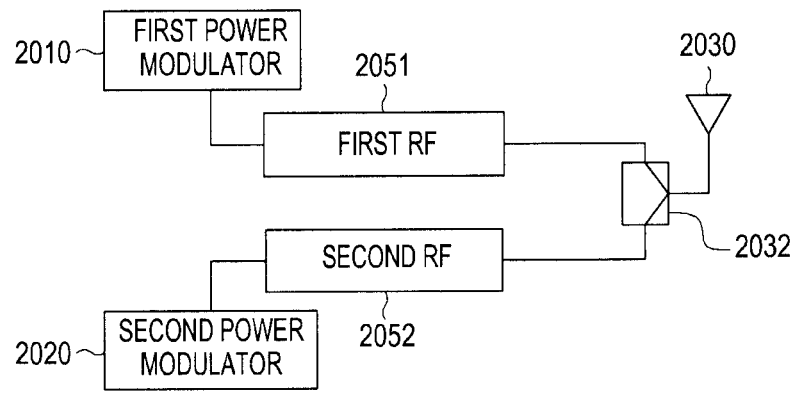
FIG. 20d is a view illustrating an example of a structure in which the first RF of FIG. 20c is connected to a first power modulator, and the second RF is connected to a second power modulator.
Figure 20E:
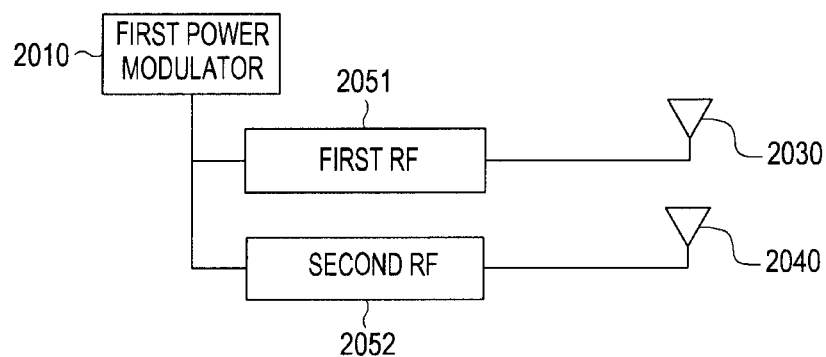
FIG. 20e is a view illustrating an example of an uplink CA structure in which a first RF and a second RF are connected with their respective antennas according to an embodiment of the present invention.
Figure 20F:
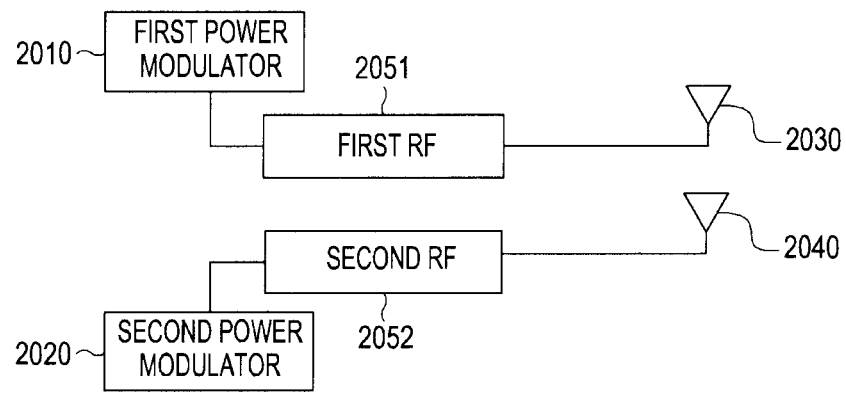
FIG. 20f is a view illustrating an example of a structure in which the first RF of FIG. 20e is connected to a first power modulator, and the second RF is connected to a second power modulator.
Figure 20G:
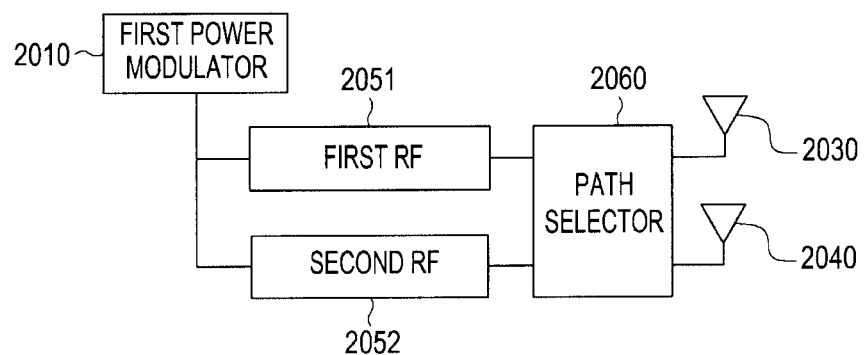
FIG. 20g is a view illustrating an example of an uplink CA structure in which a first RF and a second RF may selectively be connected with two antennas according to an embodiment of the present invention.
Figure 20H:
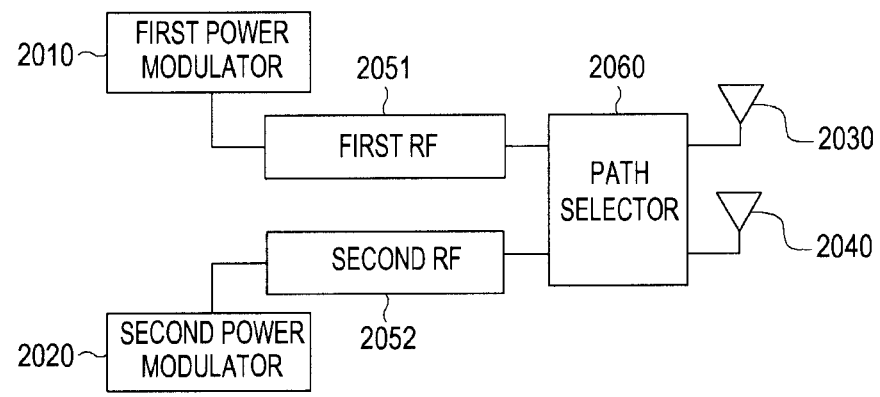
FIG. 20h is a view illustrating an example of a structure in which the first RF of FIG. 20g is connected to a first power modulator, and the second RF is connected to a second power modulator.
Figure 20I:
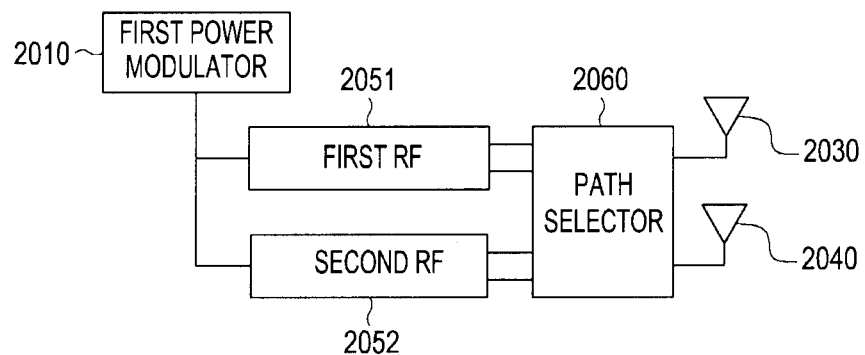
FIG. 20i is a view illustrating an example of an uplink CA structure in which a first RF and a second RF each include a plurality of input/output ports and may selectively be connected with two antennas according to an embodiment of the present invention.
Figure 20J:
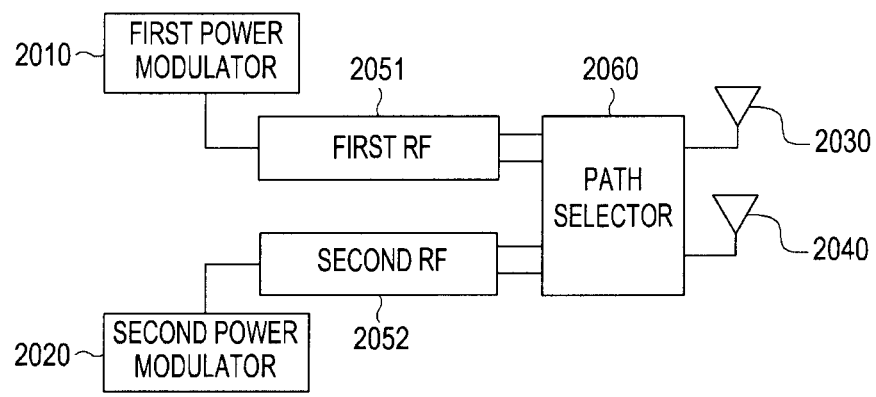
FIG. 20j is a view illustrating an example of a structure in which the first RF of FIG. 20g is connected to a first power modulator, and the second RF is connected to a second power modulator.
Figure 20K:
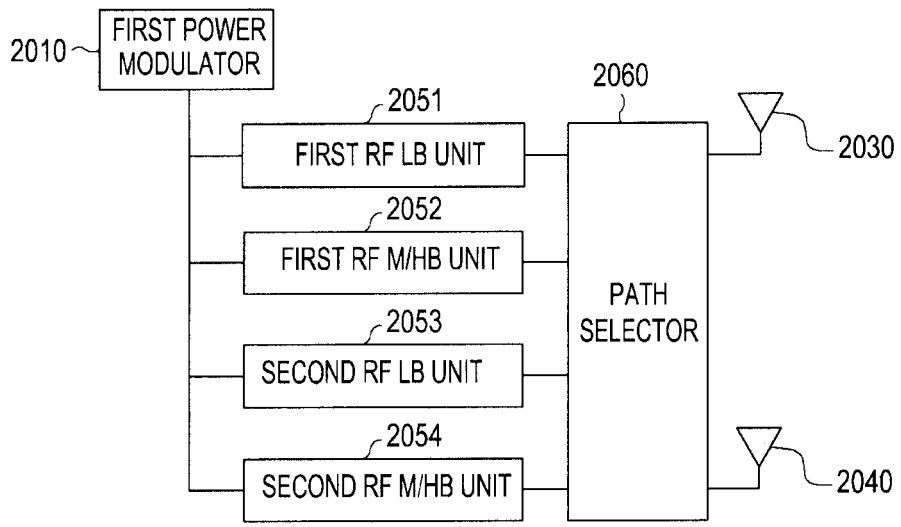
FIG. 20k is a view illustrating an example of an uplink CA structure in which a PA in a first RF is modularized into an LB and an M/HB, and a PA in a second RF is modularized into an LB and an M/HB according to an embodiment of the present invention.
Figure 20L:
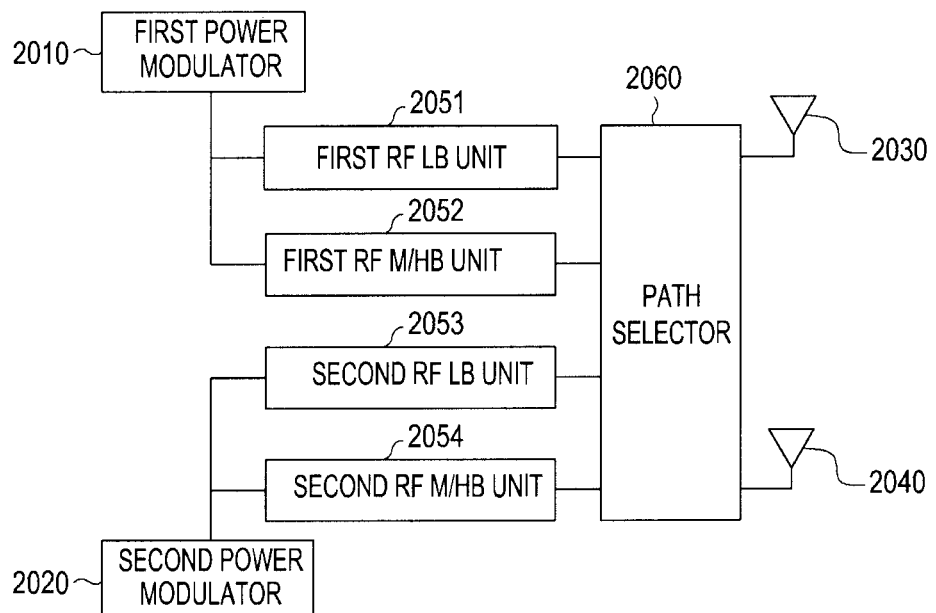
FIG. 20l is a view illustrating an example of a structure in which PAs in the first RF of FIG. 20k are connected to a first power modulator, and PAs in the second RF are connected to a second power modulator.
Figure 20M:
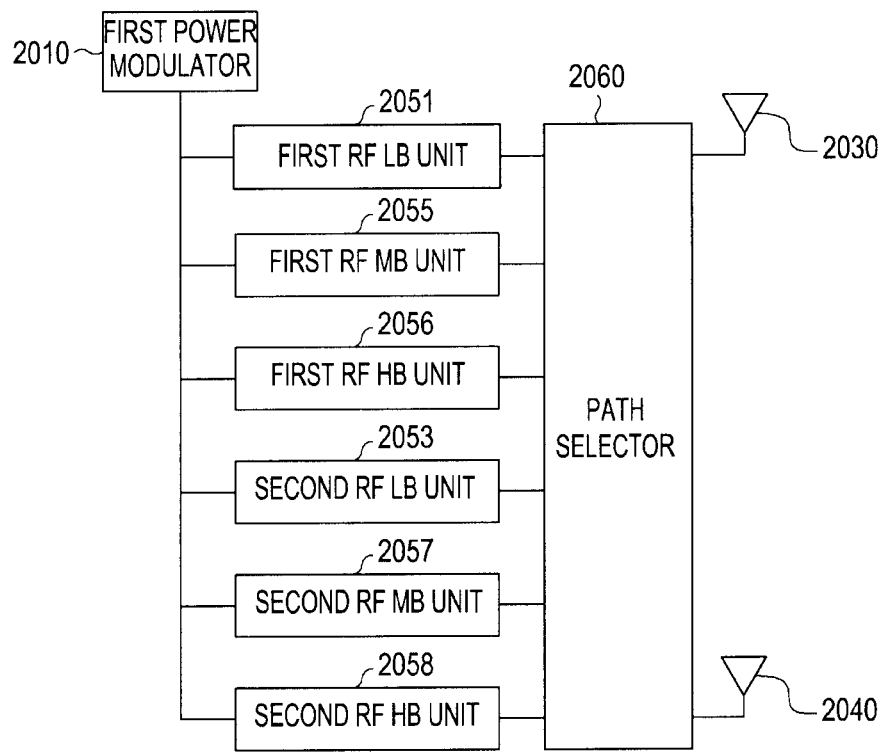
FIG. 20m is a view illustrating an example of an uplink CA structure in which a PA in a first RF is modularized into an LB, an MB, and an HB, and a PA in a second RF is modularized into an LB, an MB, and an HB according to an embodiment of the present invention.
Figure 20N:
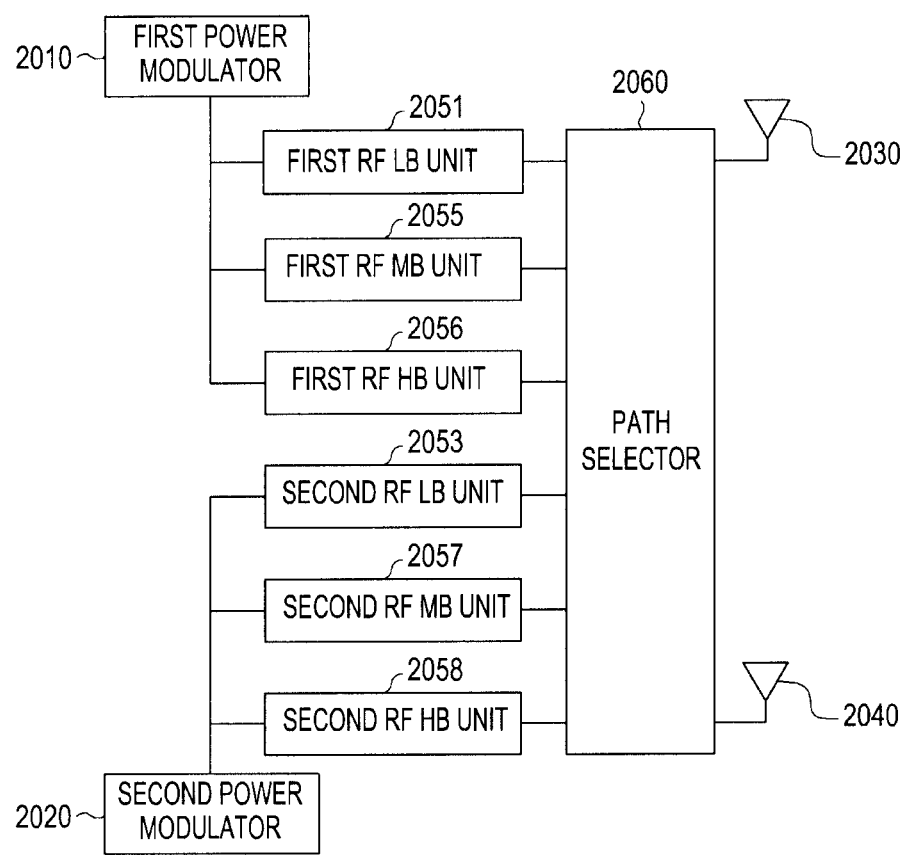
FIG. 20n is a view illustrating an example of a structure in which PAs in the first RF of FIG. 20m are connected to a first power modulator, and PAs in the second RF are connected to a second power modulator.
Figure 20O:
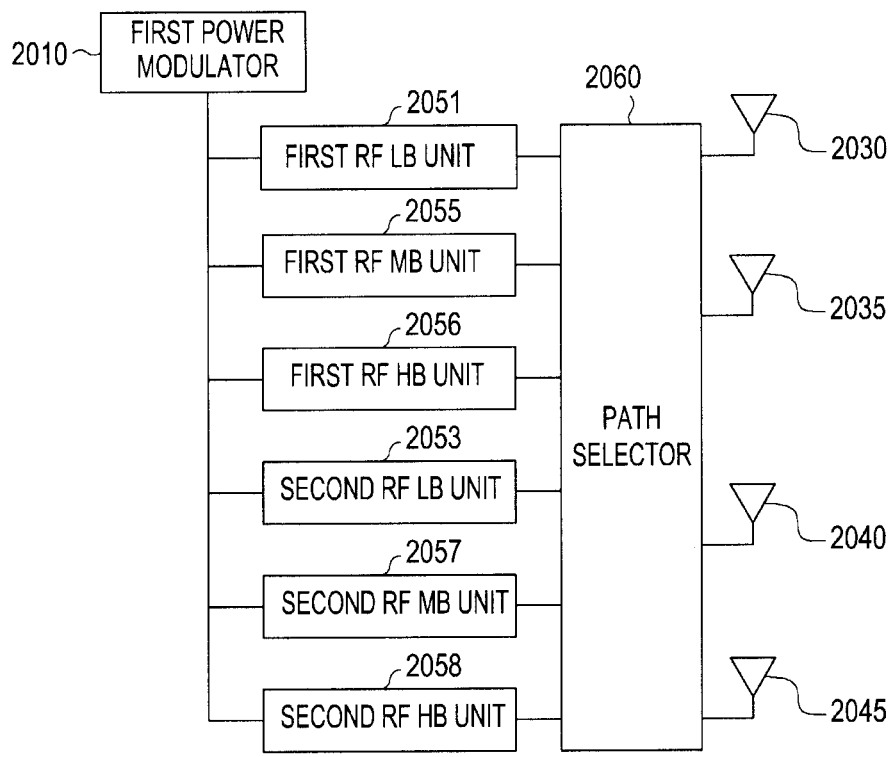
FIG. 20o is a view illustrating an example of an uplink CA structure in which the respective PAs of a first RF and a second RF are connected with four antennas according to an embodiment of the present invention.
Figure 20P:
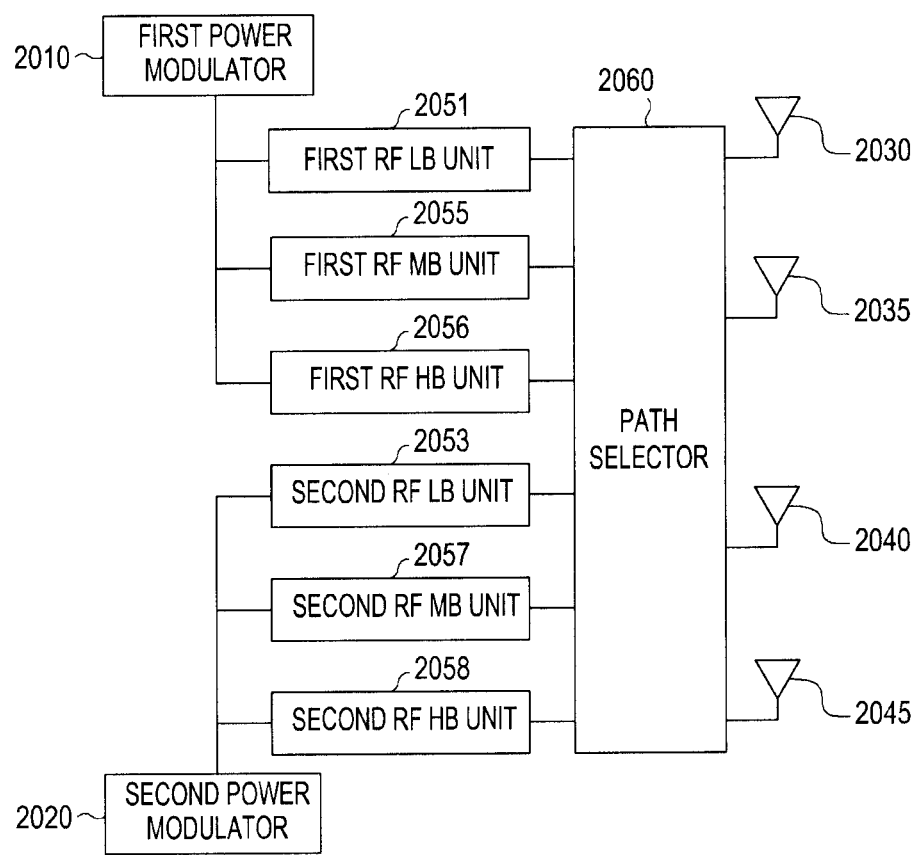
FIG. 20p is a view illustrating an example of an uplink CA structure in which each PA in the first RF of FIG. 20o is connected to a first power modulator, and each PA in the second RF is connected to a second power modulator.
Figure 20Q:
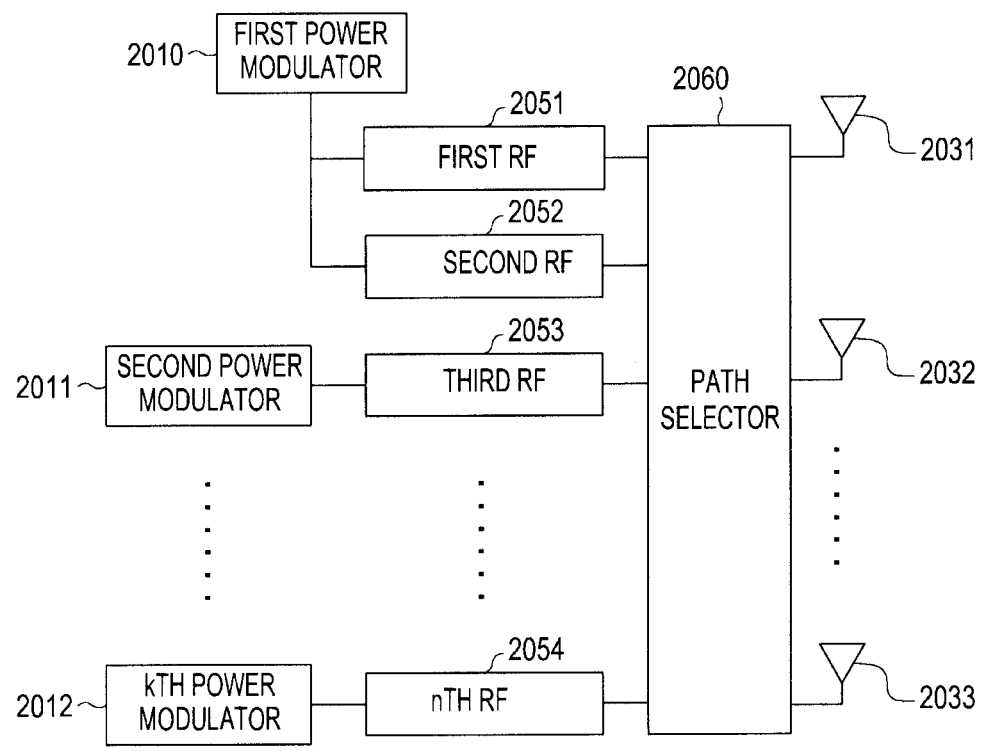
FIG. 20q is a view illustrating an example of an uplink CA structure in which n RFs, m antennas, and k power modulators are connected according to an embodiment of the present invention.
Figure 20R:
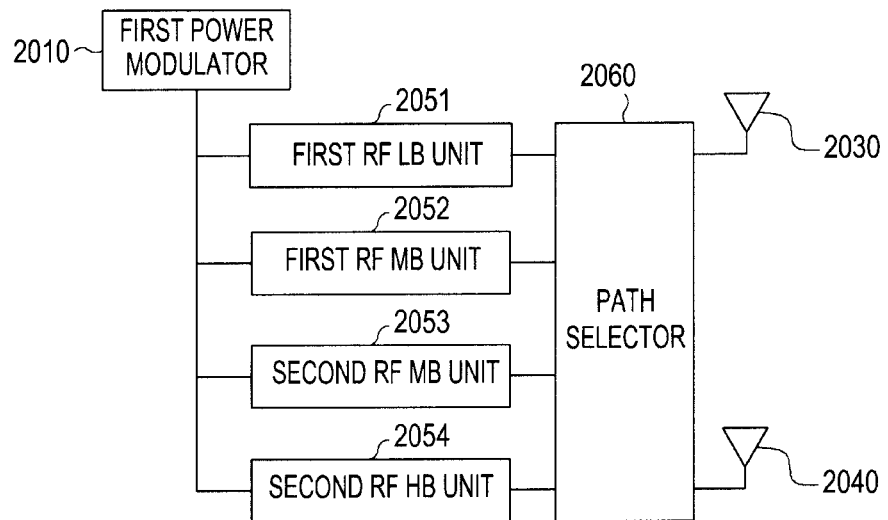
FIG. 20r is a view illustrating an example of an uplink CA structure where a first RF supports an LB and an MB, and a second RF supports an MB and an HB according to an embodiment of the present invention.
Figure 20S:
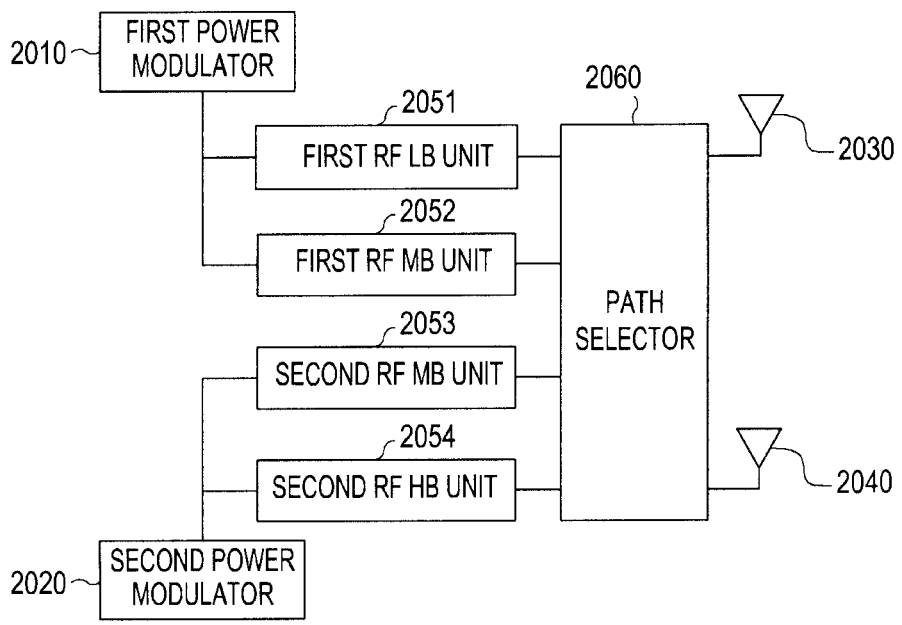
FIG. 20s is a view illustrating an example of an uplink CA structure in which an LB and MB in the first RF of FIG. 20r are connected to a first power modulator, and an MB and HB in the second RF are connected to a second power modulator.
Figure 20T:
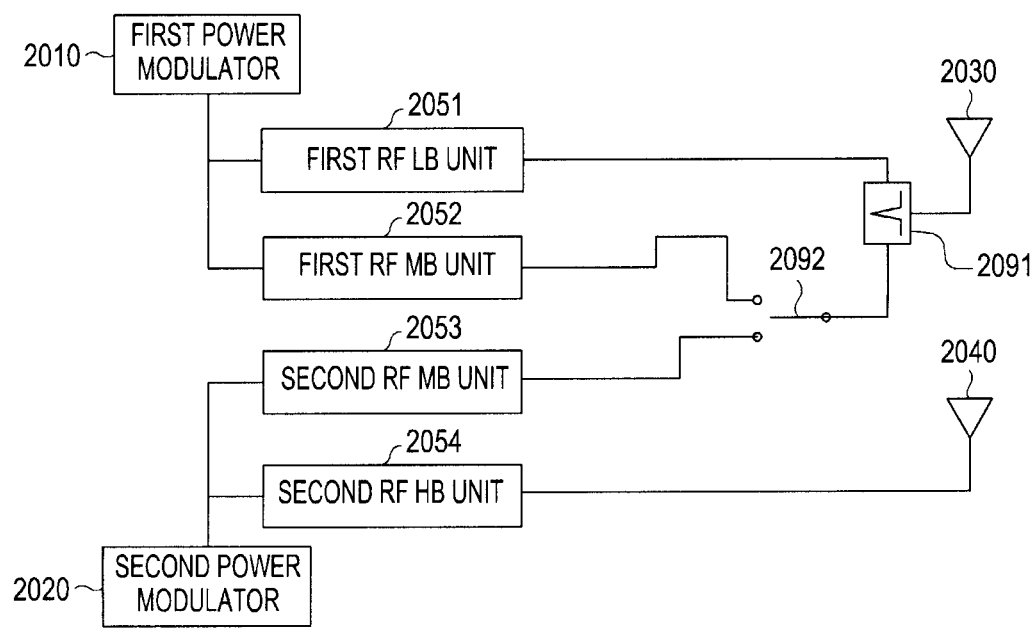
FIG. 20t is a view illustrating a specific example of the path selector of FIG. 20s.

FIGS. 20*a* to 20*t* are block diagrams illustrating various examples of providing uplink CA according to an embodiment of the present invention. The components (e.g., the first RF, second RF, first power modulator, second power modulator, first antenna, second antenna, diplexer, and path selector) of FIGS. 20*a* to 20*t* may be added or omitted or have the same or different functions according to embodiments of providing one or more-uplink CA.

The components shown in FIGS. 20*a* to 20*t* and the examples are described below.

According to various embodiments, the first RF may be called a first PA group, and the second RF may be called a second PA group. Each PA group may include an LB PA, an MB PA, and an HB PA. For example, the first RF may include a first RF LB unit, a first RF MB unit, and a first RF HB unit, and the second RF may include a second RF LB unit, a second RF MB unit, and a second RF HB unit. The first RF and the second RF each may include at least one PA (e.g., LB PA, MB PA, or HB PA) to amplify transmitted signals, a diplexer to separate transmitted signals and received signals, a quadplexer to separate the transmitted signals and received signals or to divide the received signals into a first band and a second band depending on bands, and a switch to switch transmitted and received signals. The first RF and the second RF each may provide a path to transmit or receive signals. The first RF and the second RF may amplify signals by using power that is output from the power modulator.

According to various embodiments, as the power modulator may supply power to at least one PA in the first RF and the second RF, the electronic device 101 may perform two-uplink CA by simultaneously using the PA in the first RF and the PA in the second RF. Under the control of the communication processor 480, the power modulator may control output power by using any one (or at least one) of the envelope tracking mode, in which voltage is adjusted as per the envelope of the transmitted signal and is supplied to the PA, the average power tracking mode, in which voltage is adjusted corresponding to the mean output power of each PA and is supplied to the PA, and the bypass mode, in which a constant voltage is supplied to the PA and may supply power to at least one PA in the first RF and the second RF. Under the control of the communication processor 480, the power modulator may control output power by using any one (or at least one) of the envelope tracking mode, in which voltage is adjusted as per the envelope of the transmitted signal and is supplied to the PA, the average power tracking mode, in which voltage is adjusted corresponding to the mean output power of each PA and is supplied to the PA, and the bypass mode, in which a constant voltage is supplied to the PA.

According to various embodiments, the diplexer may separate transmitted signals and received signals and may be configured to selectively connect each antenna with the transmit/receive paths. The diplexer may separate signals transmitted or received via the first antenna into per-LB signals and per-MB signals and may separate signals transmitted or received via the second antenna into per-LB signals and per-HB signals.

According to various embodiments, the path selector may include at least one switch, at least one duplexer, at least one diplexer, and at least one quadplexer. The path selector, by such configuration, may provide the path between each antenna and each RF or provide switching from each antenna to the LB PA, MB PA, and HB PA included in each RF. The path selector may selectively connect each antenna to the transmit/receive paths by using at least one of the switch, diplexer, duplexer, and quadplexer.

According to various embodiments, the antenna may receive signals from an external electronic device (e.g., a base station) or transmit signals to the base station. The antenna may transmit signals output from the path selector to the external electronic device or transfer signals received from the external electronic device to the path selector. The electronic device 101 may include a plurality of antennas.

FIG. 20*a* is a view illustrating an example of an uplink CA structure in which a first RF and a second RF with different frequency bands are connected with a single antenna according to an embodiment of the present invention. FIG. 20*b* is a view illustrating an example of a structure in which the first RF of FIG. 20*a* is connected to a first power modulator, and the second RF is connected to a second power modulator.

Referring to FIG. 20*a*, the first RF 2051 and the second RF 2052 may receive power from the first power modulator 2010 and may transmit or receive signals to/from the antenna 2030 through the diplexer 2031. The frequency bands supported by the first RF 2051 and the second RF 2052 may differ from each other, and the voltage output from the first power modulator 2010 may be calculated by Equation 3.

$$V_{envTx}=(\max(V_{envTx[1]}, V_{envTx[2]}, \ldots, V_{envTx[n]})+\text{Offset} \quad [\text{Equation 3}]$$

In Equation 3, $V_{envTx[n]}$ is the control voltage of the power modulator reflecting the transmit envelope of the nth PA, and $V_{envTx}$ is the control voltage of the power modulator selecting a control voltage among the control voltages determined by the PAs to supply power to the plurality of PAs. An offset may be added for stable power supply. The power modulator may provide voltage to the first RF 2051 and the second RF 2052 via any one of, e.g., the envelope tracking mode, average power tracking mode, and bypass mode. When signals are simultaneously transmitted through the first RF 2051 and the second RF 2052, power use efficiency may be raised. Signals output from the first RF 2051 and the second RF 2052 may be transmitted through the diplexer 2031 to the antenna 2030, and signals received by the antenna 2030 may be delivered through the diplexer 2031 to at least one of the first RF 2051 and the second RF 2052.

FIG. 20b adds a second power modulator 2020 to the structure of FIG. 20a. The first power modulator 2010 may provide voltage to the first RF 2051, and the second power modulator 2020 may provide voltage to the second RF 2052. The first power modulator 2010 may provide voltage to the first RF 2051 via any one of, e.g., the envelope tracking mode, average power tracking mode, and bypass mode. The second power modulator 2020 may provide voltage to the second RF 2052 via any one of, e.g., the envelope tracking mode, average power tracking mode, and bypass mode. Signals output from the first RF 2051 and the second RF 2052 may be transmitted through the diplexer 2031 to the antenna 2030, and signals received by the antenna 2030 may be delivered through the diplexer 2031 to at least one of the first RF 2051 and the second RF 2052. Each power modulator may be used per operating PA, thereby leading to higher power use efficiency in the uplink CA operation than by the structure of FIG. 20a.

FIG. 20c is a view illustrating an example of an uplink CA structure in which a first RF and a second RF with overlapping frequency bands are connected with a single antenna according to an embodiment of the present invention. FIG. 20d is a view illustrating an example of a structure in which the first RF of FIG. 20c is connected to a first power modulator, and the second RF is connected to a second power modulator.

Referring to FIGS. 20c and 20d, the first RF 2051 and the second RF 2052 may have overlapping or identical frequency bands that they support. The power modulator may provide voltage to the first RF 2051 and the second RF 2052 via any one of, e.g., the envelope tracking mode, average power tracking mode, and bypass mode. Signals output from the first RF 2051 and the second RF 2052 may be transmitted through the splitter/combiner 2032 to the antenna 2030, and signals received by the antenna 2030 may be delivered through the splitter/combiner 2032 to at least one of the first RF 2051 and the second RF 2052.

FIG. 20d adds a second power modulator 2020 to the structure of FIG. 20c. The first power modulator 2010 may provide voltage to the first RF 2051, and the second power modulator 2020 may provide voltage to the second RF 2052. Signals output from the first RF 2051 and the second RF 2052 may be transmitted through the splitter/combiner 2032 to the antenna 2030, and signals received by the antenna 2030 may be delivered through the splitter/combiner 2032 to at least one of the first RF 2051 and the second RF 2052.

FIG. 20e is a view illustrating an example of an uplink CA structure in which a first RF and a second RF are connected with their respective antennas according to an embodiment of the present invention. FIG. 20f is a view illustrating an example of a structure in which the first RF of FIG. 20e is connected to a first power modulator, and the second RF is connected to a second power modulator.

Referring to FIGS. 20e and 20f, the first RF 2051 may be connected to the first antenna 2030, and the second RF 2052 may be connected to the second antenna 2040. The power modulator 2010 may provide voltage to the first RF 2051 and the second RF 2052 via any one of, e.g., the envelope tracking mode, average power tracking mode, and bypass mode. Signals output from the first RF 2051 may be transmitted through the first antenna 2030, and signals output from the second RF 2052 may be transmitted through the second antenna 2040. Signals received through the first antenna 2030 may be delivered to the first RF 2051, and signals received through the second antenna 2040 may be delivered to the second RF 2052.

FIG. 20f adds a second power modulator 2020 to the structure of FIG. 20e. The first power modulator 2010 may provide voltage to the first RF 2051, and the second power modulator 2020 may provide voltage to the second RF 2052. Signals output from the first RF 2051 may be transmitted through the first antenna 2030, and signals output from the second RF 2052 may be transmitted through the second antenna 2040. Signals received through the first antenna 2030 may be delivered to the first RF 2051, and signals received through the second antenna 2040 may be delivered to the second RF 2051.

FIG. 20g is a view illustrating an example of an uplink CA structure in which a first RF and a second RF may selectively be connected with two antennas according to an embodiment of the present invention. FIG. 20h is a view illustrating an example of a structure in which the first RF of FIG. 20g is connected to a first power modulator, and the second RF is connected to a second power modulator.

Referring to FIGS. 20g and 20h, the first RF 2051 may selectively be connected to any one of the first antenna 2030 and the second antenna 2040 through the path selector 2060, and the second RF 2052 may selectively be connected to any one of the first antenna 2030 and the second antenna 2040 through the path selector 2060. The power modulator 2010 may provide voltage to the first RF 2051 and the second RF 2052 via any one of, e.g., the envelope tracking mode, average power tracking mode, and bypass mode. Signals output from the first RF 2051 may be transmitted through the path selector 2060 and any one of the first antenna 2030 and the second antenna 2040, and signals output from the second RF 2052 may be transmitted through the path selector 2060 and any one of the first antenna 2030 and the second antenna 2040. Signals received through the first antenna 2030 may be delivered through the path selector 2060 to any one of the first RF 2051 and the second RF 2052, and signals received through the second antenna 2040 may be delivered through the path selector 2060 to any one of the first RF 2051 and the second RF 2052. The frequency support bands of the first antenna 2030 and the second antenna 2040 may include at least partially overlapping bands. The path selector 2060 may include at least one switch, at least one duplexer, at least one diplexer, and at least one quadplexer. The path selector 2060, by such configuration, may provide the path between each antenna and each RF circuit. The path selector 2060 may include at least one of a switch, a filter, a diplexer, a duplexer, a splitter, and a triplexer, and may selectively or simultaneously connect each antenna with the transmit/receive paths.

FIG. 20h adds a second power modulator 2020 to the structure of FIG. 20g. The first power modulator 2010 may provide voltage to the first RF 2051, and the second power modulator 2020 may provide voltage to the second RF 2052. Signals output from the first RF 2051 may be transmitted through any one of the first antenna 2030 and the second antenna 2040, and signals output from the second RF 2052 may be transmitted through any one of the first antenna 2030 and the second antenna 2040. Signals received through the first antenna 2030 may be delivered to any one of the first RF 2051 and the second RF 2052, and signals received through the second antenna 2040 may be delivered to any one of the first RF 2051 and the second RF 2052.

FIG. 20i is a view illustrating an example of an uplink CA structure in which a first RF and a second RF each include a plurality of input/output ports and may selectively be connected with two antennas according to an embodiment of the present invention. FIG. 20j is a view illustrating an example of a structure in which the first RF of FIG. 20g is connected to a first power modulator, and the second RF is connected to a second power modulator.

Referring to FIGS. 20*i* and 20*j*, the first RF 2051 and the second RF 2052 each may include a plurality of input/output ports, and in some cases, may selectively connect the plurality of input/output ports to the antenna. An RF transmit or receive circuit supporting at least one or more bands may be connected to each port. For example, a first port of the first RF 2051 may be connected to a circuit including the PA and duplexer supporting a first band, and a second port of the first RF 2051 may be connected to a circuit including the PA and duplexer supporting a second band. The first RF 2051 may selectively be connected to any one of the first antenna 2030 and the second antenna 2040 through the input/output port, and the second RF 2052 may selectively be connected to any one of the first antenna 2030 and the second antenna 2040 through the input/output port. The power modulator 2010 may provide voltage to the first RF 2051 and the second RF 2052 via any one of, e.g., the envelope tracking mode, average power tracking mode, and bypass mode. Signals output from the first RF 2051 may be transmitted through the input/output port and any one of the first antenna 2030 and the second antenna 2040, and signals output from the second RF 2052 may be transmitted through the input/output port and any one of the first antenna 2030 and the second antenna 2040. Signals received through the first antenna 2030 may be delivered through the input/output port to any one of the first RF 2051 and the second RF 2052, and signals received through the second antenna 2040 may be delivered through the path selector 2060 to any one of the first RF 2051 and the second RF 2052. The frequency support bands of the first antenna 2030 and the second antenna 2040 may include at least partially overlapping bands.

FIG. 20*j* adds a second power modulator 2020 to the structure of FIG. 20*i*. The first power modulator 2010 may provide voltage to the first RF 2051, and the second power modulator 2020 may provide voltage to the second RF 2052. Signals output from the first RF 2051 may be transmitted through any one of the first antenna 2030 and the second antenna 2040, and signals output from the second RF 2052 may be transmitted through any one of the first antenna 2030 and the second antenna 2040. Signals received through the first antenna 2030 may be delivered to any one of the first RF 2051 and the second RF 2052, and signals received through the second antenna 2040 may be delivered to any one of the first RF 2051 and the second RF 2052.

FIG. 20*k* is a view illustrating an example of an uplink CA structure in which a PA in a first RF is modularized into an LB and an M/HB, and a PA in a second RF is modularized into an LB and an M/HB according to an embodiment of the present invention. FIG. 20*l* is a view illustrating an example of a structure in which PAs in the first RF of FIG. 20*k* are connected to a first power modulator, and PAs in the second RF are connected to a second power modulator.

Referring to FIGS. 20*k* and 20*l*, a first RF LB unit 2051, a first RF M/HB unit 2052, a second RF LB unit 2053, and a second RF M/HB unit 2054 may selectively be connected through the path selector 2060 to any one of the first antenna 2030 and the second antenna 2040. Each transceiver supporting the LB and M/HB may be formed in a single RF module. The power modulator 2010 may provide voltage to the first RF LB unit 2051, the first RF M/HB unit 2052, the second RF LB unit 2053, and the second RF M/HB unit 2054 via any one of, e.g., the envelope tracking mode, the average power tracking mode, and the bypass mode. Signals output from the first RF LB unit 2051, the first RF M/HB unit 2052, the second RF LB unit 2053, and the second RF M/HB unit 2054 may be transmitted through the path selector 2060 and at least one of the first antenna 2030 and the second antenna 2040. Signals received through at least one of the first antenna 2030 and the second antenna 2040 may be transferred through the path selector 2060 to at least one of the first RF LB unit 2051, the first RF M/HB unit 2052, the second RF LB unit 2053, and the second RF M/HB unit 2054. The frequency support bands of the first antenna 2030 and the second antenna 2040 may include at least partially overlapping bands.

FIG. 20*l* adds a second power modulator 2020 to the structure of FIG. 20*k*. The first power modulator 2010 may provide voltage to the first RF LB unit 2051 and the first RF M/HB unit 2052, and the second power modulator 2020 may provide voltage to the second RF LB unit 2053 and the second RF M/HB unit 2054. Signals output from any one of the first RF LB unit 2051 and the first RF M/HB unit 2052 may be transmitted to any one of the first antenna 2030 and the second antenna 2040, and signals output from any one of the second RF LB unit 2053 and the second RF M/HB unit 2054 may be transmitted to any one of the first antenna 2030 and the second antenna 2040. Signals received through the first antenna 2030 may be transferred to any one of the first RF LB unit 2051, the first RF M/HB unit 2052, the second RF LB unit 2053, and the second RF M/HB unit 2054, and signals received through the second antenna 2040 may be transferred to any one of the first RF LB unit 2051, the first RF M/HB unit 2052, the second RF LB unit 2053, and the second RF M/HB unit 2054.

FIG. 20*m* is a view illustrating an example of an uplink CA structure in which a PA in a first RF is modularized into an LB, an MB, and an HB, and a PA in a second RF is modularized into an LB, an MB, and an HB according to an embodiment of the present invention. FIG. 20*n* is a view illustrating an example of a structure in which PAs in the first RF of FIG. 20*m* are connected to a first power modulator, and PAs in the second RF are connected to a second power modulator.

Referring to FIGS. 20*m* and 20*n*, a first RF LB unit 2051, a first RF MHB unit 2055, a first RF HB unit 2056, a second RF LB unit 2053, a second RF MB unit 2057, and a second RF HB unit 2058 may selectively be connected to any one of the first antenna 2030 and the second antenna 2040 via the path selector 2060. Each transceiver supporting the LB, MB, and HB may be formed in a single RF module. The power modulator 2010 may provide voltage to the first RF LB unit 2051, the first RF MHB unit 2055, the first RF HB unit 2056, the second RF LB unit 2053, the second RF MB unit 2057, and the second RF HB unit 2058 via any one of, e.g., the envelope tracking mode, the average power tracking mode, and the bypass mode. Signals output from the first RF LB unit 2051, the first RF MHB unit 2055, the first RF HB unit 2056, the second RF LB unit 2053, the second RF MB unit 2057, and the second RF HB unit 2058 may be transmitted through the path selector 2060 and at least one of the first antenna 2030 and the second antenna 2040. Signals received through at least one of the first antenna 2030 and the second antenna 2040 may be transferred through the path selector 2060 to at least one of the first RF LB unit 2051, the first RF MB unit 2055, the first RF HB unit 2056, the second RF LB unit 2053, the second RF MB unit 2057, and the second RF HB unit 2058. The frequency support bands of the first antenna 2030 and the second antenna 2040 may include at least partially overlapping bands.

FIG. 20*n* adds a second power modulator 2020 to the structure of FIG. 20*m*. The first power modulator 2010 may provide voltage to the first RF LB unit 2051, the first RF MB unit 2055, and the first RF HB unit 2056, and the second power modulator 2020 may provide voltage to the second RF LB unit 2053, the second RF MB unit 2057, and the second RF HB unit 2058. Signals output from any one of the first RF LB unit 2051, the first RF MB unit 2055, and the first RF HB unit 2056 may be transmitted to any one of the first antenna 2030 and the second antenna 2040, and signals output from any one of the second RF LB unit 2053, the second RF MB unit 2057, and the second RF HB unit 2058 may be transmitted to any one of the first antenna 2030 and the second antenna 2040. Signals received through the first antenna 2030 may be transferred to any one of the first RF LB unit 2051, the first RF MB unit 2055, the first RF HB unit 2056, the second RF LB unit 2053 the second RF MB unit 2057, and the second RF HB unit 2058, and signals received through the second antenna 2040 may be transferred to any one of the first RF LB unit 2051, the first RF MB unit 2055, the first RF HB unit 2056, the second RF LB unit 2053 the second RF MB unit 2057, and the second RF HB unit 2058.

FIG. 20o is a view illustrating an example of an uplink CA structure in which the respective PAs of a first RF and a second RF are connected with four antennas according to an embodiment of the present invention. FIG. 20p is a view illustrating an example of an uplink CA structure in which each PA in the first RF of FIG. 20o is connected to a first power modulator, and each PA in the second RF is connected to a second power modulator.

Referring to FIGS. 20o and 20p, a first RF LB unit 2051, a first RF MB unit 2055, a first RF HB unit 2056, a second RF LB unit 2053, a second RF MB unit 2057, and a second RF HB unit 2058 may selectively be connected to any one of the first antenna 2030, the second antenna 2035, the third antenna 2040, and the fourth antenna 2045 via the path selector 2060. Each transceiver supporting the LB, MB, and HB may be formed in a single RF module. The power modulator 2010 may provide voltage to the first RF LB unit 2051, the first RF MB unit 2055, the first RF HB unit 2056, the second RF LB unit 2053, the second RF MB unit 2057, and the second RF HB unit 2058 via any one of, e.g., the envelope tracking mode, the average power tracking mode, and the bypass mode. Signals output from the first RF LB unit 2051, the first RF MB unit 2055, the first RF HB unit 2056, the second RF LB unit 2053, the second RF MB unit 2057, and the second RF HB unit 2058 may be transmitted through the path selector 2060 and at least one of the first antenna 2030, the second antenna 2035, the third antenna 2040, and the fourth antenna 2045. Signals received through any one of the first antenna 2030, the second antenna 2035, the third antenna 2040, and the fourth antenna 2045 may be transferred through the path selector 2060 to at least one of the first RF LB unit 2051, the first RF MB unit 453, the first RF HB unit 2056, the second RF LB unit 2053, the second RF MB unit 2057, and the second RF HB unit 2058. The frequency support bands of the first antenna 2030, the second antenna 2035, the third antenna 2040, and the fourth antenna 2045 may include at least partially overlapping bands.

FIG. 20p adds a second power modulator 2020 to the structure of FIG. 20o. The first power modulator 2010 may provide voltage to the first RF LB unit 2051, the first RF MB unit 453, and the first RF HB unit 2056, and the second power modulator 2020 may provide voltage to the second RF LB unit 2053, the second RF MB unit 2057, and the second RF HB unit 2058. Signals output from any one of the first RF LB unit 2051, the first RF MB unit 2055, and the first RF HB unit 2056 may be transmitted to any one of the first antenna 2030, the second antenna 2035, the third antenna 2040, and the fourth antenna 2045, and signals output from any one of the second RF LB unit 2053, the second RF MB unit 2057, and the second RF HB unit 2058 may be transmitted to any one of the first antenna 2030, the second antenna 2035, the third antenna 2040, and the fourth antenna 2045. Signals received through the first antenna 2030 may be transferred to any one of the first RF LB unit 2051, the first RF MB unit 2055, the first RF HB unit 2056, the second RF LB unit 2053 the second RF MB unit 2057, and the second RF HB unit 2058, and signals received through the second antenna 2035 may be transferred to any one of the first RF LB unit 2051, the first RF MB unit 2055, the first RF HB unit 2056, the second RF LB unit 2053 the second RF MB unit 2057, and the second RF HB unit 2058. Signals received through the third antenna 2040 may be transferred to any one of the first RF LB unit 2051, the first RF MB unit 2055, the first RF HB unit 2056, the second RF LB unit 2053 the second RF MB unit 2057, and the second RF HB unit 2058, and signals received through the fourth antenna 2045 may be transferred to any one of the first RF LB unit 2051, the first RF MB unit 2055, the first RF HB unit 2056, the second RF LB unit 2053 the second RF MB unit 2057, and the second RF HB unit 2058. The frequency range and the mounting position of the first antenna 2030, the second antenna 2035, the third antenna 2040, and the fourth antenna 2045 may be varied depending on design or required specifications.

FIG. 20q is a view illustrating an example of an uplink CA structure in which n RFs, m antennas, and k power modulators are connected according to an embodiment of the present invention.

Referring to FIG. 20q, the first RF 2051 and the second RF 2052 are selectively connected to any one of the first antenna 2030, the second antenna 2032 through the mth antenna 2033 through the path selector 2060 and receives power from the first power modulator 2010. The third RF 2053 and the fourth RF (not shown) are selectively connected to any one of the first antenna 2030, the second antenna 2032 through the mth antenna 2033 through the path selector 2060 and receives power from the second power modulator 2011. Likewise, the n−1th RF (not shown) and the nth RF 2054 are selectively connected to any one of the first antenna 2030, the second antenna 2032 through the mth antenna 2033 through the path selector 2060 and receives power from the kth power modulator 2012. One power modulator may supply power to at least one RF. K power supplying units may independently supply power to each RF, and when kth uplink CA is performed, power use efficiency may be good. The frequency range of each antenna and the frequency range of each RF may be varied depending on design or required specifications.

The second RF 2052 may selectively be connected to any one of the first antenna 2031 through the mth antenna 2033 via the path selector 2060. The first power modulator 2010 may provide voltage to the first RF 2051 and the second RF 2052 via any one of, e.g., the envelope tracking mode, average power tracking mode, and bypass mode. Signals output from the first RF 2051 may be transmitted through the path selector 2060 and any one of the first antenna 2031 through the mth antenna 2033, and signals output from the second RF 2052 may be transmitted through the path selector 2060 and any one of the first antenna 2031 through the mth antenna 2033. For example, signals received through the first antenna 2031 may be delivered through the path selector 2060 to any one of the first RF 2051 and the second RF 2052, and signals received through the second antenna 2032 may be delivered through the path selector 2060 to any one of the third RF 2053 and the fourth RF (not shown). The frequency support bands of the first antenna 2031 through the mth antenna 2033 may include at least partially overlapping bands. The path selector 2060 may include at least one switch, at least one duplexer, at least one diplexer, and at least one quadplexer. The path selector 2060, by such configuration, may provide the path between each antenna and each RF or provide switching from each antenna to the LB PA, MB PA, and HB PA included in each RF. The path selector 2060 may include at least one of a switch, a filter, a diplexer, a duplexer, a splitter, and a triplexer, and may selectively connect each antenna with the transmit/receive paths. Signals received through the mth antenna 2033 may be transferred through the path selector 2060 to any one of the nth RF 2054 and the n−1th RF (not shown).

FIG. 20r is a view illustrating an example of an uplink CA structure where a first RF supports an LB and an MB, and a second RF supports an MB and an HB according to an embodiment of the present invention. FIG. 20s is a view illustrating an example of an uplink CA structure in which an LB and MB in the first RF of FIG. 20r are connected to a first power modulator, and an MB and HB in the second RF are connected to a second power modulator.

Referring to FIGS. 20r and 20s, the first RF unit may not support the HB frequency band, and the second RF unit may not support the LB band. A first RF LB unit 2051, a first RF MB unit 2052, a second RF LB unit 2053, and a second RF HB unit 2054 may selectively be connected through the path selector 2060 to any one of the first antenna 2030 and the second antenna 2040. The power modulator 2010 may provide voltage to the first RF LB unit 2051, the first RF MB unit 2052, the second RF LB unit 2053, and the second RF HB unit 2054 via any one of, e.g., the envelope tracking mode, the average power tracking mode, and the bypass mode. Signals output from the first RF LB unit 2051, the first RF MB unit 2052, the second RF LB unit 2053, and the second RF HB unit 2054 may be transmitted through the path selector 2060 and at least one of the first antenna 2030 and the second antenna 2040. Signals received through at least one of the first antenna 2030 and the second antenna 2040 may be transferred through the path selector 2060 to at least one of the first RF LB unit 2051, the first RF MB unit 2052, the second RF LB unit 2053, and the second RF HB unit 2054. The frequency support bands of the first antenna 2030 and the second antenna 2040 may include at least partially overlapping bands.

FIG. 20s adds a second power modulator 2020 to the structure of FIG. 20r. The first power modulator 2010 may provide voltage to the first RF LB unit 2051 and the first RF MB unit 2052, and the second power modulator 2020 may provide voltage to the second RF MB unit 2053 and the second RF HB unit 2054. Signals output from any one of the first RF LB unit 2051 and the first RF MB unit 2052 may be transmitted to any one of the first antenna 2030 and the second antenna 2040, and signals output from any one of the second RF MB unit 2053 and the second RF HB unit 2054 may be transmitted to any one of the first antenna 2030 and the second antenna 2040. Signals received through the first antenna 2030 may be transferred to any one of the first RF LB unit 2051, the first RF MB unit 2052, the second RF MB unit 2053, and the second RF HB unit 2054, and signals received through the second antenna 2040 may be transferred to any one of the first RF LB unit 2051, the first RF MB unit 2052, the second RF MB unit 2053, and the second RF HB unit 2054.

FIG. 20t is a view illustrating a specific example of the path selector of FIG. 20s.

Referring to FIG. 20t, the first RF unit and the second RF unit may have different frequency bands. The first RF LB unit 2051, the first RF MB unit 2052, and the second RF LB unit 2053 may be connected to the first antenna 2030 via the switch 2092 and the diplexer 2091. The second RF HB unit 2054 may be connected to the second antenna 2040. The first power modulator 2010 may provide voltage to the first RF LB unit 2051 and the first RF MB unit 2052, and the second power modulator 2020 may provide voltage to the second RF MB unit 2053 and the second RF HB unit 2054.

Signals output from any one of the first RF LB unit 2051, the first RF MB unit 2052, and the second RF MB unit 2053 may be transmitted through the switch 2092 and the diplexer 2091 to the first antenna 2030, and signals output from the second RF HB unit 2053 may be transmitted through the second antenna 2030. Signals received through the first antenna 2030 may be transferred through the switch 2092 and the diplexer 2091 to any one of the first RF LB unit 2051, the first RF MB unit 2052, and the second RF MB unit 2053, and signals received through the second antenna 2040 may be transferred to the second RF HB unit 2054.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the disclosure, at least a part of the device (e.g., modules or their functions) or method (e.g., operations) may be implemented as instructions stored in a computer-readable storage medium e.g., in the form of a program module. The instructions, when executed by a processor (e.g., the communication processor 480), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program commands may include not only machine language codes but also high-level language codes which are executable by various computing means using an interpreter. The aforementioned hardware devices may be configured to operate as one or more software modules to carry out exemplary embodiments of the disclosure, and vice versa.

According to various embodiments, there is provided a storage medium storing instructions configured to be executed by at least one processor to enable the at least one processor to perform at least one operation, wherein the at least one operation may include performing communication through a PA in a first PA group using power output from a first power modulator configured in a power unit, detecting an uplink CA request, operating a second PA group by activating a second power modulator configured in the power unit corresponding to the detected request, and controlling transmission or reception of a signal through a PA in the second PA group while performing the communication.

Modules or programming modules in accordance with various embodiments of the disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s). The embodiments disclosed herein are proposed for description and understanding of the disclosed technology and does not limit the scope of the present invention. Accordingly, the scope of the present invention should be interpreted as including all changes or various embodiments based on the technical spirit of the present invention.

The invention claimed is:

1. A portable communication device comprising:
   a radio frequency (RF) circuit including a first power amplifier (PA) group, a second PA group and a third PA group, the first PA group including a first PA and a second PA configured to support a first frequency band and a second frequency band, respectively, the second PA group including a third PA and a fourth PA configured to support the first frequency band and the second frequency band, respectively, and the third PA group including a fifth PA configured to support a third frequency band;
   an antenna module including a first antenna, a second antenna, a third antenna and a fourth antenna, the first antenna configured to be connected with the first PA, the second PA, and the fifth PA, the second antenna configured to be connected with the first PA and the second PA, and the third antenna configured to be connected with the third PA and the fourth PA, and the fourth antenna configured to be connected with the third PA and the fourth PA
   a power module including a first power modulator, a second power modulator and a third power modulator, the first power modulator connected with the first PA group, the second power modulator connected with the second PA group, and the third power modulator connected with the third PA group; and
   a communication processor configured to change an output voltage based on transmit power outputted via one or more PAs of the first, second, third, fourth or fifth PAs;
   wherein a first signal is to be outputted through at least one of the first PA or the second PA, and a second signal is to be outputted, simultaneously with the first signal, through at least one of the third PA or the fourth PA.

2. The portable communication device of claim 1, wherein the RF circuit is configured to:
   transmit the first signal via a selected one of the first antenna and the second antenna; and
   transmit the second signal, simultaneously with the first signal, via one of the third antenna, the fourth antenna and a fifth antenna.

3. The portable communication device of claim 1, wherein the RF circuit includes a multiplexer, wherein the first PA group and the third PA group are connected with the first antenna via the multiplexer.

4. The portable communication device of claim 1, wherein the RF circuit includes a fourth PA group including a sixth PA configured to support a fourth frequency band, wherein the antenna module includes a fifth antenna connected with the sixth PA, wherein the power module includes a fourth power modulator connected with the fourth PA group, the sixth PA configured to transmit simultaneously the second signal with the first signal.

5. The portable communication device of claim 1, wherein the RF circuit includes a fourth PA group including a sixth PA, wherein the second power modulator is connected with the fourth PA group, and wherein the second signal is to be outputted, simultaneously with the first signal, further through the sixth PA.

6. The portable communication device of claim 1, wherein the first frequency band corresponds to a middle band (MB), the second frequency band corresponds to a high band (HB), and the third frequency band corresponds to a low band (LB).

7. The portable communication device of claim 6, wherein the LB has a frequency ranging from 600 MHz to 1 GHz, the MB has a frequency ranging from 1.5 GHz to 2.2 GHz, and the HB has a frequency ranging from 1.8 GHz to 5 GHz.

8. A portable communication device comprising:
   a radio frequency (RF) circuit including a first power amplifier (PA) group, a second PA group and third PA group, the first PA group including a first PA and a second PA configured to support a first frequency band and a second frequency band respectively, the second PA group including a third PA configured to support the second frequency band, and the third PA group including a fourth PA configured to support a third frequency band;
   an antenna module including a first antenna and a second antenna, the first antenna configured to be connected with the first PA, the second PA and the fourth PA, the second antenna configured to be connected with the third PA;
   a power module including a first power modulator, a second power modulator and a third power modulator, the first power modulator connected with the first PA group, the second power modulator connected with the second PA group, and the third power modulator connected with the third PA group; and
   a communication processor configured to change an output voltage based on transmit power outputted via one or more PAs of the first, second, third or fourth PAs,
   wherein a first signal is to be outputted through at least one of the first PA or the second PA and a second signal is to be outputted, simultaneously with the first signal, through at least one of the third PA or the fourth PA.

9. The portable communication device of claim 8, wherein the RF circuit includes a multiplexer, wherein the first PA group and the third PA group connected to the first antenna via the multiplexer.

10. The portable communication device of claim 8, wherein the RF circuit includes a fourth PA group including a fifth PA configured to support a fourth frequency band, wherein the antenna module includes a third antenna connected with the fifth PA, wherein the power module includes a fourth power modulator connected with the fifth PA, wherein the fifth PA configured to transmit simultaneously the second signal with the first signal.

11. The portable communication device of claim 8, wherein the RF circuit includes a fifth PA group including a sixth PA, wherein the second power modulator connected with the fifth PA group, wherein the second signal is to be outputted, simultaneously with the first signal, further through the sixth PA.

12. The portable communication device of claim 8, wherein the RF circuit includes a fifth PA group including a sixth PA, wherein the first power modulator connected to the fifth PA group.

13. The portable communication device of claim 8, wherein the second antenna configured to connect to at least one of the first PA, the second PA and the fourth PA.

* * * * *